US009175674B2

(12) United States Patent
Ophardt et al.

(10) Patent No.: US 9,175,674 B2
(45) Date of Patent: Nov. 3, 2015

(54) DRAWBACK CHECK VALVE

(71) Applicant: GOTOHTI.COM INC., Beamsville (CA)

(72) Inventors: Heiner Ophardt, Arisdorf (CH); Ali Mirbach, Issum (DE)

(73) Assignee: GOTOHTI.COM INC., Beamsville (CA)

( * ) Notice: Subject to any disclaimer, the term of this patent is extended or adjusted under 35 U.S.C. 154(b) by 53 days.

(21) Appl. No.: 13/920,798

(22) Filed: Jun. 18, 2013

(65) Prior Publication Data

US 2013/0336823 A1 Dec. 19, 2013

Related U.S. Application Data

(63) Continuation-in-part of application No. 13/919,583, filed on Jun. 17, 2013.

(30) Foreign Application Priority Data

Jun. 19, 2012 (CA) ...................................... 2780503
Mar. 8, 2013 (CA) ...................................... 2808550

(51) Int. Cl.
*F16K 15/14* (2006.01)
*F04B 7/00* (2006.01)
*B05B 11/00* (2006.01)

(52) U.S. Cl.
CPC ................ *F04B 7/00* (2013.01); *B05B 11/007* (2013.01); *B05B 11/3001* (2013.01); *B05B 11/3097* (2013.01)

(58) Field of Classification Search
CPC ..... F16K 15/142; F16K 15/148; F16K 15/14; B05B 11/007; B05B 11/3001; B05B 11/3097; A47K 5/1207; F04B 7/00
USPC ............ 137/516.29, 843, 846, 847, 850, 853, 137/854
See application file for complete search history.

(56) References Cited

U.S. PATENT DOCUMENTS 2,576,637 A * 11/1951 Patriquin .................. 137/493.8
5,165,577 A 11/1992 Ophardt
5,282,552 A 2/1994 Ophardt
5,518,147 A * 5/1996 Peterson et al. ......... 222/153.07
5,622,317 A * 4/1997 Foster et al. ................. 239/333
5,676,277 A 10/1997 Ophardt
5,799,841 A 9/1998 Wirt
5,975,360 A 11/1999 Ophardt
6,343,724 B1 * 2/2002 Ophardt et al. ............... 222/496
6,557,736 B1 5/2003 Ophardt
6,601,736 B2 8/2003 Ophardt et al.
7,267,251 B2 9/2007 Ophardt
7,303,099 B2 12/2007 Ophardt
7,815,076 B2 10/2010 Ophardt
7,959,037 B2 6/2011 Ophardt et al.
8,074,844 B2 12/2011 Ophardt et al.
8,272,539 B2 9/2012 Ophardt et al.

(Continued)

FOREIGN PATENT DOCUMENTS

JP 62129168 6/1987

*Primary Examiner* — Jessica Cahill
(74) *Attorney, Agent, or Firm* — Thorpe North & Western, LLP

(57) ABSTRACT

A valve for a pump arrangement which serves on one hand as a one-way outlet valve subject to functioning, after fluid has been dispensed, of drawing back some fluid which has been dispensed.

18 Claims, 44 Drawing Sheets

(56) References Cited

U.S. PATENT DOCUMENTS

| | | | | |
|---|---|---|---|---|
| 8,360,286 | B2 | 1/2013 | Shi et al. | |
| 8,365,965 | B2 | 2/2013 | Ophardt | |
| 8,474,664 | B2 | 7/2013 | Ophardt et al. | |
| 2006/0261092 | A1* | 11/2006 | Ophardt et al. | 222/181.1 |
| 2006/0273114 | A1* | 12/2006 | Ophardt | 222/321.1 |
| 2007/0257064 | A1* | 11/2007 | Ophardt | 222/251 |
| 2008/0112830 | A1 | 5/2008 | Ophardt et al. | |
| 2010/0140879 | A1* | 6/2010 | Ophardt et al. | 277/435 |
| 2011/0014076 | A1* | 1/2011 | Shi et al. | 417/559 |
| 2011/0132933 | A1* | 6/2011 | Ophardt et al. | 222/181.3 |
| 2011/0240680 | A1 | 10/2011 | Ophardt et al. | |
| 2012/0104051 | A1 | 5/2012 | Ophardt et al. | |

* cited by examiner

DRAWBACK CHECK VALVE

RELATED APPLICATION

This application is a continuation-in-part of co-pending U.S. patent application Ser. No. 13/919,583, filed on Jun. 17, 2013.

SCOPE OF THE INVENTION

This invention relates to a fluid dispenser which provides for drawback of fluid from a discharge opening and, more particularly, to a valve arrangement which effectively provides a one-way check valve other than under conditions in which a drawback of fluid dispensed is provided by the valve.

This invention also relates generally to a piston for a pump and, more particularly, to an arrangement for a disposable variable length piston for piston pumps for dispensing flowable materials.

BACKGROUND OF THE INVENTION

Fluid dispensers are known incorporating fluid pumps in which an outer one-way check valve permits flow outwardly therepast in a downstream direction yet prevents fluid flow therepast inwardly in an upstream direction. Such known pump mechanisms include various dispensers for dispensing fluid drawn from the inside of a upstanding container for dispensing out a downwardly directed discharge outlet such as, for example, disclosed in U.S. Pat. No. 8,070,844, issued Dec. 13, 2011 to Ophardt et al, the disclosure of which is incorporated herein by reference.

Such known liquid dispensers suffer the disadvantage that after use of the dispenser, while the dispenser is at rest, fluid may drip from the discharge outlet.

Many dispensers of liquid such as hands soaps, creams, honey, ketchup and mustard and other viscous fluids which dispense fluid from a nozzle leave a drop of liquid at the end of the outlet. This can be a problem that the liquid may harden, as creating an obstruction which reduces the area for fluid flow in future dispensing. The obstruction can result in future dispensing through a small area orifice resulting in spraying in various directions such as onto a wall or user to stain the wall or user or more disadvantageously into the eyes of a user.

Many dispensers of material such as creams and for example liquid honey have the problem of stringing in which an elongate string of fluid hangs from fluid in the outlet and dangles from the outlet after dispensing an allotment of fluid. With passage of time the string may form into a droplet and drop from the outlet giving the appearance that the dispenser is leaking.

Pump assemblies for fluid dispensers are well known. Such pump assemblies includes those invented by the inventor of this present application including those disclosed in U.S. Pat. No. 5,165,577, issued Nov. 24, 1992; U.S. Pat. No. 5,282,552, issued Feb. 1, 1994; U.S. Pat. No. 5,676,277, issued Oct. 14, 1997, U.S. Pat. No. 5,975,360, issued Nov. 2, 1999, and U.S. Pat. No. 7,267,251, issued Sep. 11, 2007, the disclosures of which are incorporated herein by reference.

Many previously known piston pumps suffer the disadvantage that the pistons for the pump are difficult to manufacture.

SUMMARY OF THE INVENTION

To at least partially overcome some of the disadvantages of previously known devices, the present invention in a first aspect provides a valve for a pump arrangement which serves on one hand as a one-way outlet valve subject to functioning, after fluid has been dispensed, of drawing back some fluid which has been dispensed.

To at least partially overcome some of the disadvantages of previously known devices, the present invention in a second aspect provides a piston pump having a piston and a piston chamber forming member in which the piston forms a compartment of variable axial length inside a piston chamber between a piston head portion of the piston and a piston base portion of the piston spaced axially from the piston head portion by reason of a resilient portion of the piston biasing the piston head portion and the piston base portion axially apart with the resilient portion preferably being tubular, preferably being disposed between the piston head portion and piston base portion, and preferably with openings radially through the tubular piston intermediate resilient portion for fluid flow therethrough.

The present invention is particularly applicable to fluid dispensers which fluid is to be dispensed out of an outlet with the outlet forming an open end of a tubular member. In many applications, the tubular member has its outlet opening downwardly and fluid passing through the tubular member is drawn downwardly by the forces of gravity.

An object of the first aspect of the present invention is to provide a novel one-way valve arrangement which also provides for drawback of fluid passed therethrough after fluid has been dispensed.

An object of the second aspect of the present invention is to provide a fluid dispenser in which after dispensing fluid out an outlet draws fluid back through the outlet to reduce dripping and/or stringing.

Another object of the present invention is to provide a simplified piston pump for dispensing fluid and after dispensing draws back fluid from the outlet of a nozzle from which the fluid has been dispensed.

Another aspect is to provide a valving member which varies the extent to which fluid flow is permitted therethrough with axial deflection of a tubular wall.

Accordingly, in accordance with the first aspect, the present invention provides, in combination, a tube member and a valve member:

the tube member having a tube inner wall defining therein an axially extending fluid passageway for flow of a fluid in an axial downstream direction therethrough, the tube inner wall having a tube upstream portion and a tube downstream portion, the tube downstream portion located in the downstream direction from the tube upstream portion, the valve member disposed within the passageway, the valve member comprising a spring member and a piston head member, the spring member having a spring first end and a spring second end, the spring member extending axially within the passageway from the spring first end to the spring second end, the spring first end coupled to the tube inner wall at a first location against relative axial movement with the tube member, the piston head member fixedly secured to the spring second end, the spring member being resilient and having an inherent bias to assume an unbiased position in which the spring second end is axially spaced from the spring first end by a distance equal to an unbiased length, the spring member deflectable from the unbiased position to biased positions in which the spring second end is axially spaced from the spring first end by distances different than the unbiased length, in moving from the unbiased position to the biased positions the spring second end is moved in the axial downstream direction relative the spring first end, piston head member having an axial downstream side and an axial upstream side, a pressure differential across the piston head member is measured as a pressure of the fluid in the passageway on the axial upstream side of the piston head member minus a pressure of the fluid in the passageway on the axial downstream side of the piston head member, the piston head member having a peripheral circumferential edge portion wherein when the edge portion of the piston head member is in the tube upstream portion engagement between the edge portion and the tube inner wall of the tube upstream portion prevents fluid flow axially therebetween, and when the edge portion of the piston head member is in the tube downstream portion interaction between the edge portion of the piston head member and the tube downstream portion permits fluid flow downstream therepast, wherein when the pressure differential is less than or equal to the first pressure level the edge portion of the piston head member is in the tube upstream portion and when the pressure differential is greater than the first pressure level the edge portion of the piston head member is in the tube downstream portion.

Accordingly, in accordance with the second aspect, the present invention provides a piston-forming element for reciprocal sliding within a chamber in a piston pump, the piston-forming element disposed about a central axis and having an inner head portion, an outer base portion and a tubular portion intermediate the head portion and the base portion, the tubular member coupled at an outer end to the base portion and at an inner end to the head portion, a head disc extending radially outwardly from the head portion substantially preventing fluid flow in the chamber past the head disc in an inward direction and permitting fluid flow in the chamber past the head disc in an outward direction, a base disc extending radially outwardly from the stem of the base portion axially outwardly from the head disc engaging the chamber wall circumferentially thereabout substantially preventing fluid flow in the chamber past the base disc in an inward direction, the base portion having a central axially extending hollow stem having a central passageway open at an outer end forming an outlet.

the passageway extending from the outlet inwardly to an inner end open to the chamber between the head disc and the base disc, the tubular member having a wall extending between inner end and the outer end, the wall having the shape of a solid of revolution rotated about the central axis, the wall having a radially outwardly directed outer wall surface and a radially inwardly directed inner wall surface, at least one opening radially through the wall member from the outer wall surface to the inner wall surface, the tubular member reducing in length axially between the base portion and the head portion when axially directed compression forces are applied to the tubular member by the base portion, the tubular member being resilient having an inherent bias to assume an initial unbiased configuration of an unbiased length measured axially along the central axis, the tubular member resiliently deflectable to biased configurations each having a length measured axially along the central axis less than the unbiased length, the inherent bias of the resilient member biasing the tubular member to return towards the unbiased configuration from any one of the biased configurations, with a reduction in the length of the tubular member as measured axially along the central axis the outer wall surface increases in convexity as seen in cross-sectional side view in any flat plane including the central axis extending radially from the axis.

In a further perspective of the second aspect, the present invention provides a pump for dispensing fluids from a reservoir, comprising:

a piston chamber-forming member having an elongate chamber, said chamber having a chamber wall, an outer open end and an inner end in communication with the reservoir;

a one-way valve between the reservoir and the chamber permitting fluid flow through the inner end of the chamber, only from the reservoir to the chamber;

a piston-forming element slidably received in the chamber extending outwardly from the open end thereof;

the piston-forming element having an inner head portion, an outer base portion and a variable length portion intermediate the head portion and the base portion joining the head portion and the base portion, a head disc extending radially outwardly from the head portion engaging the chamber wall circumferentially thereabout to substantially prevent fluid flow in the chamber past the head disc in an inward direction, the head disc elastically deforming away from the chamber wall to permit fluid flow in the chamber past the head disc in an outward direction, a base disc extending radially outwardly from the stem of the base portion axially outwardly from the head disc engaging the chamber wall circumferentially thereabout to substantially prevent fluid flow in the chamber past the base disc in an inward direction, the base portion having a central axially extending hollow stem having a central passageway open at an outer end forming an outlet, the passageway extending from the outlet inwardly to an inner end open to the chamber between the head disc and the base disc, the piston-forming element received in the piston chamber-forming member reciprocally coaxially slidable inwardly and outwardly by movement of the base portion in the chamber between a retracted position and an extended position in a cycle of operation to draw fluid from the reservoir and dispense it from the outlet, the piston-forming element and the chamber coaxially disposed about a central axis, the variable length portion comprising a tubular member coupled at an outer end to the base portion and at an inner end to the head portion, the tubular member transmitting axially directed tension force applied thereto by the base portion from the base portion to the head portion, the tubular member reducing in length axially between the base portion and the head portion when axially directed compression forces are applied to the tubular member by the base portion, the tubular member having a wall extending between inner end and the outer end, the wall having the shape of a solid of revolution rotated about the central axis, the wall having a radially outwardly directed outer wall surface and a radially inwardly directed inner wall surface, at least one opening radially through the wall member from the outer wall surface to the inner wall surface, the tubular member being resilient having an inherent bias to assume an initial unbiased configuration of an unbiased length measured along the central axis, the tubular member resiliently deflectable to biased configurations each having a length measured along the central axis less than the unbiased length, the inherent bias of the resilient member biasing the tubular member to return towards the unbiased configuration from any one of the biased configurations, a reduction in the length of the tubular member as measured along the central axis corresponds to the outer wall surface increasing in convexity as seen in cross-sectional side view in flat planes including the central axis extending radially from the axis.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
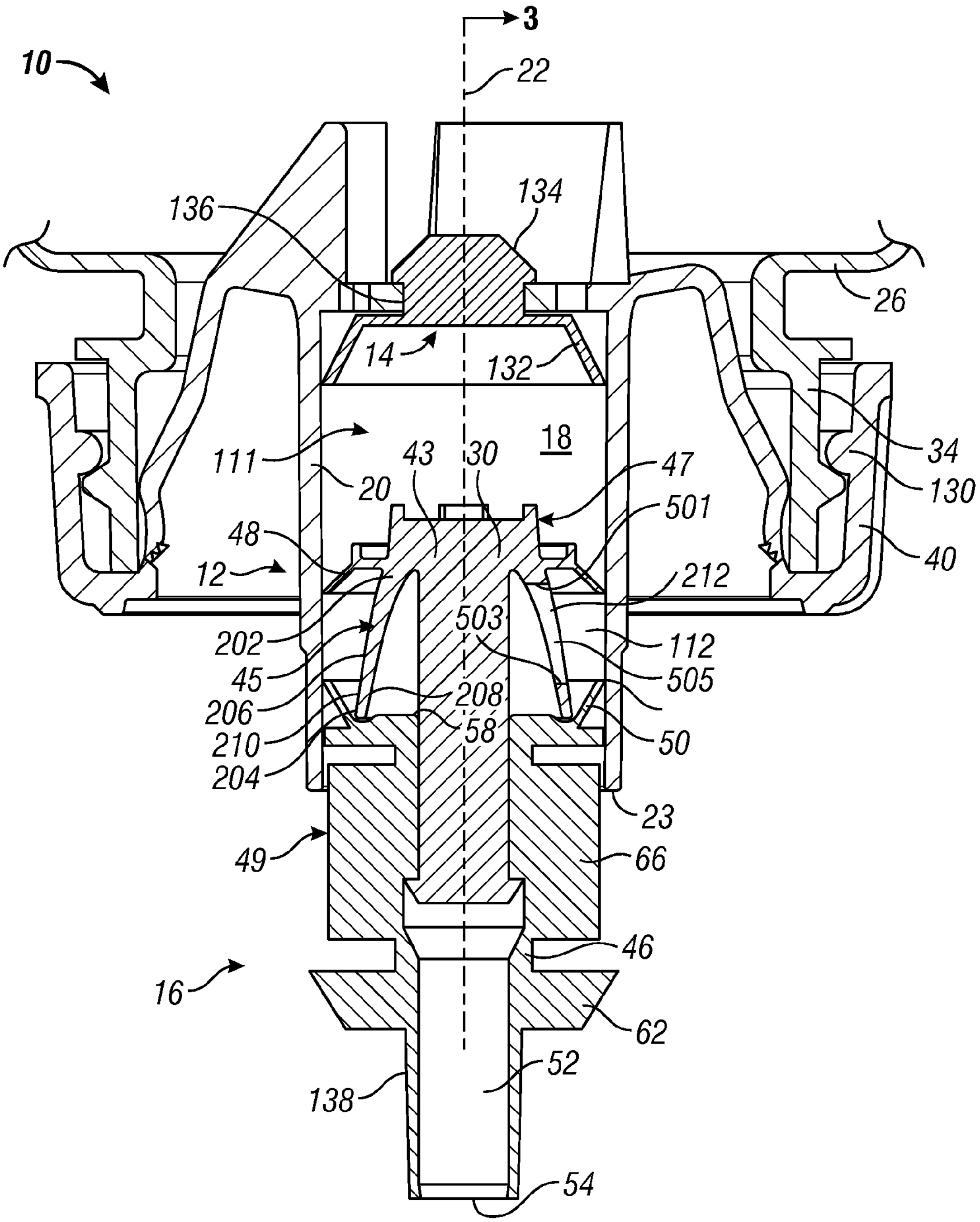
FIG. 1 is a cross-sectional side view of a pump in accordance with a first embodiment of the present invention with a piston in an uncompressed condition.

Reference is made first to the pump shown in FIG. 1 comprising a pump assembly 10 secured to a reservoir or container 26 having a threaded neck 34. The pump assembly has a body 12, a one-way valve 14 and a pump piston 16.

The body 12 provides a cylindrical chamber 18 in which the pump piston 16 is axially reciprocally slidable in a cycle of operation so as to draw fluid from within the container 26 and dispense it out of an outlet 54. The chamber 18 has a cylindrical chamber wall 20 disposed coaxially about a central chamber axis 22.

The pump piston 16 is shown as preferably formed from two elements, namely: a valve piston member 15 and a valve body 17. Functionally, the pump piston 16 has a head portion 47, a variable length intermediate portion 45 and a base portion 49. The valve piston member 15 is preferably an integral member as shown forming both the head portion 47 and the variable length intermediate portion 45. In the first preferred embodiment, the valve piston member 15 is an integral member formed from a resilient material so as to provide the variable length intermediate portion 45 to function as a resilient spring.

The head portion 47 includes a centrally extending head stem 30 upon which a head disc 48 is mounted. The head disc 48 extends radially outwardly from the head stem 30 as a circular resilient flexible disc located at the inwardmost end of the head portion 47 and extending radially therefrom. The head disc 48 is sized to circumferentially abut the inner chamber wall 20 substantially preventing fluid flow therepast inwardly in the chamber 18. The head disc 48 is formed as a thin resilient disc having an elastically deformable edge portion 48*a* to engage the chamber wall 20. The edge portion extends radially outwardly and in a direction axially outwardly of the chamber 18. The edge portion is adapted to deflect radially inwardly away from the chamber wall 20 to permit fluid flow outwardly in the chamber 18 therepast.

Figure 6:
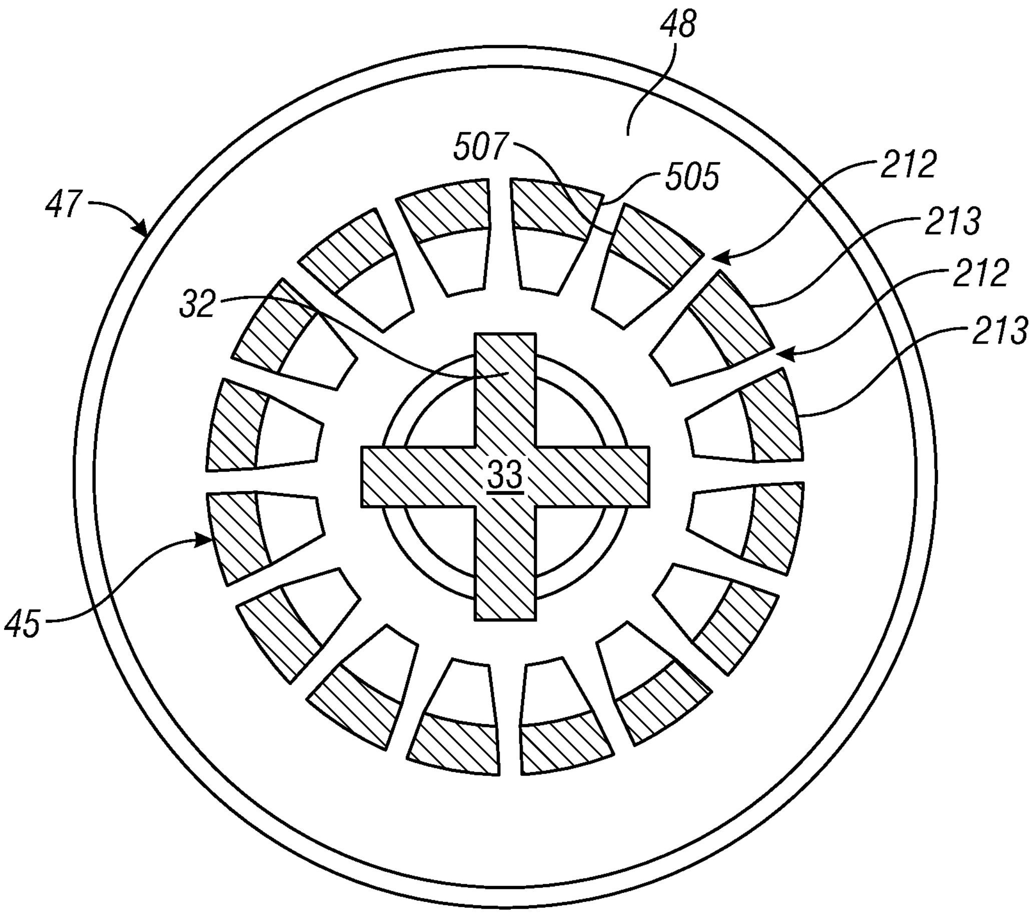
FIG. 6 is a cross-sectional end view of the valve piston member of the pump piston along section line 6-6' in FIG. 2.
Figure 8:
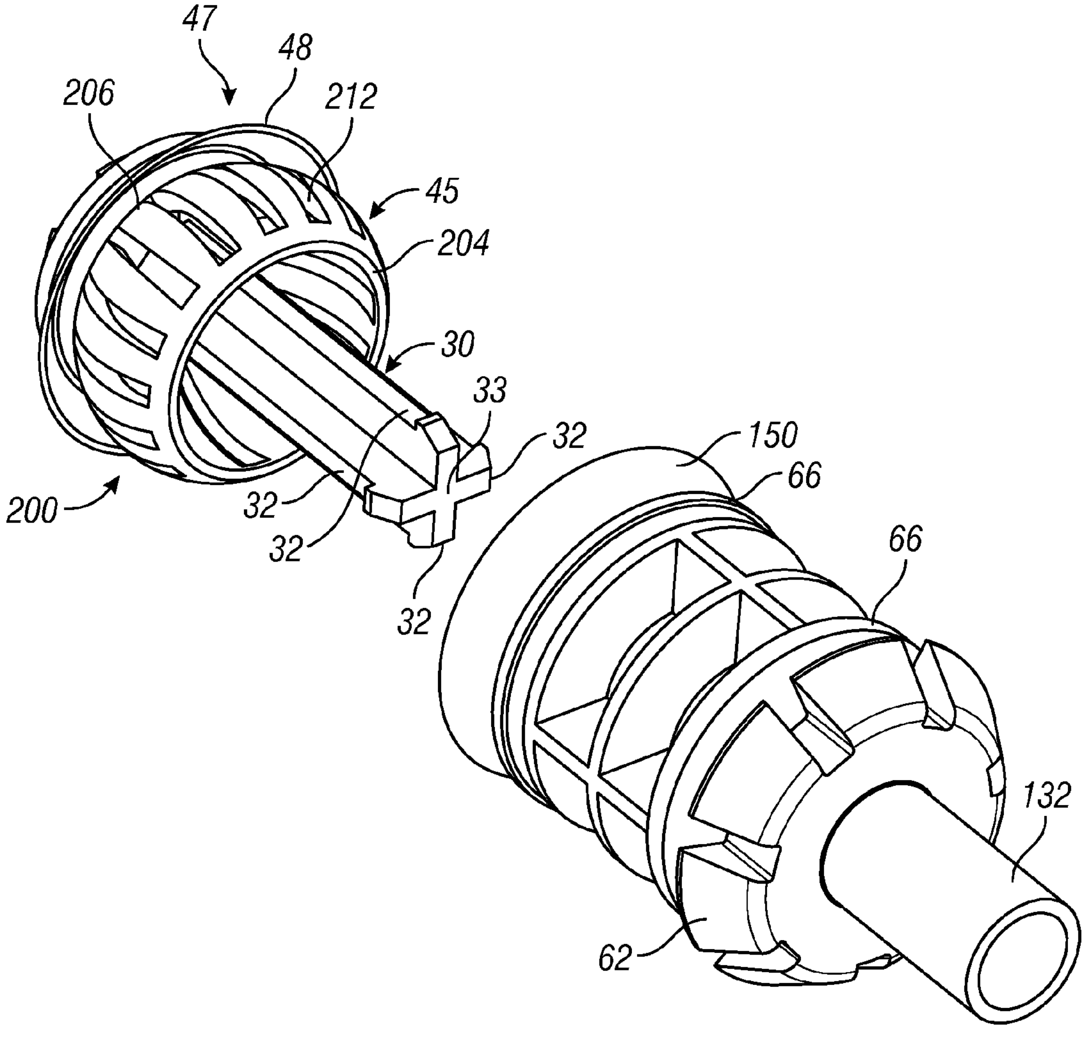
FIG. 8 is an exploded pictorial view of the pump piston of FIG. 7.
Figure 9:
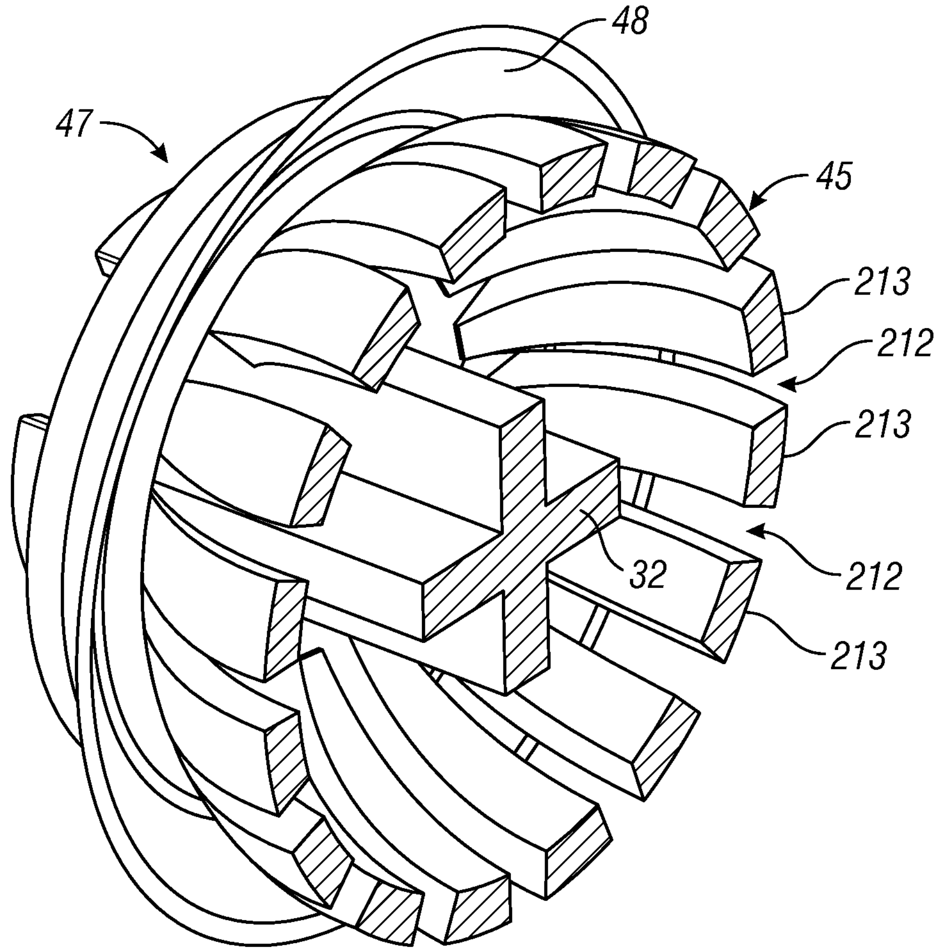
FIG. 9 is a partial pictorial view showing the valve piston member of FIGS. 7 and 8 cross-sectioned along section 9-9' in FIG. 3.

As best seen in FIGS. 6 and 8, axially outwardly of the head disc 48, the head stem 30 has a center 33 coaxial about the axis from which four elongate arms 32 extend radially outwardly and axially to provide an X shape in cross-section as seen in FIGS. 6 and 8. Each arm 32 carries at its axial outer end a radially outwardly extending hooking member 34 with an axially inwardly directed catching surface 35.

The variable length intermediate portion 45 comprises an elongate tubular member 200 disposed to bridge between the head portion 47 and the base portion 49 joining them together axially spaced apart. The tubular member 200 has an inner end 202 and an outer end 204. The inner end 202 of the tubular member 200 is fixedly coupled to the head portion 47 by being formed integrally therewith. The outer end 204 of the tubular member 200 engages the base portion 49. The tubular member 200 is coupled to the head portion 47 and the base portion 49 in a manner so as to not interfere with the engagement of the head disc 48 and a base disc 50 carried on the base portion 49 with the side wall 20 of the chamber.

The tubular member 200 has a wall 206 extending between the inner end 202 and the outer end 204. The wall 206 has a radially inwardly directed inner wall surface 208 and a radially outwardly directed outer wall surface 210. The wall 206 has the shape of a solid of revolution rotated about the central axis 22. The wall extends circumferentially entirely about the central axis 22, that is, 360 degrees about the central axis 22. Each of the inner end 202 and the outer end 204 is an annular ring that extends annularly 360 degrees about the central axis 22.

A plurality of openings 212 extend radially through the wall 206 between the inner wall surface 208 and the outer wall surface 210. The openings 212 each have an axial extent. The openings 212 are spaced circumferentially about the tubular member 200 with each opening 212 spaced circumferentially from its adjacent openings 212 by an axially extending web 213. Preferably, as shown, the openings 212 are identical and evenly spaced circumferentially by identical webs 213. Each opening 212 is shown to be defined between an inner end surface 501, an outer end surface 503 and two side surfaces 505 and 507. Each opening 212 is axially elongate and has an axial extent between the inner end surface 501 and the outer end surface 503. Each opening has a circumferential extent between the side surfaces 505 and 507.

In operation of the pump, fluid which moves through the pump piston 16 radially outwardly of the head disc 48 passes through the openings 212 to reach the outlet 54.

Figure 7:
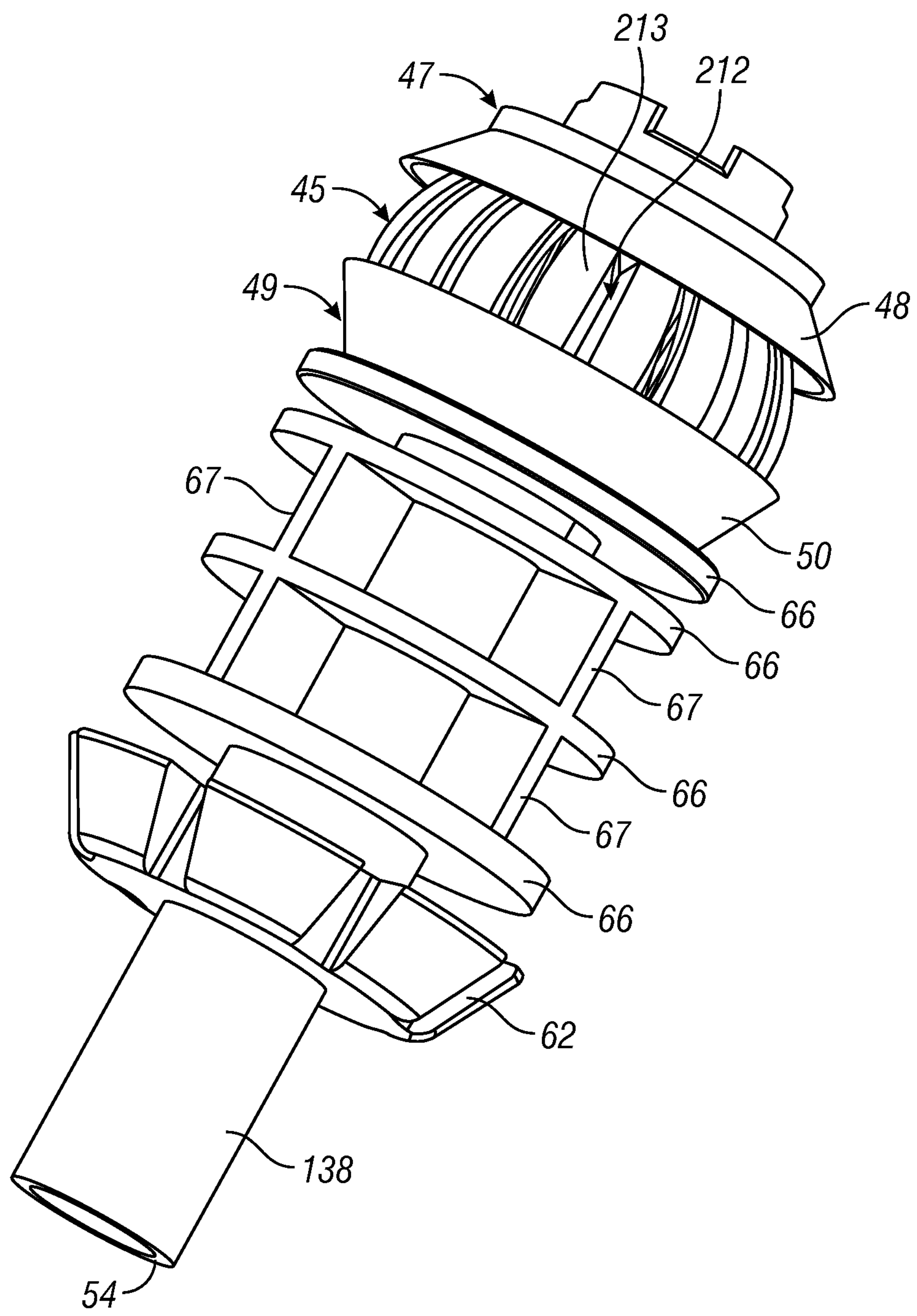
FIG. 7 is a pictorial view of the pump piston of FIG. 1 but in the first compressed condition of FIG. 3.

The valve body or base portion 49 has a base stem 46 that carries the base disc 50, locating disc 66, locating webs 67 and an engagement flange 62. The base disc 50 is a circular resilient flexible disc located on the stem 46 spaced axially outwardly from the head disc 48. The base disc 50 extends radially outwardly from the stem 46 to circumferentially engage the chamber wall 20 substantially preventing fluid flow therebetween outwardly in the chamber 18. As with the head disc 48, the base disc 50 is preferably formed as thin resilient disc, in effect, having an elastically deformable edge portion 30*a* to engage the chamber wall 20. The stem 46 has a central passageway 52 extending along the axis 22 from an inner inlet end 58 located on the stem 46 between the head disc 48 and the base disc 50 to the outlet 54 at the outer end of the base portion 49. The passageway 52 permits fluid communication through the base portion 49 past the base disc 50, between the inlet end 58 and the outlet 54. Locating discs 66 and locating webs 67 best seen in FIG. 7 are provided to engage the chamber wall 20 so as to assist in maintaining the base portion 49 axially centered within the chamber 18 when sliding axially in and out of the chamber 18. The stem 46 comprises a tubular member and can be seen to have the passageway 52 extend therethrough between the outlet 54 and the inlet end 58 with the inlet end 58 open to the chamber 18 between the head disc 48 and the base disc 50.

Each of the base portion 49 and the head portion 47 is circular in any in cross-section normal the axis 22 therethrough. Each of the base portion 49 and the head portion 47 is adapted to be slidably received in chamber 18 coaxially within the chamber 18.

Figure 3:
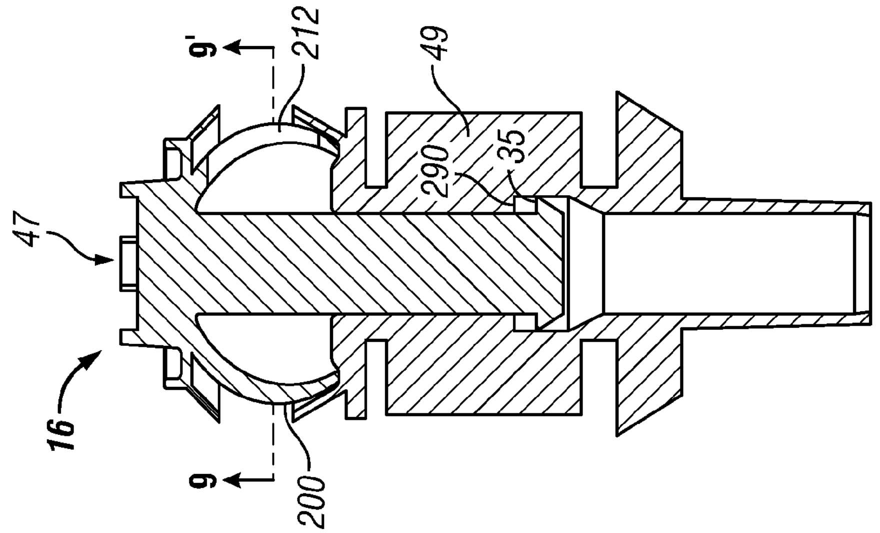
FIG. 3 is a cross-sectional side view of the pump piston as in FIG. 2 but in a first compressed condition.

As seen in FIG. 3, the passageway 52 has its side wall 52*a* formed to provide an axially outwardly directed catch surface 290 which forms a hook member in axial opposition to the axially inwardly directed catching surface 35 to be engaged by the hooking member 34 of the head stem 30 and limit inward axial movement of the head portion 47 relative the base portion 49. The catch surface 290 is provided as an axially outwardly directed shoulder between an inner portion of the passageway 52 of a first diameter and an outer portion of a larger diameter.

The engagement flange 62 is provided on the stem 46 for engagement as by an actuator, not shown, to move the base portion 49 inwardly and outwardly. The engagement flange 62 may also serve the function of a stopping disc to limit axial inward movement of the pump piston 16 by engagement with the outer end 23 of the body 12. The stem 46 is shown to extend outwardly from the engagement flange 62 to the discharge outlet 54 as a relatively narrow hollow tube 138 with the passageway 52 coaxially therethrough.

The one-way valve 14 comprises a unitary piece of resilient material having a resilient, flexible, annular rim 132 for engagement with the side wall of the chamber 18. The one-way valve 14 is integrally formed with a shouldering button 134 which is secured in a snap-fit inside an opening 136 in a central upper end of the chamber 18.

As seen in FIG. 1, an annular inner compartment 111 is formed inside the chamber 18 between the one-way valve 14 and the head disc 48 and an annular outer compartment 112 is formed inside the chamber 18 between the head disc 48 and the base disc 50. The volume of the annular outer compartment 112 varies with variance of the axial length of the variable length intermediate portion 45 of the pump piston 16.

The body 12 carries an outer cylindrical portion 40 carrying threads 130 to cooperate with threads formed on the threaded neck 34 of the container 26.

In use, the pump assembly 10 is preferably orientated such that such that the outlet 54 is directed downwardly, however, this is not necessary.

Figure 4:
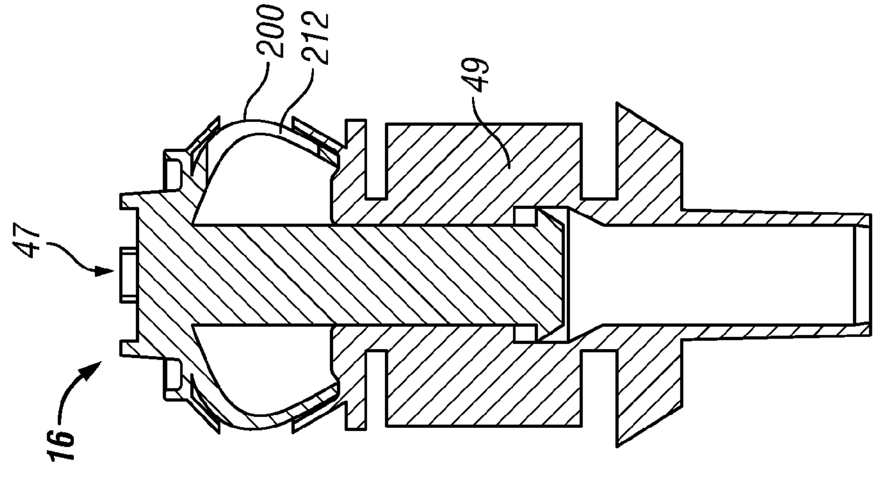
FIG. 4 is a cross-sectional side view of the pump piston as in FIG. 2 but in a second compressed condition.
Figure 2:
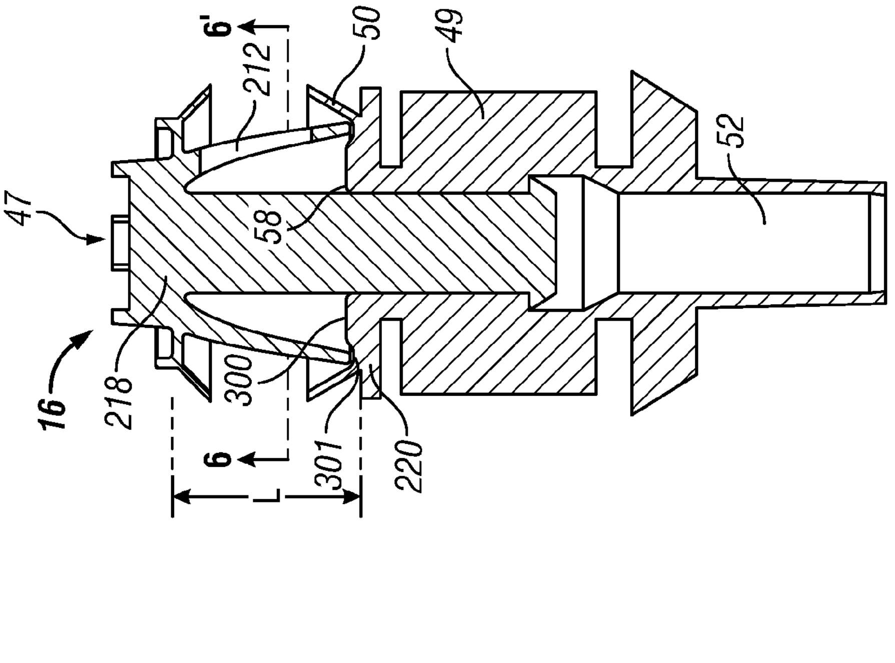
FIG. 2 is a cross-sectional side view of the pump piston of the pump shown in FIG. 1 in the same uncompressed condition as in FIG. 1.

The tubular member 200 has an inherent resiliency by reason of being formed from a suitable resilient material, preferably plastic material. The inherent resiliency of the tubular member 200 biases the tubular member 200 to adopt an unbiased configuration of a maximum axial length measured along the central axis. When the tubular member 200 is subjected to axially directed compression forces the tubular member 200 compresses axially such that its axial length as measured along the central axis 22 reduces and when such compressive forces are released, the tubular member 200 increases in length expanding towards the unbiased condition. FIG. 2 shows the pump piston 16 and its valve piston member 15 in an uncompressed condition. FIG. 3 shows the pump piston 16 and its valve piston member 15 in a first compressed condition in which the variable length intermediate portion 45 and its tubular member 30 are compressed to be of reduced axial length compared to FIG. 2. FIG. 4 shows the pump piston 16 and its valve piston member 15 in a second compressed condition compressed to be of reduced axial length compared to FIG. 3.

The tubular member 200 is disposed about the central axis 22 bridging between the head portion 47 and the base portion 49 and acts in the manner of a spring to urge the head portion 47 and base portion 49 axially apart.

The inner end 202 of the tubular member 200 is fixed to the head stem 30 radially inwardly from the head disc 48 by being formed integrally therewith. The base portion 49 is arranged such that the outer end 204 of the tubular member 200 engages the base stem 46 of the base portion 49 radially inwardly from the base disc 50.

As shown in FIG. 2, the base portion 49 provides an axially inwardly directed surface 300 at its inner end between the inner inlet end 58 of the passageway 52 and the base disc 50 which surface 300 is to be engaged by the outer end 204 of the tubular member 200. In the first embodiment, an annular groove 301 is provided in the surface 300 open axially inwardly within which groove 301 the outer end 204 of the tubular member 200 is seated. Engagement between the annular groove 301 and the outer end 204 of the tubular member 200 assists in maintaining the tubular member 200 coaxially disposed about the central axis 22. As shown, the groove 301 preferably has an outer side surface which is directed radially inwardly to engage the outer surface 210 of the wall of the tubular member 200. The groove 301 also has an inner side surface directed radially outwardly and adapted to engage the inner surface 208 of the wall of the tubular member 200. The groove 301 could be configured to provide merely the outer side or the inner side surface and still function to restrain the outer end of the tubular member 200.

The variable length intermediate portion 45 has an axial length defined as a length measured along the central axis 22 as between the head disc 48 and the base disc 50. This axial length is measured along the axis 22 between a center 218 on the head portion 47 and a center 220 of the base disc 50. The axial length is indicated as L on FIG. 2 and is variable between a maximum length and a minimum length due to the ability of the elongate members 200 to deflect.

Figure 5:
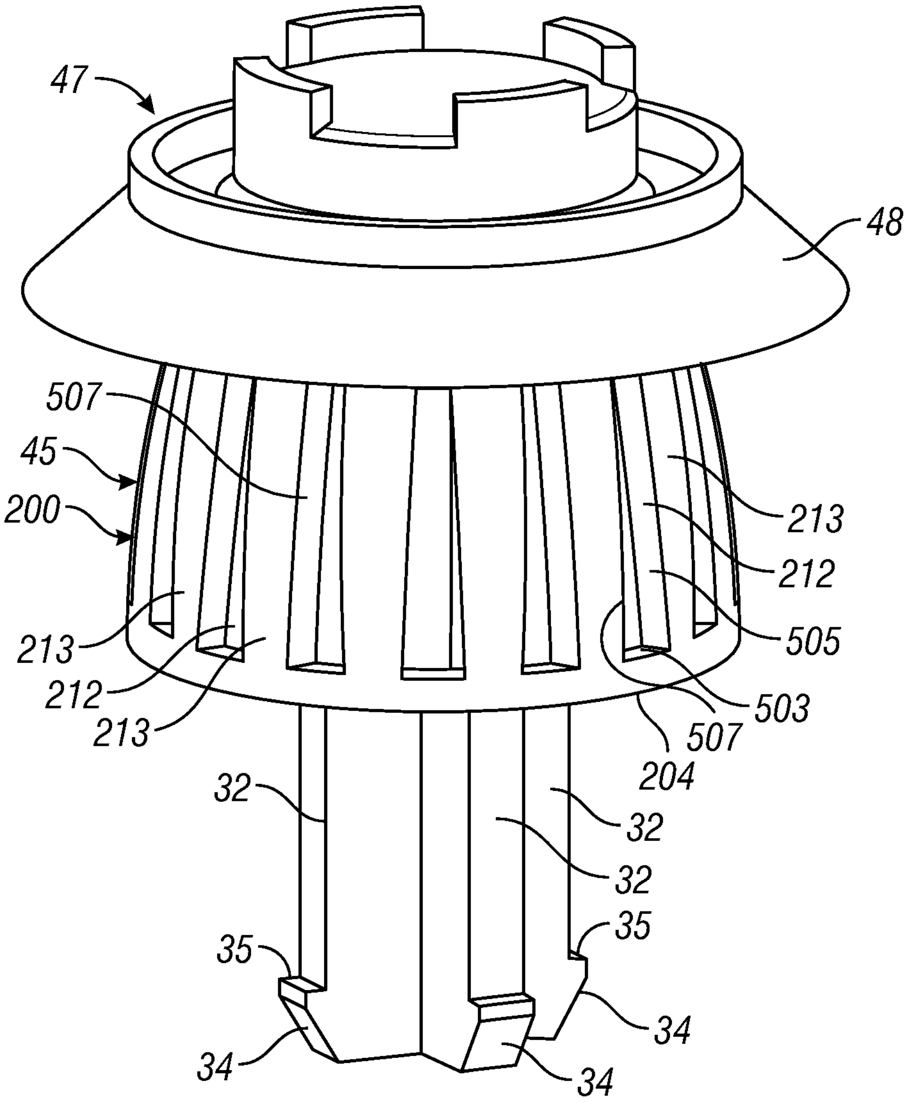
FIG. 5 is a pictorial view of a valve piston member of the pump piston of the pump shown in FIG. 1.

The pump piston 16 shown in each of FIGS. 5 and 6 show the pump piston 16 in an uncompressed condition of FIG. 2. In contrast, FIGS. 7 to 10 show the pump piston 16 in the first compressed condition of FIG. 3.

Figure 11:
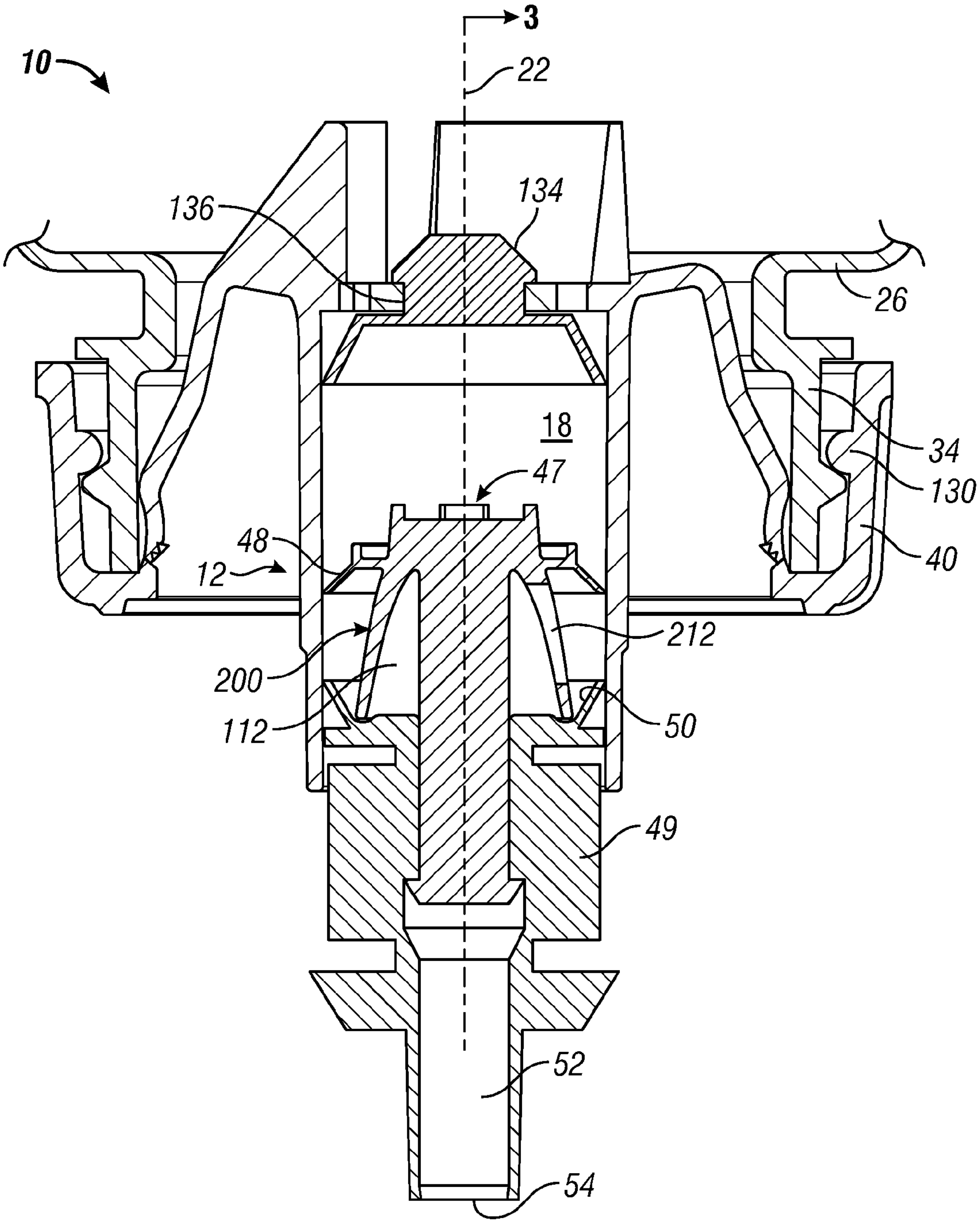
FIGS. 11, 12, 13 and 14 are cross-sectional views of the pump of FIG. 1, respectively, with in FIG. 11, the pump piston in an extended position with the valve piston member in the uncompressed condition of FIG. 2, with in FIG. 12, the pump piston in an extended position and the valve piston member in the compressed condition of FIG. 3, with in FIG. 13, the pump piston in a retracted position and the valve piston member in the compressed condition of FIG. 3; and with in FIG. 14, the pump piston in a retracted position and with the valve piston member in the uncompressed condition of FIG. 2.
Figure 12:
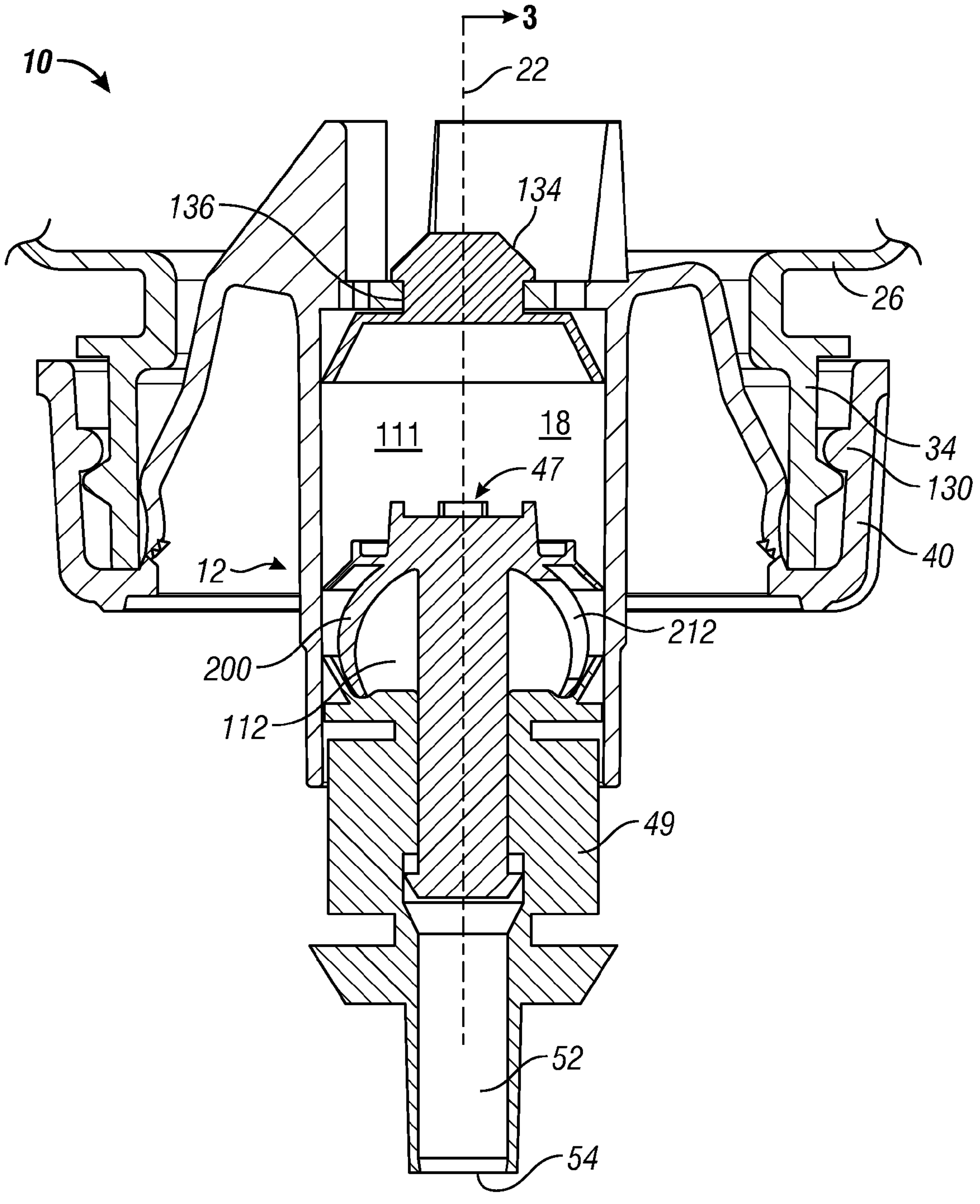
Figure 13:
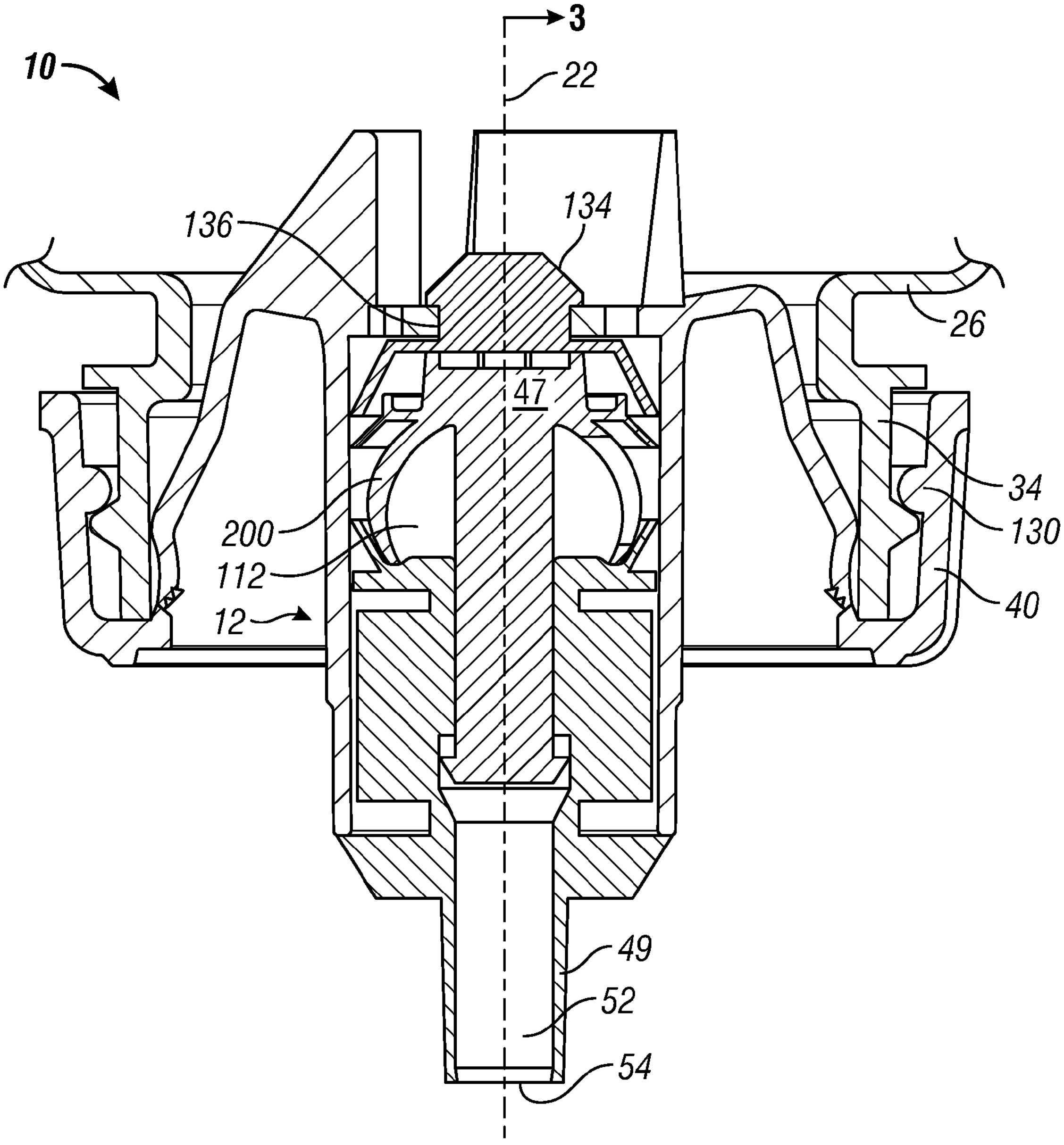
Figure 14:
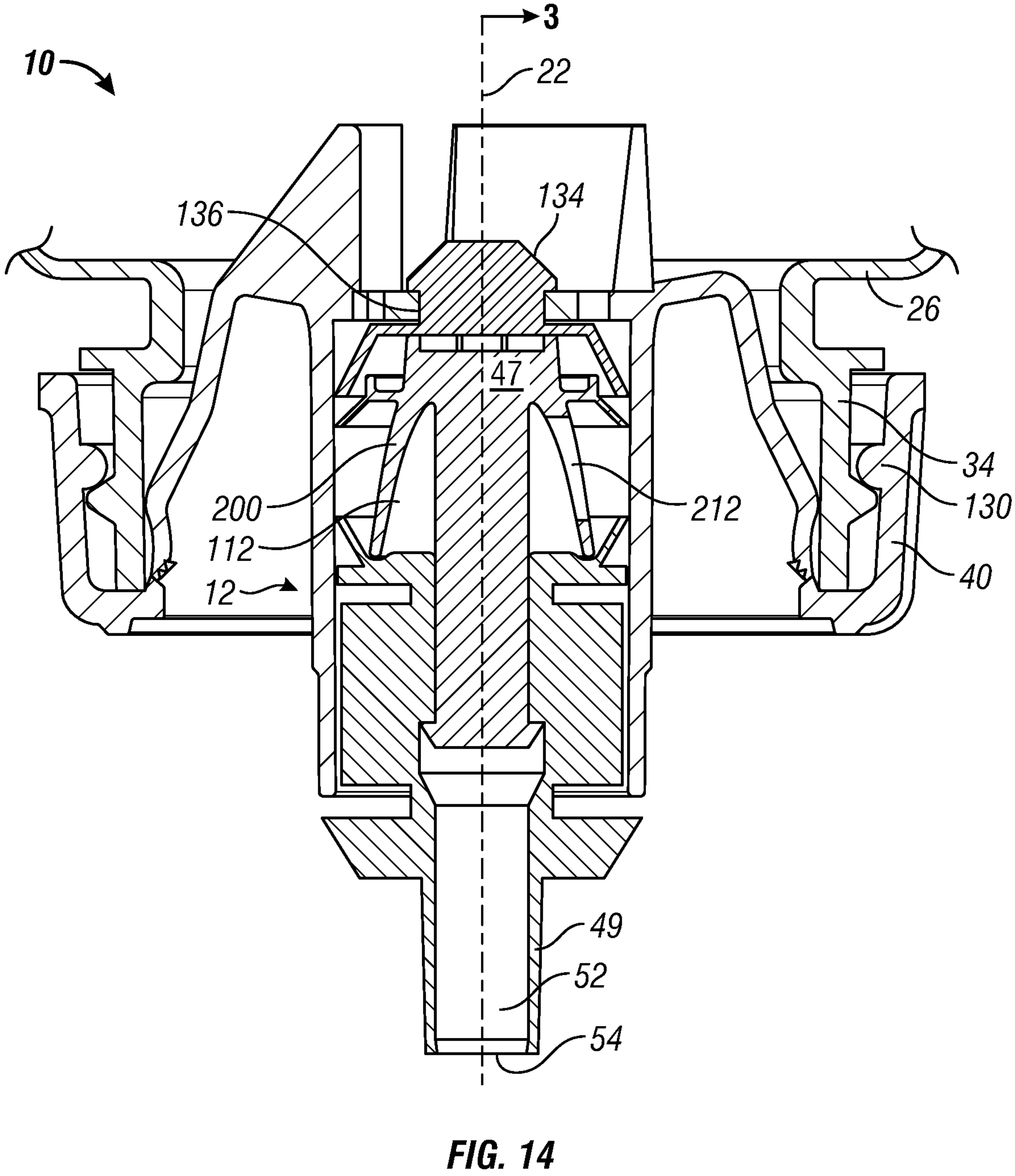

The pump assembly 10 is shown in FIGS. 12, 13 and 14 in use in a cycle of operation of the pump. FIGS. 11 and 14 show the pump piston 16 within the chamber 18 of the body 12 in an uncompressed condition (also sometimes referred to herein as an expanded condition) as seen in FIG. 2 in which the variable length intermediate portion 45 is in its maximum length. With movement of the base portion 49 outwardly in the chamber 18 as from the position of FIG. 14, resistance to movement of the head portion 47 and particularly its head disc 48 within the chamber 18 will give rise to tension forces being applied across the tubular member 200. The response of the tubular member 200 to such tension force will depend upon the nature and resiliency of the tubular member 200 and the amount of the tension force.

FIGS. 12 and 13 show the pump piston 16 received in the chamber 18 of the body 12 with the variable length intermediate portion 45 in a first compressed condition as seen in FIG. 3. With movement of the base portion 49 inwardly in the chamber 18, resistance to inward movement of the head portion 47 and notably resistance to movement of the head disc 48 inwardly in the chamber 18 results in compressive forces being applied to the variable length intermediate portion 45 between the base portion 49 and the head portion 47. Such compressive forces cause the tubular member 200 to deform to reduce the axial length of the variable length intermediate portion 45 to a reduced length compressed condition as seen in FIGS. 12 and 13.

In operation of the pump, the relative tension forces and compression forces which may be applied through the variable length intermediate portion 45 between the base portion 49 and the head portion 47 will cause the variable length intermediate portion 45 to adopt configurations between an expanded condition and a compressed condition. The relative resistance of the head portion 47 to sliding within the chamber 18 is affected by many factors including the friction to movement of the head portion 47 within the chamber 18, inwardly and outwardly, the nature of the fluid in the reservoir having regard to, for example, its viscosity and temperature, the speed with which the base portion 49 is moved and various other factors which will be apparent to a person skilled in the art. A person skilled in the art by simple experimentation can determine suitable configurations for the intermediate member 45 so as to provide for the axial length of the variable length portion to vary between a suitable minimum length and a suitable maximum length in cyclical movement of the pump piston 16 in a cycle of operation.

The outer wall surface 210 of the wall 206 of the tubular member 200 as seen in side view in FIG. 2 in the uncompressed condition is convex, that is, the outer wall surface 210 bows radially outwardly.

As the tubular member 200 is axially compressed to the reduced length compressed condition of FIG. 3, the convexity of the outer wall surface 210 increases. As seen in FIG. 3, when in the compressed condition, the outer wall surface 210 is convex, however, bowed outwardly to an extent greater than in the uncompressed condition of FIG. 2.

The openings 212 are provided through the wall 206 such that the openings change in relative shape with axial deflection of the tubular member 200. Each opening 212 provides a passage through which fluid may flow through the wall 206. In the uncompressed condition of FIG. 5, each opening 12 provides a minimum cross-sectional area for fluid flow therebetween. The cross-sectional area of the passage through openings 212 for fluid flow therethrough preferably increases as the tubular member 200 is deflected axially from the expanded condition to the compressed condition by reason of the circumferential extent of each opening between the side surfaces 505 and 507 increasing as the wall 206 bows out and the outer wall surface 210 increases in convexity. While not necessary, having the cross-sectional area of the passage through each opening increase as the tubular member 200 is compressed is advantageous since during operation of the pump, a larger volumetric fluid flow through the tubular member 200 is required when the tubular member 200 is compressed.

Figure 10:
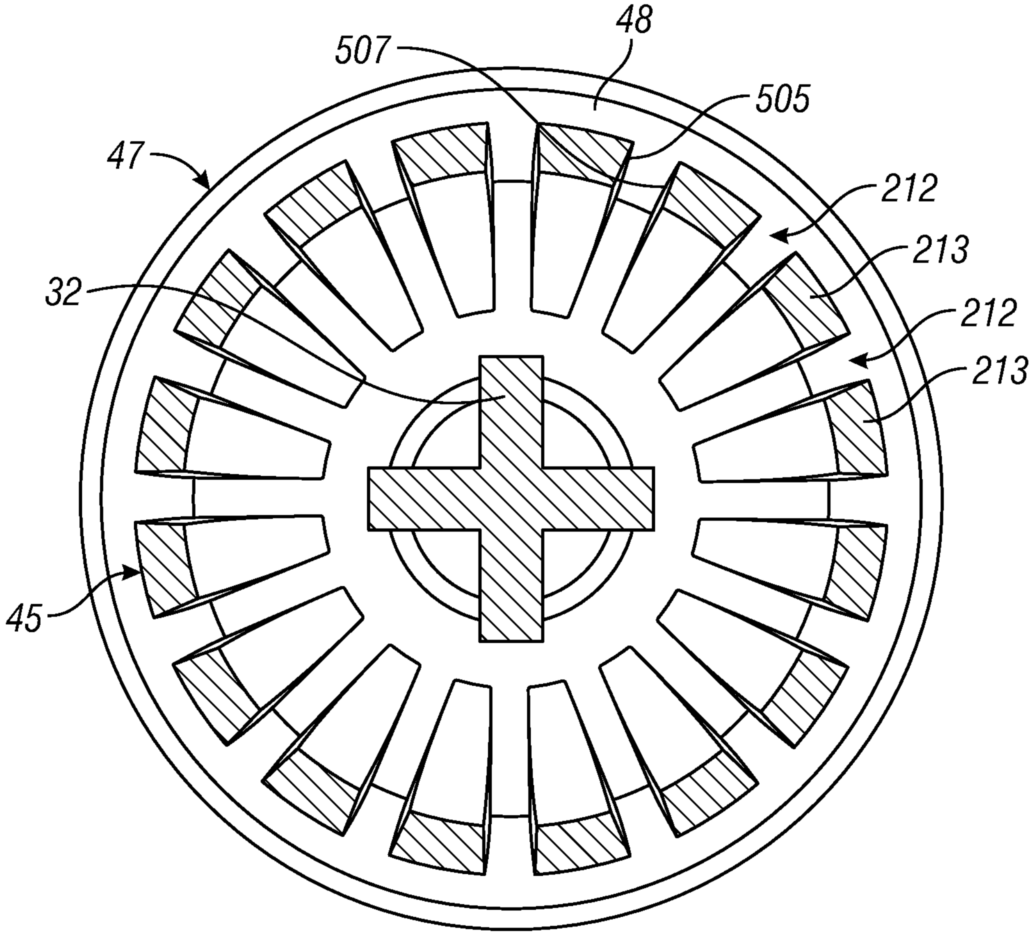
FIG. 10 is a cross-sectional end view of the piston of FIG. 3 along section line 9-9' in FIG. 3.

Reference is made to FIG. 6 which shows a cross-sectional end view through the pump piston 16 in the uncompressed condition of FIG. 2 in which the openings 212 are shown in end cross-section disposed between the webs 213. Reference is made to FIG. 10 which shows a similar cross-sectional end view as in FIG. 6, however, with the pump piston 16 in a compressed condition of FIG. 3 in which the tubular member 200 is axially compressed compared to FIG. 2. As may be seen by a comparison of FIG. 6 with FIG. 10, the webs 213 in FIG. 10 are located radially farther outwardly from the central axis 22 with a result that the circumferential extent of each opening 212 has been increased by reason that side surfaces 505 and 507 defining each opening 212 are circumferentially farther apart in FIG. 10 than in FIG. 6. The cross-sectional area for fluid flow through each opening is a function of the circumferential extent of the opening. Generally, in the first embodiment with an increase in circumferential extent, the cross-sectional area of the opening increases.

The pump assembly operates in a cycle of operation in which the pump piston 16 is reciprocally moved relative the body 12 inwardly in a retraction stroke and outwardly in a withdrawal stroke.

During movement of the head portion 47 inwardly into the chamber, since fluid is prevented from flowing outwardly past the disc 50, pressure is created in the inner compartment 111 formed in the chamber 18 between the head disc 48 and the one-way valve 14. This pressure urges rim 132 of the one way valve 14 radially inwardly to a closed position abutting the chamber wall 20. As this pressure increases, head disc 48 deflects at its periphery so as to come out of sealing engagement with the chamber wall 20 and permits fluid to flow outwardly past head disc 48 into the annular outer compartment 112 between the head disc 48 and the sealing disc 50 through the tubular member 200 via the openings 212 and hence out of chamber 18 via the passageway 52.

During a withdrawal stroke in which the pump piston 16 is moved outwardly from the chamber 18, the withdrawal of the pump piston 16 causes the one-way valve 14 to open with fluid to flow past annular rim 132 which is deflected radially inwardly into the inner compartment 111 in the chamber 18. In the withdrawal stroke, head disc 48 remains substantially undeflected and assists in creating a vacuum in the inner compartment 111 to deflect rim 132 and draw fluid past rim 132.

The head disc 48, on one hand, substantially prevents flow inwardly therepast in the withdrawal stroke and, on the other hand, deforms to permit flow outwardly therepast in the retraction stroke. The head disc 48 shown facilitates this by being formed as a thin resilient disc, in effect, having an elastically deformable edge portion near chamber wall 20.

When not deformed, head disc 48 abuts the chamber wall 20 to form a substantially fluid impermeable seal. When deformed, as by its edge portion 48*a* being bent away from wall 20, fluid may flow outwardly past the head disc. Head disc 48 is deformed when the pressure differential across it, that is, when the pressure on the upstream side is greater in the inner compartment 111 than the pressure on the downstream side in the outer compartment 112 by an amount greater than the maximum pressure differential which the edge portion of the head disc can withstand without deflecting. When this pressure differential is sufficiently large, the edge portion of the head disc deforms and fluid flows outwardly therepast. When the pressure differential reduces to less than a given pressure differential, the head disc 48 returns to its original inherent shape substantially forming a seal with the wall 20.

FIGS. 11 to 14 show different conditions the variable length intermediate portion 45 assumes in a cycle of operation. In this cycle of operation, the base portion 49 is moved in a retraction stroke from an extended position as seen in FIG. 11 to a retracted position as seen in FIG. 13. In a withdrawal stroke, the base portion 49 is moved from the retracted position of FIG. 13 to the extended position shown in FIG. 11.

FIG. 11 illustrates the pump piston 16 with the base portion 49 in the extended position and the pump piston 16 and its valve piston member 15 and its variable length intermediate portion 45 in an uncompressed condition. In the extended position and uncompressed condition of FIG. 11, the outer compartment 112 formed in the chamber 18 between the head disc 48 and base disc 49 is at a maximum volume. From FIG. 11, the base portion 49 is moved inwardly in a retraction stroke to assume the condition of FIG. 12 in which the pump piston 16, its valve piston member 15 and its variable length intermediate portion 45 are a compressed condition. On the base portion 49 moving inwardly in the chamber 18 from the position of FIG. 11, while the length of the variable length intermediate portion 45 is greater than its minimum length, resistance to movement of the head portion 47 and its head disc 48 inwardly in the chamber 18 is sufficient that the length of the variable length intermediate portion 45 decreases toward its minimum length as shown in FIG. 12 before the head portion 47 is moved inwardly in the chamber 18. Thus, in movement of the base portion 49 inwardly from the position of FIG. 11, compressive forces will be applied to the variable length intermediate portion 45 which forces will reduce the length of the variable length intermediate portion 45 until the compressive forces transferred by the variable length intermediate portion 45 are greater than the resistance to movement of the head portion 47 inwardly in the chamber. The compressive forces may be developed such that the variable length intermediate portion substantially decreases to its minimum length before the head portion 47 is substantially moved inwardly.

From the position shown in FIG. 12, with the variable length portion in the compressed condition, further inward movement of the base portion 49 in the retraction stroke moves the pump piston 16 with the variable length intermediate portion 45 maintained in the compressed condition inwardly to the position of FIG. 13 in which the base portion 49 is fully retracted and the variable length intermediate portion 45 is compressed. FIG. 13 thus represents a retracted position and compressed condition of the pump piston 16 in which the pump piston 16, its valve piston member 15 and its variable length intermediate portion 45 are compressed.

From the position of FIG. 13, in a withdrawal stroke, the base portion 49 is moved outwardly in the chamber. In movement of the base portion 49 from the position of FIG. 13 to the position of FIG. 14, while the length of the variable length intermediate portion 45 is less than the maximum length, resistance to movement of the head portion 47 and therefore its head disc 48 outwardly in the chamber 18 is sufficient that the length of the variable length intermediate portion 45 increases toward the maximum length before the head portion 47 is moved outwardly in the chamber 18. In this regard, in moving from the position of FIG. 13 to the position of FIG. 14, outward movement of the base portion 49 applies tension forces to the variable length intermediate portion 45. These tension forces will act on the variable length intermediate portion 45 expanding the variable length portion 45 until such time as the tension forces which are transferred by the variable length intermediate portion 45 from the base portion 49 the head portion 47 are greater than the resistance of the head portion for movement outwardly in the chamber. The tension forces may be developed such that the variable length intermediate portion 45 substantially increases to its maximum length before the head portion 47 is substantially moved outwardly.

From the position of FIG. 14, the withdrawal stroke is completed by movement to the position of FIG. 11. In moving from the position of FIG. 14 to the position of FIG. 11, the variable length intermediate portion 45 is maintained in the expanded condition with the variable length intermediate portion 45 at its maximum length and tension forces caused by movement of the base portion 49 are transferred via the variable length intermediate portion 45 to the head portion 47.

In a cycle of operation in moving from the position of FIG. 12 to the position of FIG. 13, the volume of the inner compartment 111 reduces and hence fluid is discharged from the inner compartment 111 past the head disc 48, through the tubular member 200 via the openings 212 through the passageway 52 out the outlet 54 since fluid within the chamber 18 is prevented from passing inwardly past the one way valve 14 and is prevented from passing outwardly past the base disc 50. In moving from the position of FIG. 11 to the position of FIG. 13, pressure is created within the inner compartment 111 which closes the one-way valve 14. Fluid within the inner compartment 111 becomes compressed by movement of the head disc 48 inwardly. Such pressure causes the deformable edge portion of the head disc 48 to deflect away from the chamber wall 20 thus permitting flow of fluid from the inner compartment 111 into the outer compartment 112. Since the volume of the outer compartment 112 remains the same in the compressed condition, any fluid which is passed outwardly past the head disc 48 causes fluid within the outer compartment 112 to be dispensed through the tubular member 200 via the openings 212 and through the passageway 52 out from the outlet 54.

In movement from the position of FIG. 13 to the position of FIG. 14, the volume of the outer compartment 112 increases. This increase in volume of the outer compartment 112 causes a drawback of fluid in the passageway 52 from the outlet 54 back into the outer compartment 112 with some fluid moving inwardly through the tubular member via the openings 212. This drawback may not only be a drawback of fluid in the passageway 52 but also possibly of any air existing in the passageway 52 or at the outlet 54.

To facilitate drawback of fluid, the relative nature of the head disc 48 and the base disc 50 and the engagement of each with the chamber wall 20 are preferably selected such that vacuum created within the outer compartment 112 will drawback fluid from the passageway 52 rather than deflect the head disc 48 to draw liquid from the inner compartment 111 past the head disc 48 into the outer compartment 112, or, deflect the base disc 50 to draw atmospheric air between the base disc 50 and the chamber wall 20.

In movement from the position of FIG. 14 to the position of FIG. 11, the volume in the outer compartment 112 is maintained substantially constant with the variable length portion 45 in a maximum length condition, however, movement of the head disc 48 outwardly increases the volume in the inner compartment 111 thus drawing fluid from the reservoir inwardly past the one-way valve 14 into the inner compartment 111.

The drawback pump assembly 10 in accordance with the present invention may be used in manually operated dispensers such as those in which, for example, the pump piston 16 is moved manually as by a user engaging an actuator such as a lever which urges the pump piston 16 either outwardly or inwardly. The drawback pump can also be used in automated systems in which a user will activate an automated mechanism to move the pump piston 16 in a cycle of operation.

A preferred arrangement for operation of the drawback pump assembly 10 in accordance with the present invention is for the pump assembly to assume a position between the condition shown in FIG. 14 and the condition shown in FIG. 11 as a rest position between cycles of operation. For example, in the context of a manual dispenser, the dispenser may be arranged such that the base portion 49 is biased to assume as a rest position between cycles of operation, the extended position seen in FIG. 11. A person would manually operate a lever to move the dispenser from the position of FIG. 11 to the position of FIG. 13. On release of the lever, a spring will return the lever and base portion 48 to the position of FIG. 11. In such a cycle of operation, on movement from the position of FIG. 11 to the position of FIG. 13, fluid is dispensed from the outlet 54. In a return stroke, for example, due to the bias of a spring, fluid in the passageway 52 is withdrawn in movement from the position of FIG. 13 to the position of FIG. 14 and the inner compartment 111 is filled in movement of the piston to the rest position of FIG. 11. In automated operation, a rest position between cycles may preferably be at some point in between the position of FIG. 14 and the position of FIG. 11.

The preferred embodiment illustrates the valve piston member 15 consisting of the piston head portion 47 and intermediate portion 45 as being formed from a unitary piece of plastic preferably by injection molding. It is to be appreciated that a similar structure could be formed with each of the head portion 47, base portion 49 and intermediate portion 45 being separately formed. Also the variable length intermediate portion 45 could be formed together with either or both of the head portion 47 and the base portion 49 as a unitary piece of plastic.

In the context of the embodiment of FIGS. 1 to 14, preferably the tubular member 200 has an inherent unbiased condition when molded.

An assembled pump piston 16 will have an inherent unbiased condition as seen in FIG. 2 which it will assume when no axial forces are applied to it. The inherent unbiased condition of the pump piston 16 depends on the inherent unbiased condition of the head portion 47, the base portion 49 and the intermediate portion 45. In the preferred embodiment, effectively only the tubular member 200 is axially deformable.

In the preferred embodiment of FIGS. 1 to 14, when the pump piston 16 is in the unbiased inherent condition, the tubular member 200 is either in its unbiased inherent condition or slightly compressed from its unbiased inherent condition. In FIG. 2, if the tubular member 200 is in its unbiased inherent condition, then the axial length between the outer end 204 of the tubular member 200 and the catching surface 35 on the head stem 30 is equal to the axial length between the groove 301 on the base portion 49 and the catch surface 290 on the base portion 49.

In FIG. 2, if the tubular member 200 is in a condition compressed from its unbiased inherent condition, then the axial length between the outer end 204 of the tubular member 200 and the catching surface 35 on the head stem 30 is less than the axial length between the groove 301 on the base portion 49 and the catch surface 290 on the base portion 49.

The tubular member 200 is axially compressible from the inherent unbiased condition to assume conditions in which its axial length is reduced compared to the inherent unbiased condition. When deformed to a reduced length condition and released, the tubular member returns to its inherent unbiased condition. Depending on the configuration of the tubular member 200 in the inherent unbiased condition, the tubular member can also be axially expandable from the inherent unbiased condition to a stretched position in which its axial length is increased compared to the inherent unbiased condition. For example, if the wall of the tubular member is in the inherent unbiased condition, not straight but bowed, then on applying axial tension forces, the wall may be deformed against its bias to become straight increasing the axial length. As another example, if the wall of the tubular member is straight in the inherent unbiased condition, for example, frustoconical, then the tubular member cannot be stretched and has its maximum axial length as the inherent unbiased condition. When the piston 16 in its unbiased inherent condition, having the tubular member 200 compressed has the advantage that the inherent bias of the tubular member 200 will assist in ensuring that the outer end 204 of the tubular member 200 is maintained and urged into engagement with the groove 301.

The tubular member 200 is selected so as to provide the head portion 47 and its head disc 48 maintained coaxially arranged within the chamber.

The preferred embodiment of FIG. 1 illustrates a four-piece pump having as the four pieces, the body 12, the one-way valve 14 and the two-piece pump piston 16, and in which the chamber 18 in the body 12 has a constant diameter. The invention of the present application is also adaptable for use with two piece pumps having a stepped chamber. Such pumps have been disclosed in U.S. Pat. No. 5,676,277 to Ophardt, issued Oct. 14, 1997, the disclosure of which is incorporated herein by reference.

Figure 15:
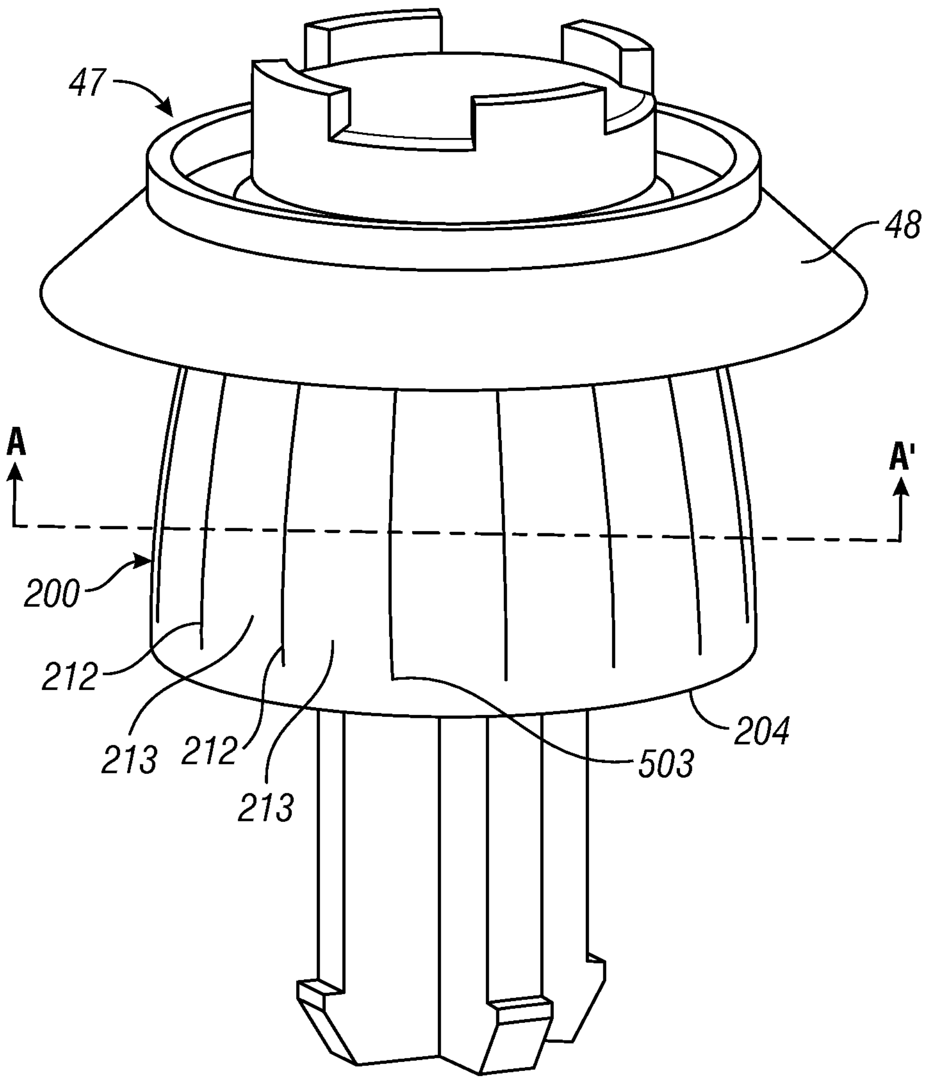
FIG. 15 is a pictorial view similar to FIG. 5 but of a second embodiment of a valve piston member adapted for substitution for the valve piston member in FIG. 5 and showing the valve piston member in an uncompressed condition.
Figure 16:
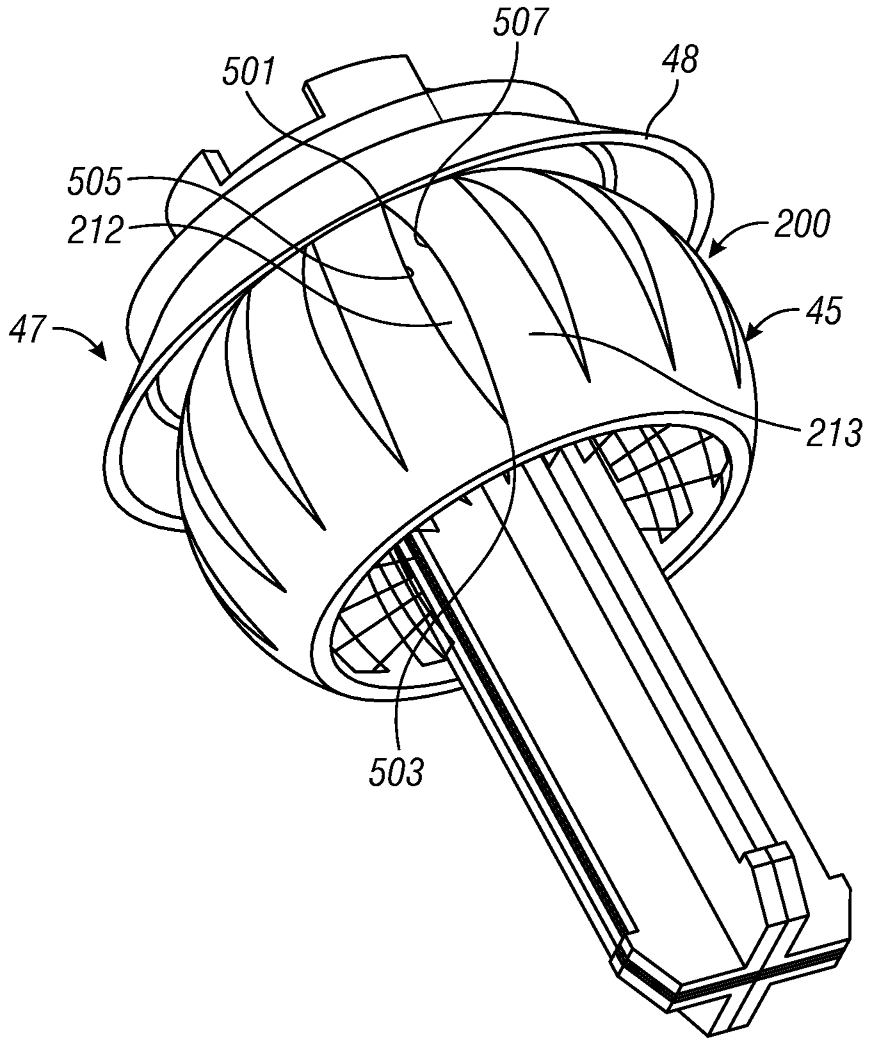
FIG. 16 is a pictorial view of the valve piston member of FIG. 15 in a compressed condition.
Figure 17:
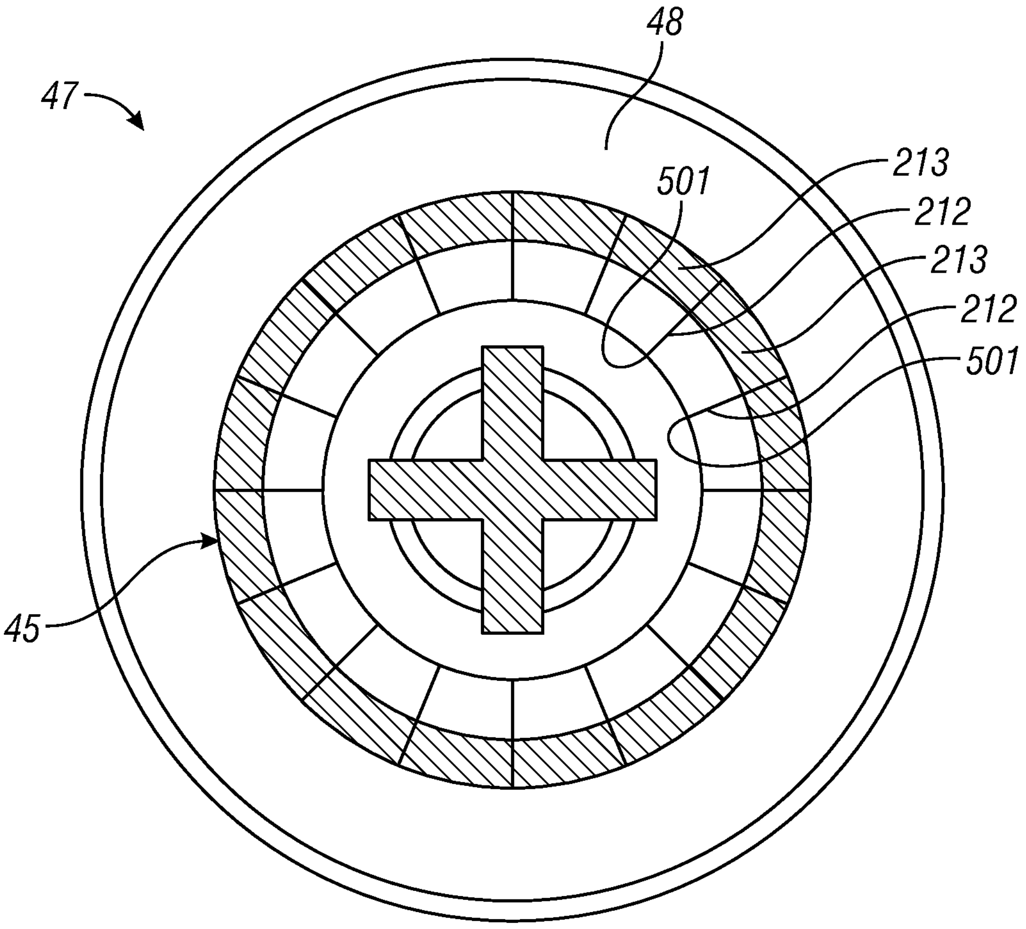
FIG. 17 is a cross-sectional end view similar to FIG. 6 but of the valve piston member of FIG. 15 along section line A-A' in FIG. 15.

Reference is made to FIGS. 15 to 17 showing a second embodiment in which a valve piston member 15 comprising a head portion 47 and a variable length intermediate tubular portion 45 is adapted for use with a base portion 49 identical to that shown, for example, in FIG. 1 with the first embodiment. In the second embodiment of FIGS. 15 to 17, the only difference over the first embodiment of FIGS. 1 to 14 is the configuration of the openings 212. As can be seen in FIGS. 15 and 16, each of the side surfaces 507 and 509 which define the openings 212 therebetween converges at a common inner point 501 and at a common outer point 503. FIG. 15 illustrates a condition in which the axial length of the tubular member 200 is greater than the axial length of the tubular member 200 in FIG. 16.

As can be seen in FIG. 15, each of the side surfaces 503 and 507 abut each other so as to close the openings 212 to prevent fluid flow therethrough. With the reduction in the axial length of the tubular member 200 from the position of FIG. 15 to the position of FIG. 16, the concavity of the outer surface 210 of the tubular member 200 increases and the side surfaces 505 and 507 come to have the circumferential extent to which they are spaced increase such that the openings 212 become of increased cross-sectional area. Thus, whereas in FIG. 16 a passage is formed through each opening 212 of a given cross-sectional area, in FIG. 15, the cross-sectional through any passage is reduced to zero as best seen in FIG. 17 in cross-section.

The second embodiment illustrated in FIGS. 15 to 17 may be manufactured in a number of ways. As one method, the wall of the tubular member 200 could be made initially without any openings 212 therethrough, and thereafter axially extending slits may be cut through the wall at each place where an opening 212 is desired. Each slit that is cut preferably would extend in a flat plane which includes a central axis 22 and extends radially outwardly therefrom through the wall. Where the slits are cut in an unbiased condition of the tubular member 200, the openings 212 would be closed. Adopting the pump piston 16 with an arrangement in which the pump piston 16 is in an unbiased condition when the tubular member 200 is in an unbiased condition or a stretched condition would result in the openings being closed when the pump piston is in the unbiased condition.

Figure 18:
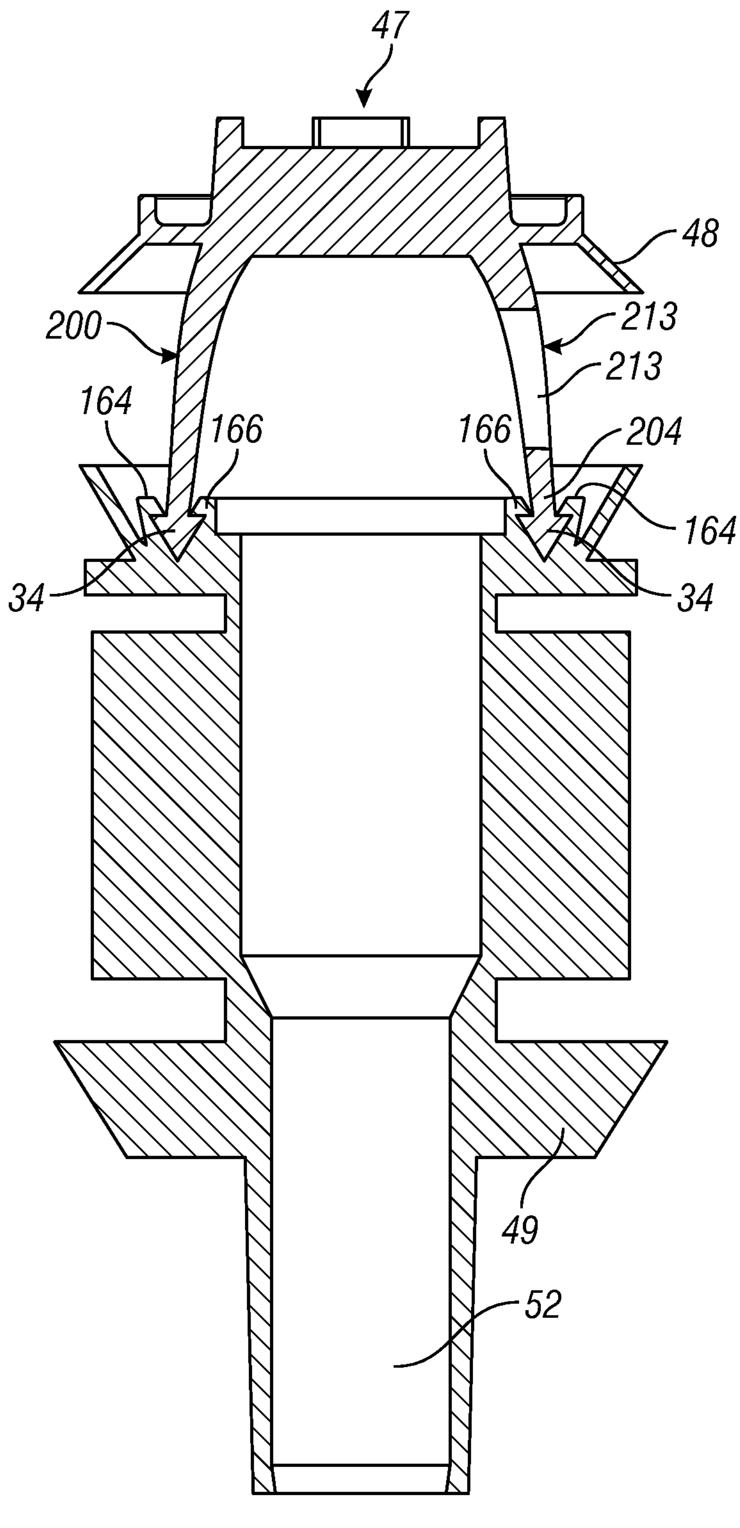
FIG. 18 is a cross-sectional side view similar to FIG. 2 but of a third embodiment of a piston pump adapted for substitution for the pump piston in FIG. 1 and with the valve piston member in an uncompressed condition.

Reference is made to FIG. 18 which shows a fourth embodiment of a piston pump in accordance with the present invention. The fourth embodiment of FIG. 18 is substantially identical to the first embodiment of FIG. 2 with a first exception that the head stem 30 of the valve piston member 15 of the first embodiment has been removed and is replaced by a hooking member 34 carried on the annular outer end 204 of the tubular member 200. The hooking member 34 is arrow head shaped and has axially inwardly directed catching surfaces 35 which extend both radially outwardly on an outer prong 160 and radially inwardly on an inner prong 161.

As seen in FIG. 18, annularly about the opening of the base portion 49, two hook members are provided as firstly an annular axially inwardly extending resilient finger member 164 with a distal end which extends radially inwardly to provide an axially outwardly directed catch surface to engage the catching surface 35 of the outer prong 160 and secondly an annular axially inwardly extending resilient finger member 166 with a distal end which extends radially outwardly to provide an axially outwardly directed catch surface to engage the catching surface 35 of the inner prong 161. Engagement between the hooking member 34 and the finger members 164 and 166 couples the tubular portion 200 of the valve piston member 15 to the base portion 49 in a snap fit relation against axial removal.

The hooking member 34 has angled camming surfaces on each radially inward and radially outward side outwardly of the catching surfaces to urge the fingers 164 and 166 radially apart in insertion. While two fingers 164 and 166 are shown only one is necessary.

Operation of the embodiment illustrated in FIG. 18 is the same as the embodiment in FIG. 1. Since the outer end 204 of the tubular member 200 comprising an annular ring extending circumferentially 360 degrees, the outer end 204 is of assistance in maintaining the tubular portion 200 and the head portion 47 disposed coaxially about the axis 22 within the chamber. Preferably, in an embodiment as illustrated in FIG. 18 and in the other embodiments, the tubular member 200 is symmetrical about the central axis 22 such that with axial compression and expansion of the resilient tubular member 200, the tubular member has an inherent bias to maintain itself coaxially disposed about the central axis 22 which, particularly with the embodiment of FIG. 18, can avoid the need for other coaxial locating devices such as the head stem which in the other embodiments serves to assist in coaxially locating the head portion 47 coaxially slidable relative to the base portion 49.

Figure 19:
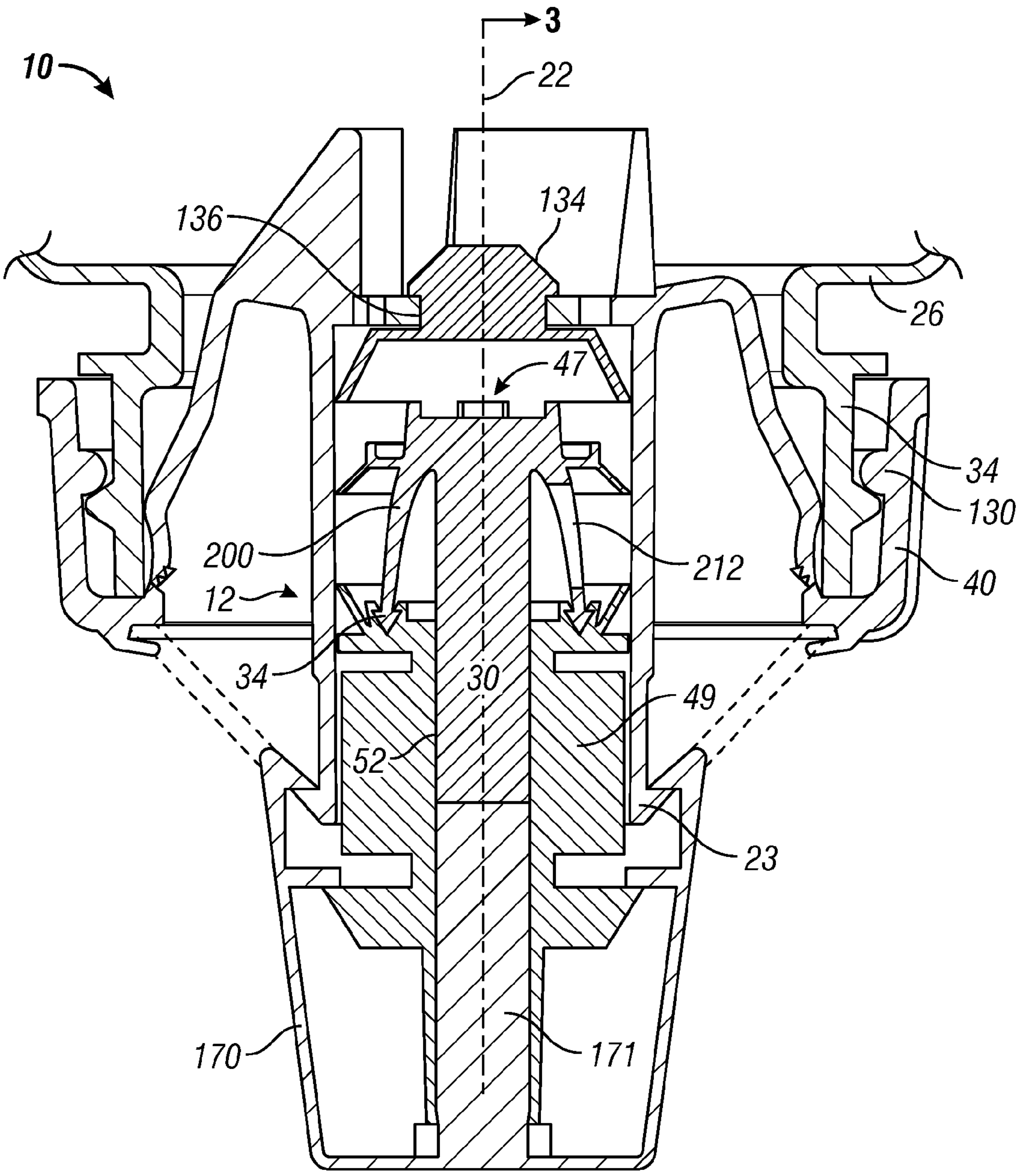
FIG. 19 is a cross-sectional side view similar to FIG. 1 but of a fourth embodiment of a pump and with the pump piston in an extended position and a valve piston member in an uncompressed condition.

Reference is made to FIG. 19 which shows a fourth embodiment of a pump assembly 10 in cross-section which uses a pump piston 16 with a valve piston member 15 with a head portion 47 as in the second embodiment in FIGS. 15 to 17 in which the openings 212 through the tubular members 200 close. In FIG. 19, in a manner identical to the embodiment of FIG. 18, the outer end 204 of the tubular member 200 carries a hooking member 34 adapted to engage in a hook member carried on the base portion 49 at an inner end of the base portion annularly about the inner opening of the base passageway 52.

In the embodiment of FIG. 19, the valve piston member 15 and its head portion 47 continue to include a cross shaped head stem 30 similar to that shown in the first embodiment, however, which head stem 30 does not carry the hooking members 34. In the embodiment of FIG. 19, the pump piston 16 is illustrated as being within body 12 attached to a bottle 26 similar to that shown in FIG. 1 attached to a bottle 26. In addition, a removable closure cap 170 is provided which engages the body 12 in a snap-fit relation as by a radially inwardly extending hook ring on the cap 170 engaging a radially outwardly extending hook ring about an outer end 23 of the chamber wall 20. The cap 170 engages the engagement flange 62 to stop the base portion 49 from movement outwardly. The cap 170 has a center post 171 which extends into the passageway 52 of the base stem 46 to engage an outer end of the head stem 30 in a position that maintains the tubular portion 200 with its opening 212 closed preventing fluid flow outwardly. Fluid flow outwardly can also be prevented by the center post 171 preventing flow out the outlet 54. In the embodiment of FIG. 19, the openings 212 of the tubular member 200 could be formed as by injection molding at the time of forming the tubular member 200. These openings 212 are to be closed on applying the cap 170 by the tubular member 200 being stretched by engagement of the center post 171 to have the axial length of the tubular member 200 increased from the inherent unbiased condition. In the embodiment of FIG. 19, the tubular member 200 could have the openings 212 open to provide fluid flow when the piston 16 is in an unbiased inherent condition. On applying the cap 170, the cap urges the head stem 30 inwardly to increase the length of the tubular portion 200 and close the openings 212.

Figure 20:
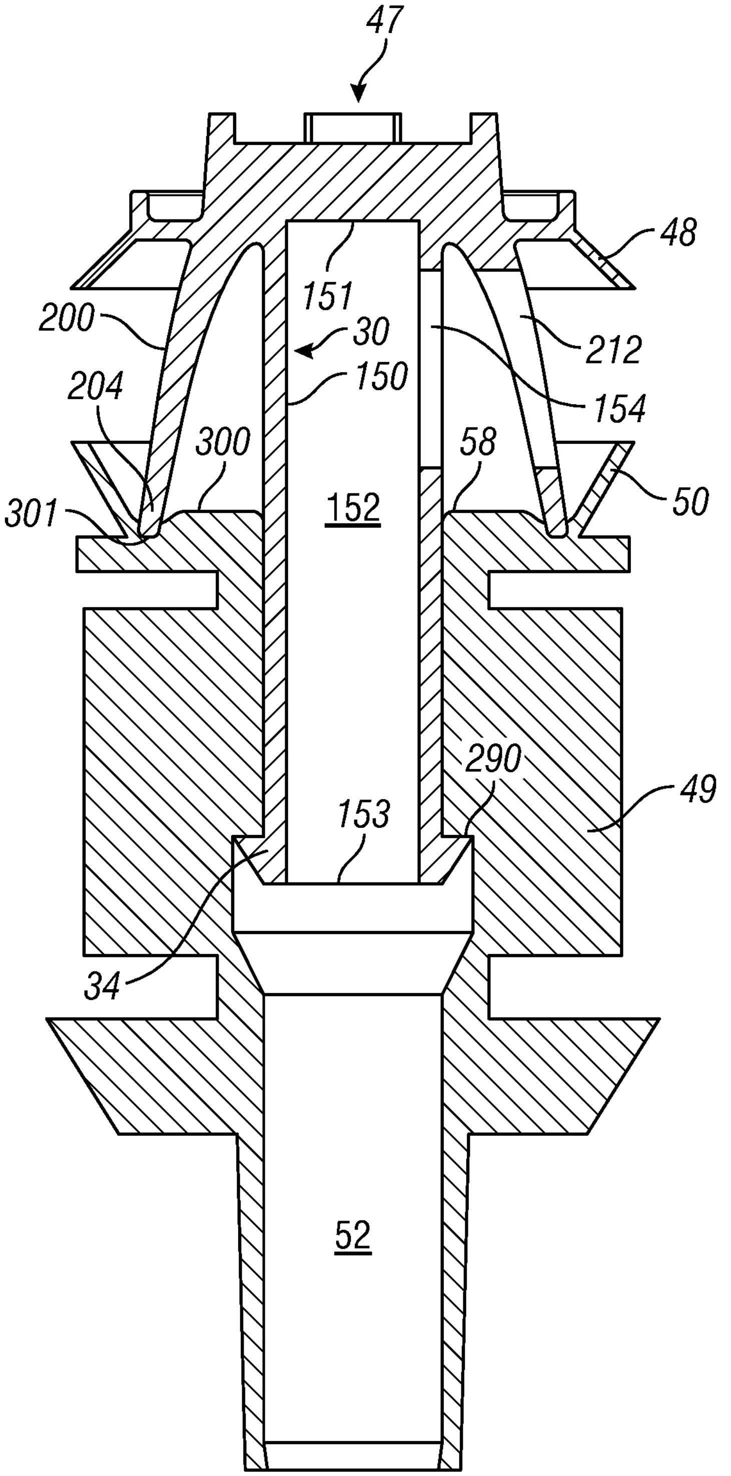
FIG. 20 is a cross-sectional side view similar to FIG. 2 but of a fifth embodiment of a pump piston adapted for substitution for the pump piston in FIG. 1 and with the valve piston member in an uncompressed condition.

Reference is made to FIG. 20 which shows a fifth embodiment of the present invention. The fifth embodiment of FIG. 20 is identical to the first embodiment of FIG. 1 with the exception that the head stem 30 shown in the first embodiment to have an X-shape in cross-section is replaced by a tubular head stem 30 in the embodiment of FIG. 20. The tubular head stem 30 is formed with a cylindrical wall 150 and provides a head stem passageway 152 coaxial therethrough, closed at an inner end 151 and open at an outer end 153. A hooking member 34 is provided to extend radially outwardly from the exterior surface of the tubular head stem 30 and provide an axially inwardly directed catching surface 35 for engaging with the catch surface 290 on the base portion 49. One or more apertures 154 are provided through the wall 150 of the tubular head stem 30 to permit fluid flow from within the chamber 18 into the head stem passageway 152 through the tubular head stem 30 and hence into the base stem passageway 52 of the stem of the base portion to the outlet 54.

Figure 21:
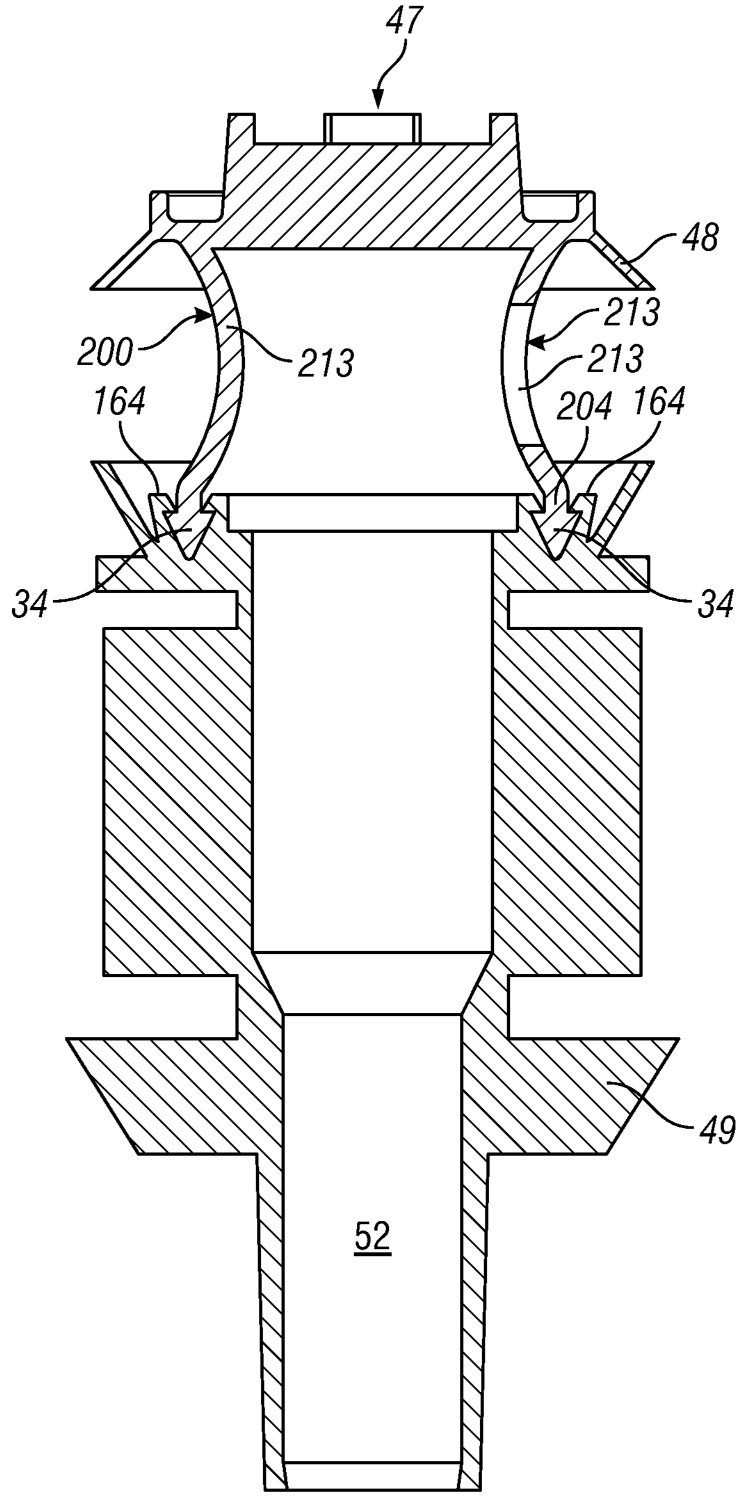
FIG. 21 is a cross-sectional view similar to FIG. 18 of a sixth embodiment of a pump piston for use in substitution of the pump piston in FIG. 1.

Reference is made to FIG. 21 which shows a sixth embodiment of a piston pump in accordance with the present invention. The embodiment of FIG. 21 is substantially the same as the embodiment illustrated in FIG. 18 with the exception that the wall 206 of the tubular member 200 when compressed assumes an hourglass shape as seen in side in which the outer surface 210 of the wall is convex. The extent to which the outer surface 210 is convex increases as the axial length of the tubular member 200 decreases. The openings 212 through the tubular member 200 are to be provided such that they provide for flow as desired through the wall when the tubular member 200 is compressed. The openings 212 can have configurations which, when uncompressed, the openings are closed and, when compressed, the openings are open with increased cross-sectional area.

With an hourglass shape as shown in FIG. 21, a maximum reduction in the axial length of the tubular member 200 can be a configuration in which the inner surface 208 of the webs 213 on opposite sides of the tubular member 200 engage, or in versions in which a head stem 30 is provided, the inner surfaces 208 of the webs 213 engage the head stem. Similarly, in an embodiment in accordance with the first embodiment where the tubular member 200 expands radially outwardly, a limit on reduction of the axial length of the tubular portion 200 can be a position in which the outer surface 210 of the webs 213 extend radially outwardly to engage the wall 20 of the chamber 18.

The preferred embodiment in FIG. 1 illustrates the openings 212 through the wall 206 of the tubular member 200 as being identical openings evenly spaced circumferentially about the central axis 22. This is not necessary. Some openings 212 may be larger than other openings 212, however, a preferred configuration would be with openings 212 of comparable size symmetrically arranged relative to the central axis 22 to assist in maintaining the tubular member 200 coaxial about the central axis 22 with deflection. Insofar as it may be desired to permit the head disc 48 to tilt relative to the central axis 22, it is possible to provide openings 212 through the tubular member 200 asymmetrically about the axis such that the tubular member 200 will have a tendency when being compressed to adopt a configuration which tends to tilt the head portion to lie disposed at an angle to the central axis 22, as can be of assistance to reduce restriction to flow fluids past the head disc 48.

Figure 22:
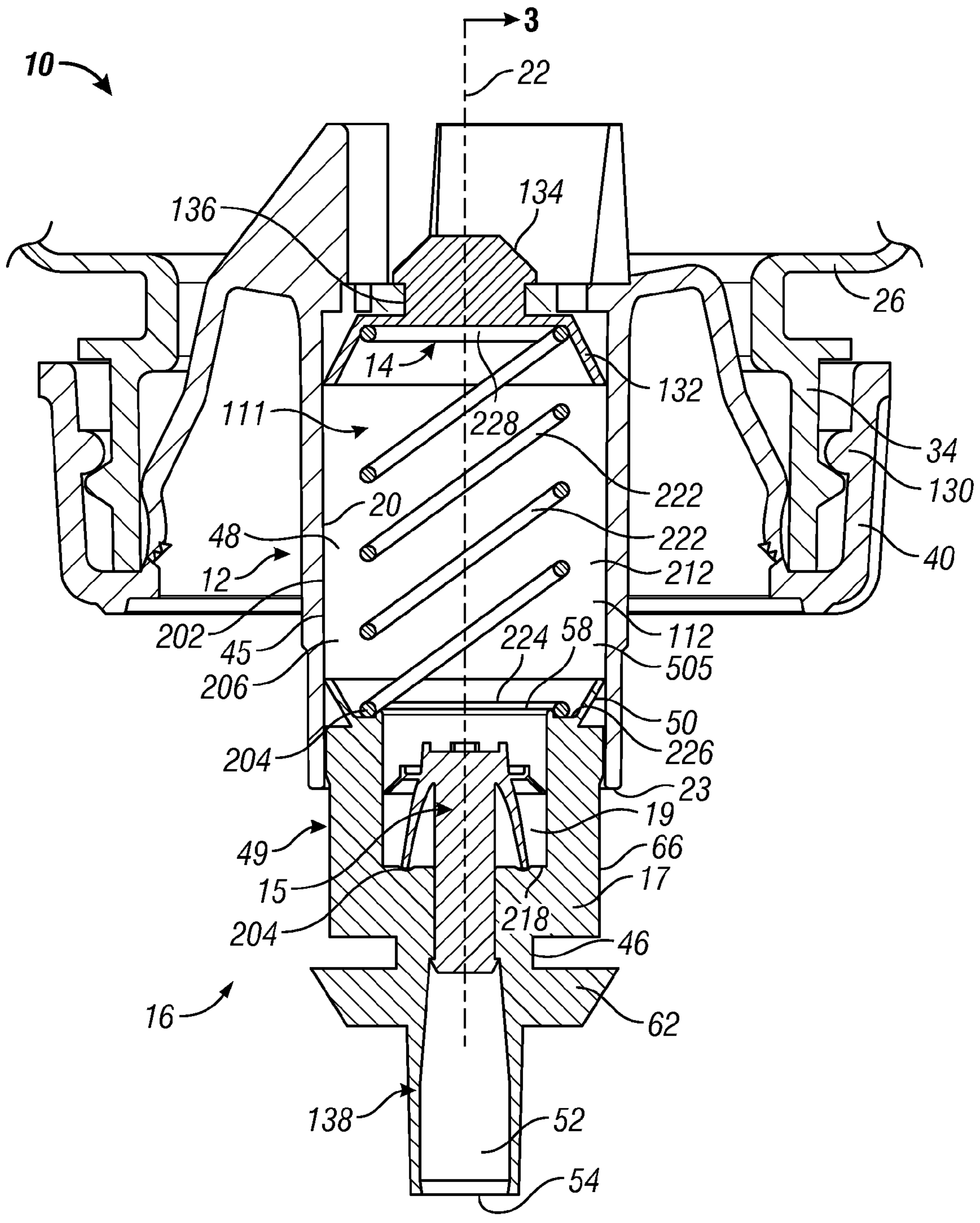
FIG. 22 is a cross-sectional view of a pump in accordance with the seventh embodiment of the invention with the pump piston in an extended position and a valve piston member in an uncompressed condition.

Reference is made to FIG. 22 which shows a seventh embodiment of a piston pump assembly 10 in accordance with the present invention. The embodiment of FIG. 22 has many similarities to the embodiment illustrated in FIG. 1 and similar reference numerals are used to refer to similar elements. The pump piston 16 continues to be formed from two elements, namely, the valve piston member 15 and the valve body 17. The valve body 17 is modified over that shown in FIG. 1 so as to have the central passageway 52 through the valve body 17 enlarged so as to provide a valve piston chamber 19 opening axially inwardly through the inlet end 58 and ending at an axially inwardly directed chamber shoulder 218.

The valve piston member 15 in FIG. 22 is identical to that shown in FIG. 5, however, of reduced relative size compared to that shown in FIG. 1 such that the head portion 47 and its head disc 48 are coaxially slidable within the valve piston chamber 19 with an edge portion of the head disc 48 to engage an inner cylindrical chamber wall 220 of the valve piston chamber 19 of the valve body 17 in FIG. 22 in the same manner that in FIG. 1 the edge portion of the head disc 48 engages the chamber wall 20 of the chamber 18 in the body 12. The outer end 204 of the tubular member 200 forming the intermediate portion 45 engages the chamber shoulder 218 of the valve body 17. The relative functioning of the valve piston member 15 in the embodiment of FIG. 22 is substantially the same as is the case in the embodiment of FIG. 1 with, however, the notable exception that the edge portion of the head disc 48 engages the chamber wall 220 of the valve body 17 rather than the chamber wall 20 of the body 12.

As can be seen in FIG. 22, a helical coil spring 222 is provided coaxially within the chamber 18 and adapted to bias the valve body 17 axially outwardly from the chamber 18 as by having an axial outer end 224 of the spring 222 engage the valve body 17 at an axially inwardly directed shoulder 226 on the valve body 17 radially outwardly of the opening to the valve piston chamber 19. An inner end 228 of the spring 222 is shown to engage a central non-deflecting portion of the one-way inlet valve 14. Thus, the configuration of the pump piston 16 in FIG. 22 facilitates the use of the internal spring 222 to bias the pump piston 16 outwardly, however, such an internal spring 222 is not necessary.

Figure 23:
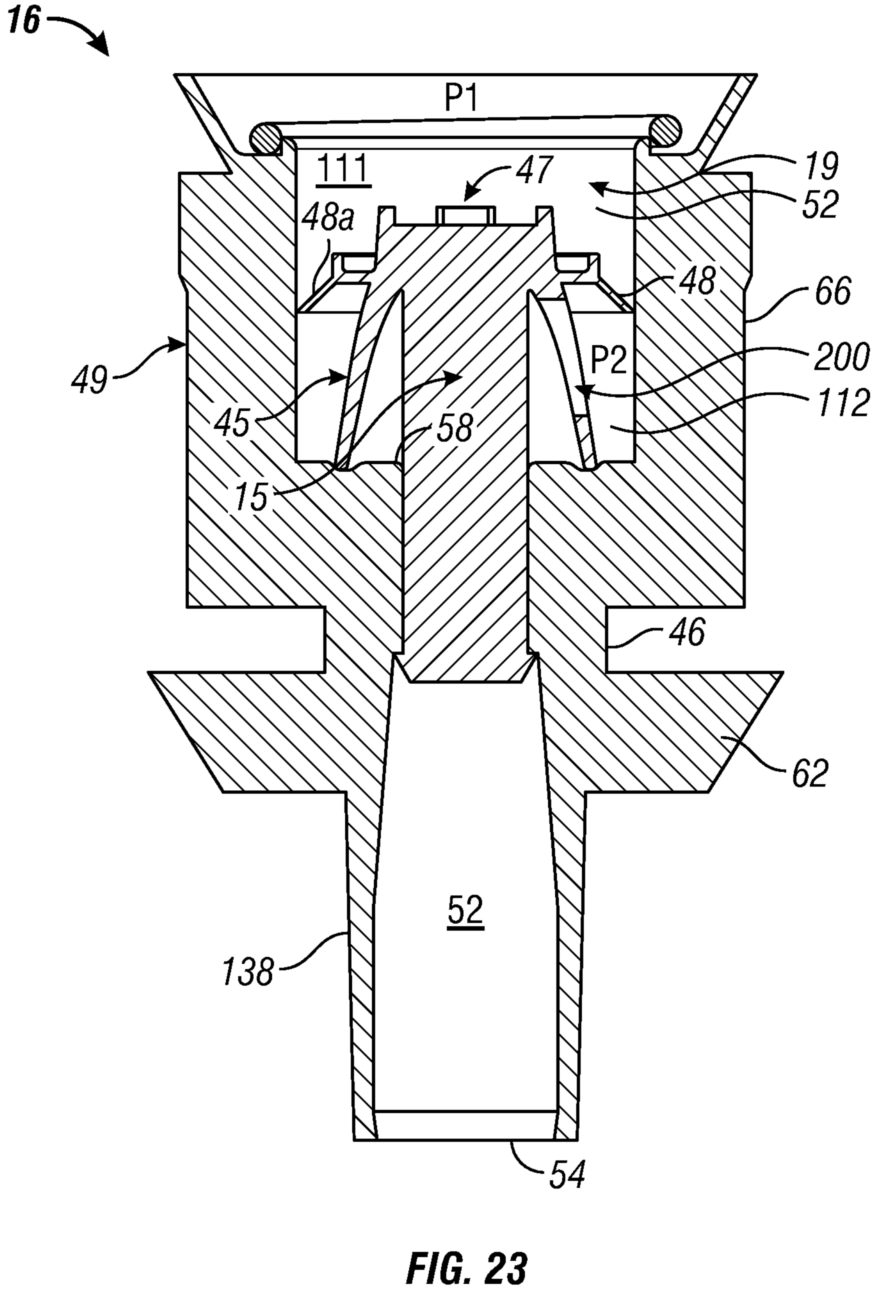
FIG. 23 is a cross-sectional side view of the pump piston of the pump shown in FIG. 22 with the valve piston member in the same uncompressed condition as in FIG. 22.
Figure 24:
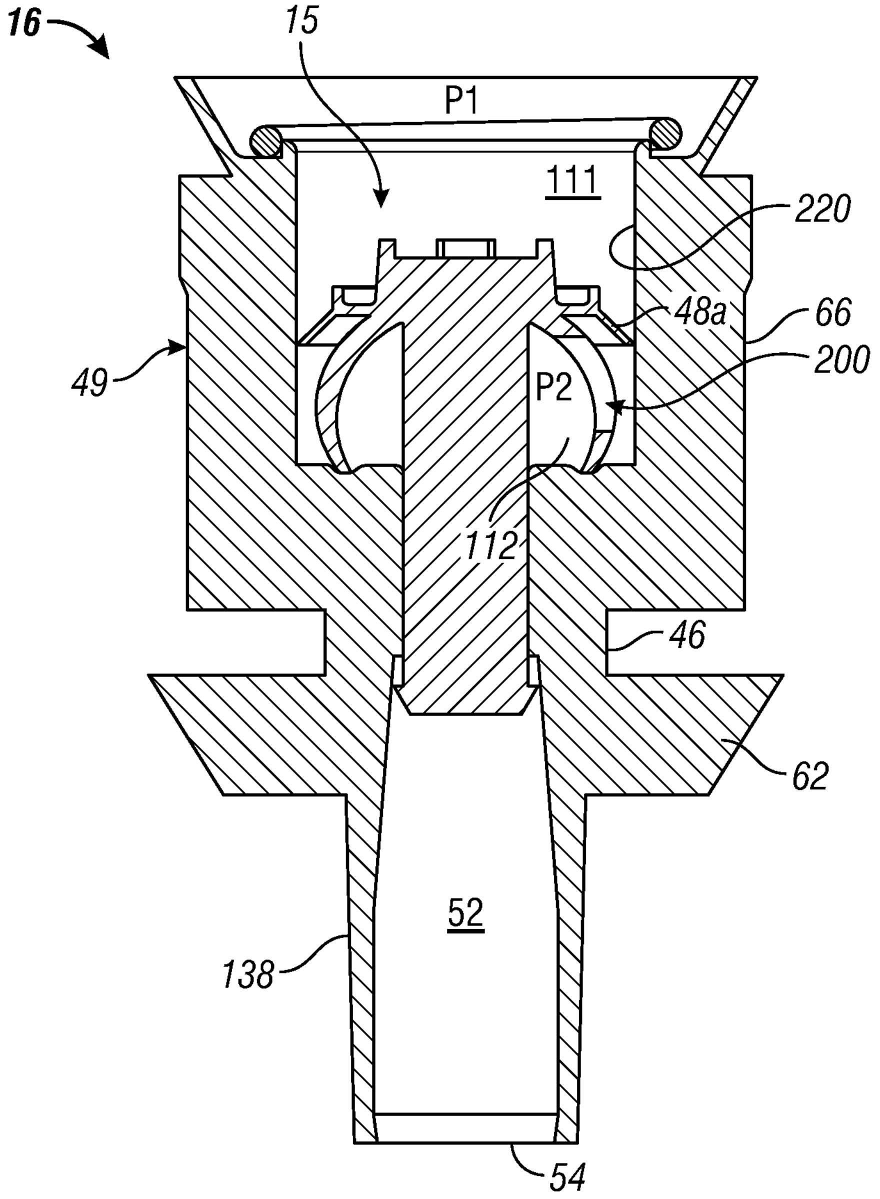
FIG. 24 is a cross-sectional side view of the pump piston as in FIG. 22 but with the valve piston member in a first compressed condition.
Figure 25:
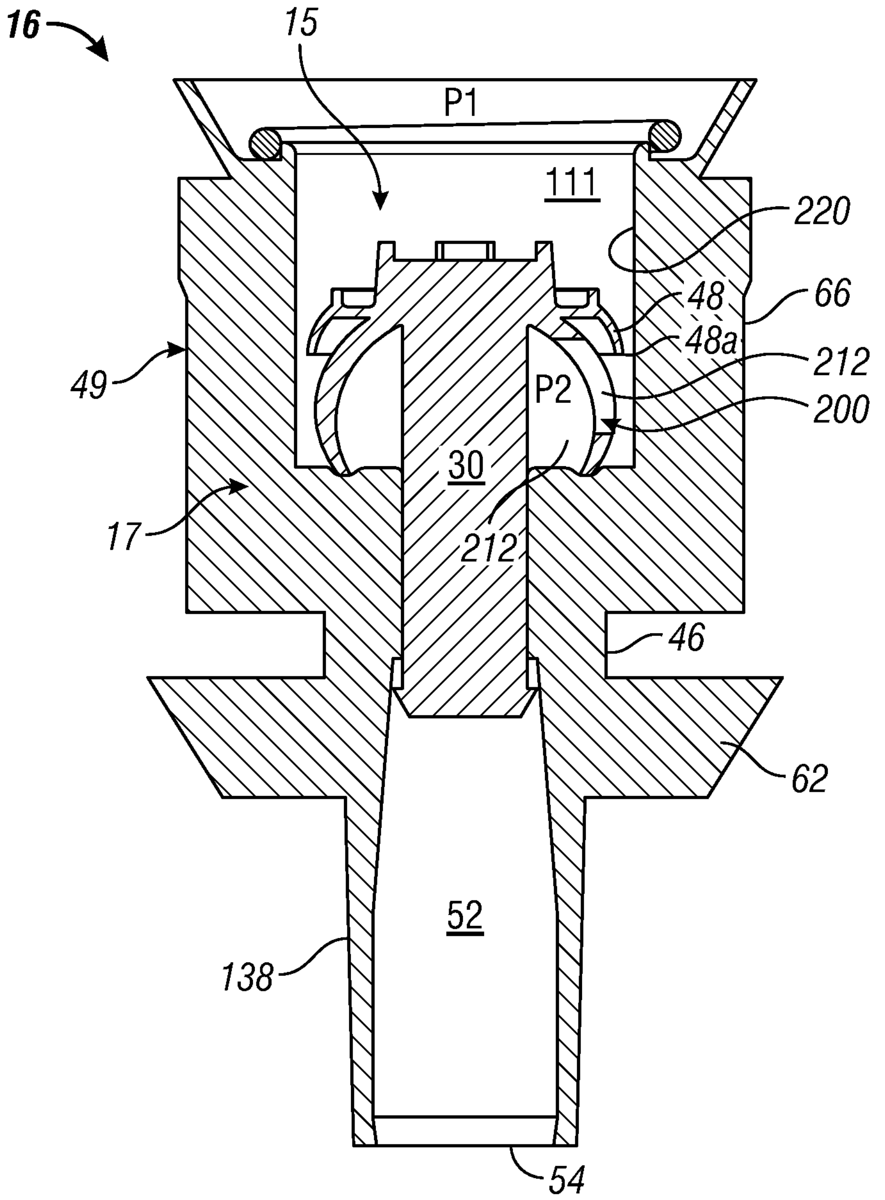
FIG. 25 is a cross-sectional side view of the pump piston as in FIG. 22 but with the valve piston member in a second compressed condition.

A preferred configuration and operation of the embodiment of FIG. 22 is now described with reference to FIGS. 23, 24 and 25. In each of these Figures, reference P1 identifies a pressure of fluid in the passageway 52 on an axial upstream side of the head disc 48 of the head portion 47 in the inner compartment 111 and reference P2 is a pressure of the fluid in the passageway 52 on an axial downstream side of the head disc 48 of the head portion 47 in the outer compartment 112. A pressure differential across the head disc 48 of the head portion 47 is measured as the upstream pressure P1 minus the downstream pressure P2. In one preferred configuration, the tubular member 200 of the intermediate portion 45 acts as a spring member which is deflectable from an unbiased position as shown in FIG. 23 to biased positions such as shown in FIGS. 24 and 25 with the tubular member 200 being resilient and having an inherent bias to assume the unbiased position in FIG. 23 in which the tubular member 200 extends an axial distance equal to an unbiased length. The tubular member 200 is deflectable from the unbiased position of FIG. 23 to biased positions such as shown in FIGS. 24 and 25 in which the length of the tubular member 200 is different than the unbiased length in FIG. 23. The tubular member 200 is deflectable from the unbiased position shown in FIG. 23 to a first biased position shown in FIG. 24 when the pressure differential across the head disc 48 is equal to a first pressure level.

The peripheral circumferential edge portion 48*a* of the head disc 48 on the head portion 47 is elastically deformable between an unbiased condition and biased condition wherein in the unbiased condition, the edge portion engages the chamber wall 220 of the valve piston chamber 19 to prevent fluid flow therepast and in biased positions, the edge portion elastically deflects away from the chamber wall 220 to permit fluid flow therepast. Preferably, the edge portion of the head disc 48 assumes it unbiased condition when the pressure differential across the head disc 48 is less than or equal to the first pressure level. The edge portion of the head disc 48 assumes biased conditions to permit fluid flow therepast when the pressure differential exceeds the first pressure level.

FIG. 23 illustrates a condition in which the pressure differential is less than the first pressure level. FIG. 24 illustrates a condition in which the pressure differential is equal to the first pressure level and, as can be seen, the spring-forming tubular member 200 has been moved from an unbiased position as seen in FIG. 23 to assume a biased condition in FIG. 24. In FIG. 24, however, the edge portion 48*a* of the head disc 48 continues to engage the chamber wall 220 to prevent fluid flow therebetween.

FIG. 25 illustrates a condition in which the pressure differential exceeds the first pressure level. As can be seen in FIG. 25, the edge portion 48*a* of the head disc 48 has been deflected radially inwardly from the chamber wall 220 permitting fluid flow outwardly therepast. In FIG. 25, fluid may flow outwardly past the head disc 48 through the openings 212 of the tubular member 200 and out through the passageway 52 between the arms 32 of the head stem 30.

In a cycle of operation, from the position of FIG. 23, on an inward retraction stroke of the pump piston 16, pressure P2 is increased with the increase in pressure P1 deflecting the spring forming tubular member 200 to the position of FIG. 24 as the pressure differential across the head disc 48 reaches the first pressure level. With continued inward movement of the pump piston 16, the pressure differential continues to increase until the pressure differential exceeds the first pressure level and, as seen in FIG. 25, the head disc 48 is displaced inwardly from the chamber wall 202 to prevent fluid flow outwardly therepast as seen in FIG. 25. Once the pressure differential across the head disc 48 may become reduced to being equal to or less than the first pressure level, as may occur if the valve body 17 may ceased to be moved axially outwardly then, firstly, head disc 48 reverts to an unbiased condition in which it prevents fluid flow outwardly therepast as the pressure differential drops to the first pressure level to adopt a position as shown in FIG. 24 and, subsequently, with a further drop in the pressure differential to being less than or equal to the first pressure level, the spring forming tubular member 200 assuming an unbiased position as shown in FIG. 23. In the operation of the pump assembly 10, the cycle of operation with the pump piston 16 being moved axially outwardly in a withdrawal stroke and axially inwardly in a retraction stroke, the valve piston member 15 will move in a cycle from the position of FIG. 23 to the position of FIG. 24 to the position of FIG. 25, returning to the position of FIG. 24 and subsequently returning to the position of FIG. 23. In this cycle of operation, in movement of the valve piston member 15 from the position of FIG. 24 to the position of FIG. 23, the head disc 48 engages the valve piston chamber 19 to prevent fluid flow therebetween and due to an increase in volume of the outer compartment 112 formed in the valve piston chamber 19 outwardly of the head disc 48 fluid is drawn back from the passageway 52 into the valve piston chamber 19. This drawback of fluid can be advantageous to prevent fluid in the passageway 52 at the outlet 58 from being available to drip under gravity out of the discharge outlet 54.

Figure 26:
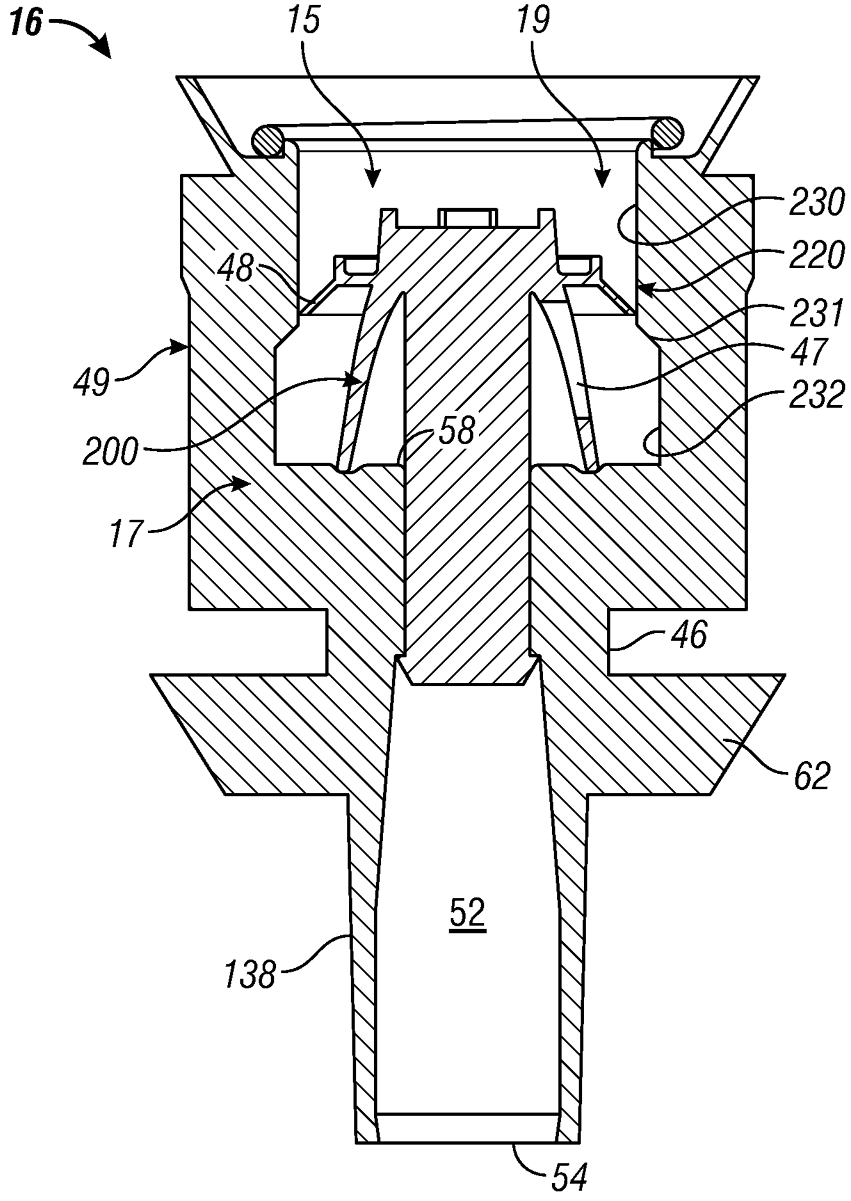
FIG. 26 is a cross-sectional side view of an eighth embodiment of a pump piston for use in the pump shown in FIG. 22 with a valve piston member in an uncompressed condition.

Reference is made to FIG. 26 which shows a pump piston 16 in accordance with an eighth embodiment of the present invention which is identical to that illustrated in FIG. 23 with the exception that the valve piston chamber 19 has a chamber wall 220 which is stepped rather than being merely cylindrical as illustrated in FIG. 23. As can be seen in FIG. 26, the chamber wall 220 includes an axially inner portion 230 of a first diameter, an axially outer portion 232 of a second diameter joined by an intermediate transition portion 231 which is shown to be frustoconical. In the embodiment of FIG. 26, as the pressure differential across the head disc 48 increases and the spring forming tubular member 200 is compressed and reduces in axial length from an unbiased position to biased positions, fluid flow is permitted to occur past the head disc 48 by either one or both of: (1) deflection of the edge portion of the head disc 48 when the pressure differential exceeds the first pressure level and (2) axial movement of the head portion 47 with deflection of the tubular member 200 such that the head disc 48 is displaced axially outwardly to a location within the transition portion 231 or axially outer portion 232 where the radial extent of the chamber wall 220 is greater than the radial extent of the head disc 48. Otherwise, operation of a piston pump assembly utilizing the pump piston 16 shown in FIG. 26 is the same as that discussed with respect to the embodiment of FIG. 22.

Figure 27:
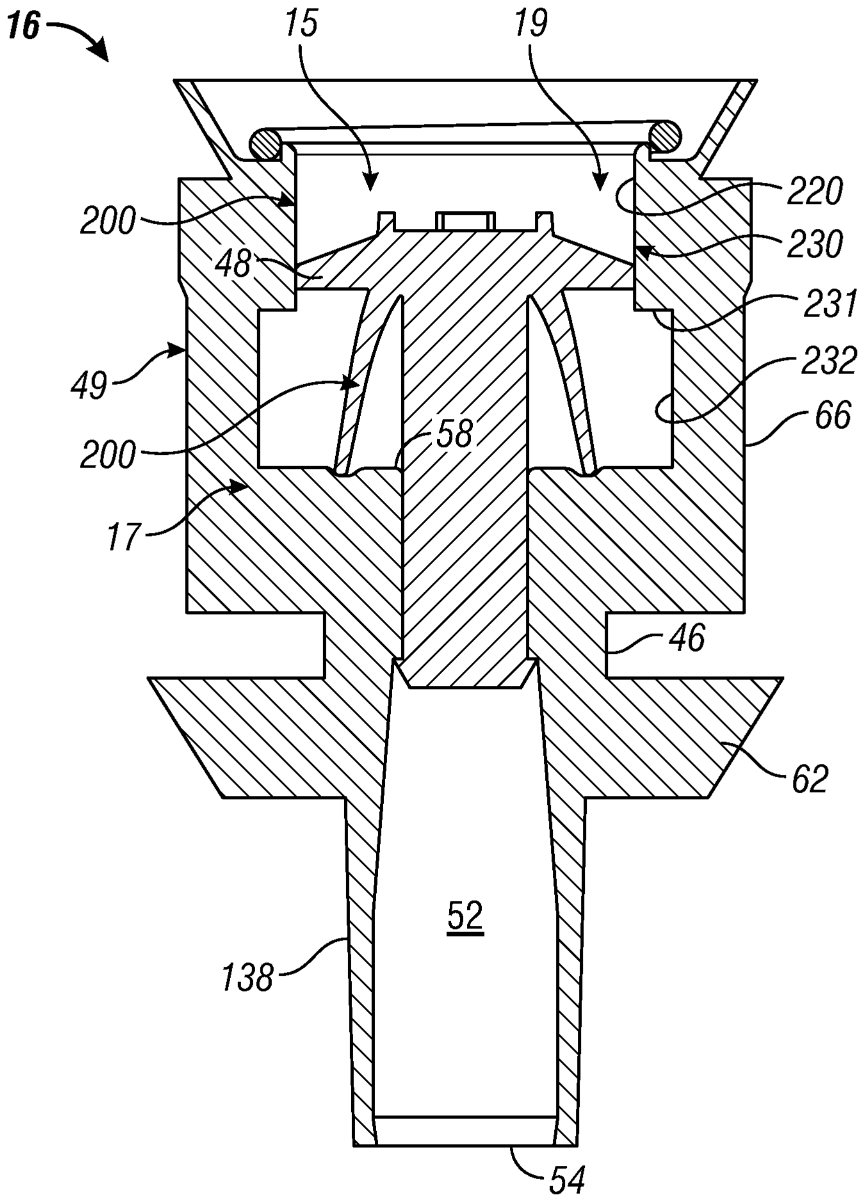
FIG. 27 is a cross-sectional side view of a ninth embodiment of a pump piston for use in the pump shown in FIG. 22 with a valve piston member in an uncompressed condition.

Reference is made to FIG. 27 which shows a ninth embodiment of a pump piston 16 identical to that shown in FIG. 26 but for the modification of the chamber wall 220 to show the transition portion 231 as being formed as a radially extending axially outwardly directed shoulder, and to replace the head disc 48, as seen in FIG. 26, with a modified head disc 48 having a substantially increased axial dimension such that the head disc 48, as shown in FIG. 27, has significantly reduced tendencies to have its edge portion deflect out of engagement with the chamber wall 220 over the inner portion 230. In the embodiment of FIG. 27, with deflection of the spring forming tubular member 200 to be compressed, fluid is permitted to flow axially past the head disc 48 dominantly by the head disc 48 coming to be moved axially into the enlarged diameter outer portion 232 of the chamber wall 220 where the diameter is greater than the diameter of the head disc 48.

Figure 28:
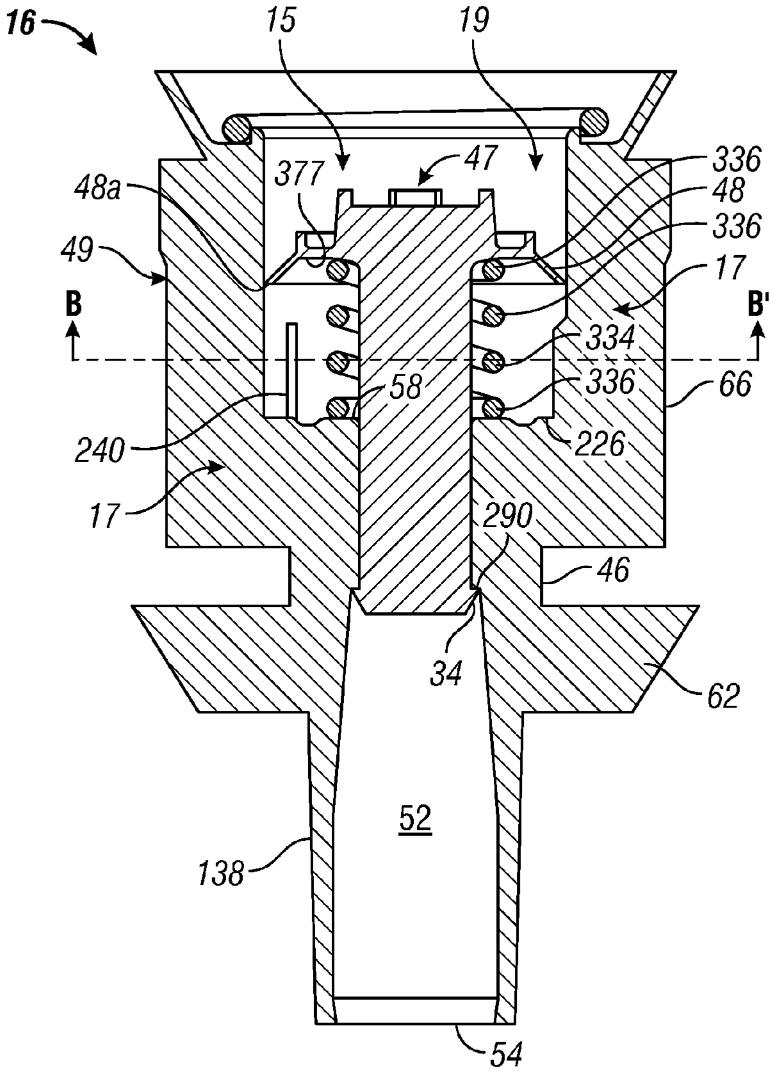
FIG. 28 is a cross-sectional side view of a tenth embodiment of a pump piston for use in the pump shown in FIG. 22 with a valve piston member in an uncompressed condition.
Figure 29:
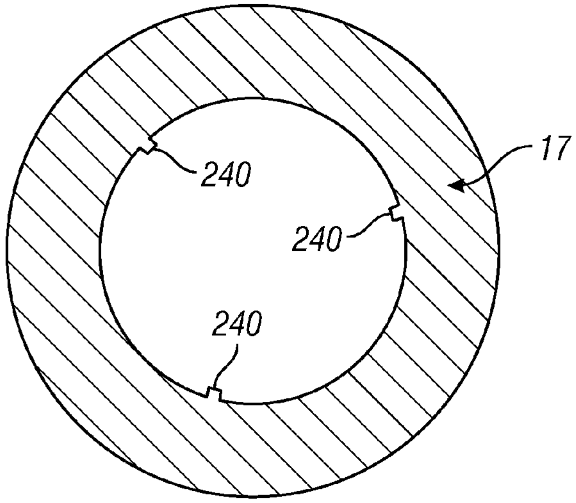
FIG. 29 is a cross-section through the valve body of FIG. 28 along section line B-B'.

Reference is made to FIGS. 28 and 29 which show a tenth embodiment of a pump piston 16 in accordance with the present invention which has considerable similarities to the embodiment illustrated in FIG. 23. However, in FIG. 28, the tubular member 200 has been eliminated and replaced by a helical coil spring 334 which has an outer end 335 engaging the chamber shoulder 226 and an inner end 336 engage an axially outwardly directed surface 337 of the head portion 47 such that the spring 334 biases the head portion 47 axially inwardly to a position axially limited by the hooking member 34 engaging the outwardly directed catch surface 290.

Preferably, the relative resiliency of the spring 334 and the edge portion of the head disc 48 can be selected so as to permit the operation of the embodiment of FIG. 28 to be the same as the embodiment of FIG. 22. However, FIG. 28 also shows an optional modification of the chamber wall 220 so as to provide three circumferentially spaced axially extending radially inwardly directed spacing ribs 240 disposed in the outer portion 232 of the valve piston chamber 19. As the spring 234 is compressed due to increasing pressure differential across the head disc 48, the deflection of the edge portion 48*a* of the head disc 48 radially inwardly to permit fluid flow therepast is provided by either or both of (1) the resilient deflection of the edge portion due to the increased pressure differential there across, and (2) the edge portion 48*a* of the head disc 48 on moving axially engaging the spacing ribs 240 which deflect the edge portion of the head disc 48 away from the chamber wall 220 permitting fluid flow therepast.

The spacing ribs 240 can best be seen in the cross-section through the valve body 17 as seen in FIG. 29. The spacing ribs 240 are spaced axially outwardly from the location of the head disc 48 in the position as shown in FIG. 28 such that the head disc 48 can be moved axially inwardly of the spacing ribs 240 for an axial distance in engagement with the chamber 220 which provides for suitable fluid drawback in operation.

In each of the embodiments illustrated in FIGS. 22 to 29, the valve piston member 15 has included a spring-forming component 200 or 334 which is axially compressed to reduce an axial length as the pressure differential increases.

Reference is made to FIGS. 30 to 33 which together with the embodiments of FIGS. 36 to 39 show arrangements in which the valve piston member 15 includes a spring-forming component which is axially stretched to increase in axial length as the pressure differential increases.

Figure 30:
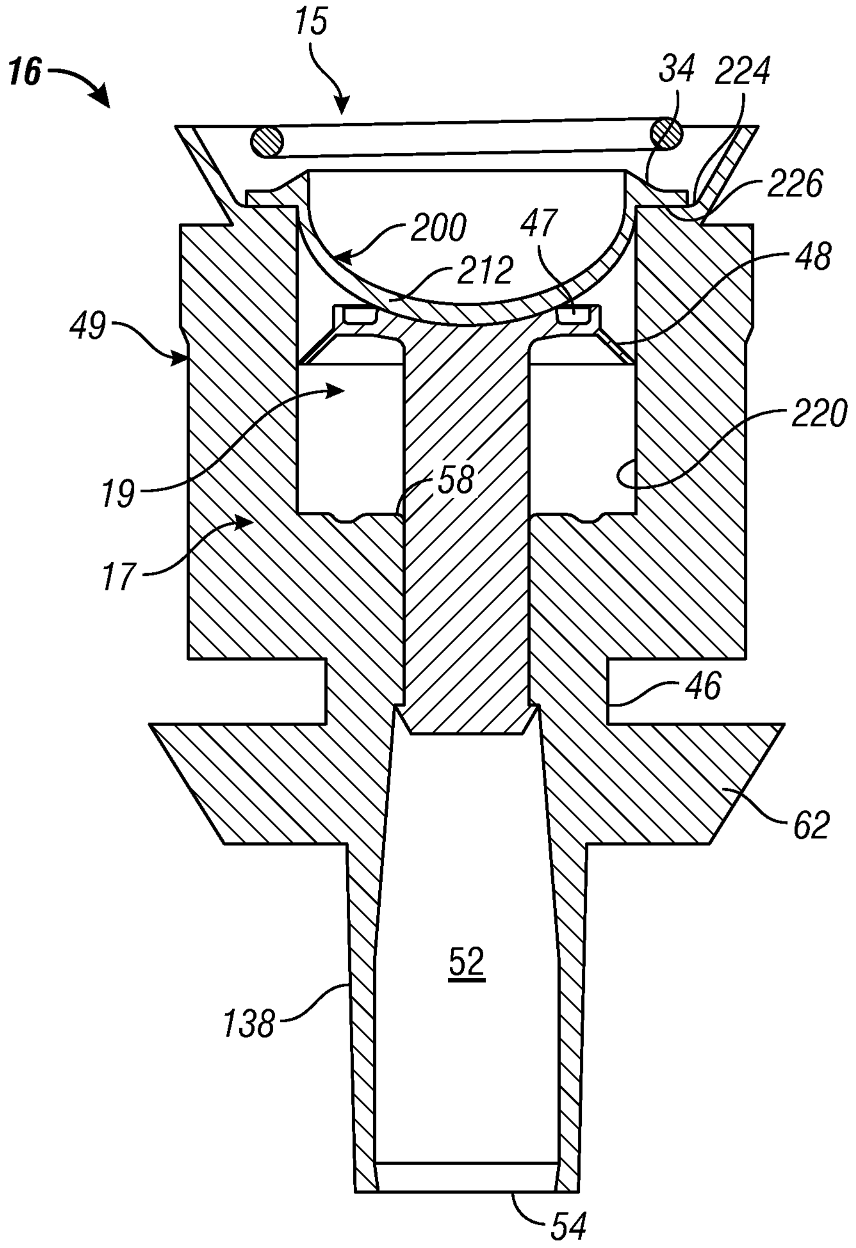
FIG. 30 is a cross-sectional side view of an eleventh embodiment of a pump piston for use in the pump shown in FIG. 22 with a valve piston member in an uncompressed condition.

Reference is made to FIG. 30 which illustrates a pump piston 16 in accordance with an eleventh embodiment of the present invention having considerable similarities to the pump piston shown in FIG. 23. In FIG. 30, the valve piston member 15 is modified over the valve piston member 15 shown in FIG. 23 so as to conceptually remove the tubular member 200 from its position as illustrated in FIG. 23 and locate the tubular member 200 such that it extends axially inwardly from the head portion 47 to a distal end carrying the radially outwardly extending hook members 34 to engage on the axially inwardly directed shoulder 226 at the axial inner end 224 of the valve piston chamber 19. As seen in FIG. 30, the tubular member 200 is shown to be the same as in FIG. 5 but inverted and secured to an inner end of the head portion 47.

FIG. 30 shows the tubular member 200 in an unbiased condition. On increase of the pressure differential across the head disc 48, the resilient spring forming tubular member 200 is expanded and the head portion 47 is thus moved axially inwardly until the pressure differential is increased sufficiently that the edge portion of the head disc 48 deflects from the chamber wall 220 permitting fluid flow axially therepast. Once the pressure differential across the head disc 48 is reduced, the tubular member 200 returns from a biased extended condition to an unbiased retracted position drawing the head portion 47 axially inwardly. Fluid flow is permitted axially through the tubular member 200 via its opening 212.

Figure 31:
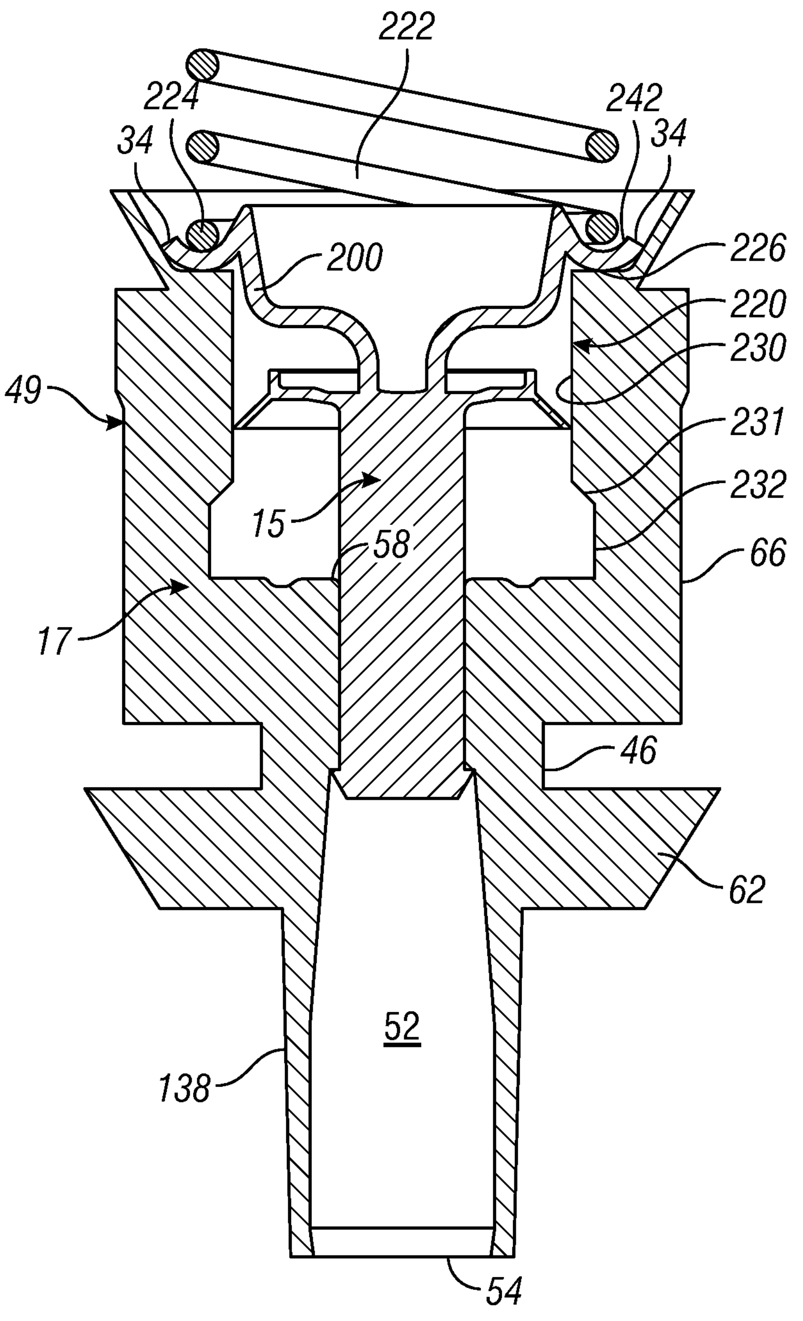
FIG. 31 is a cross-sectional side view of a twelfth embodiment of a pump piston for use in the pump shown in FIG. 22 with a valve piston member in an uncompressed condition.

Reference is made to FIG. 31 which shows a twelfth embodiment of a pump piston 16 in accordance with the present invention which is substantially the same as the embodiment illustrated in FIG. 31 but for three notable exceptions. Firstly, in FIG. 31, the chamber wall 220 has a stepped configuration with inner portion 230, transition portion 231 and outer portion 232 similar to that illustrated in FIG. 26 rather than being merely cylindrical as in FIG. 30. Secondly, the spring forming tubular member 200 has a side wall in the form of a relative S shape rather than merely being a C shape as seen in FIG. 30. Thirdly, the annular catch member 34 provided at the axially inner end of the tubular member 200 extends radially outwardly and then axially inwardly so as to provide an axially inwardly directed annular groove 242 adapted to receive the outer end 224 of the internal coil spring 222 as can be of assistance in maintaining the axially inner end 224 of the tubular member 200 coupled to the axially inner end shoulder 226 of the valve body 17.

Figure 32:
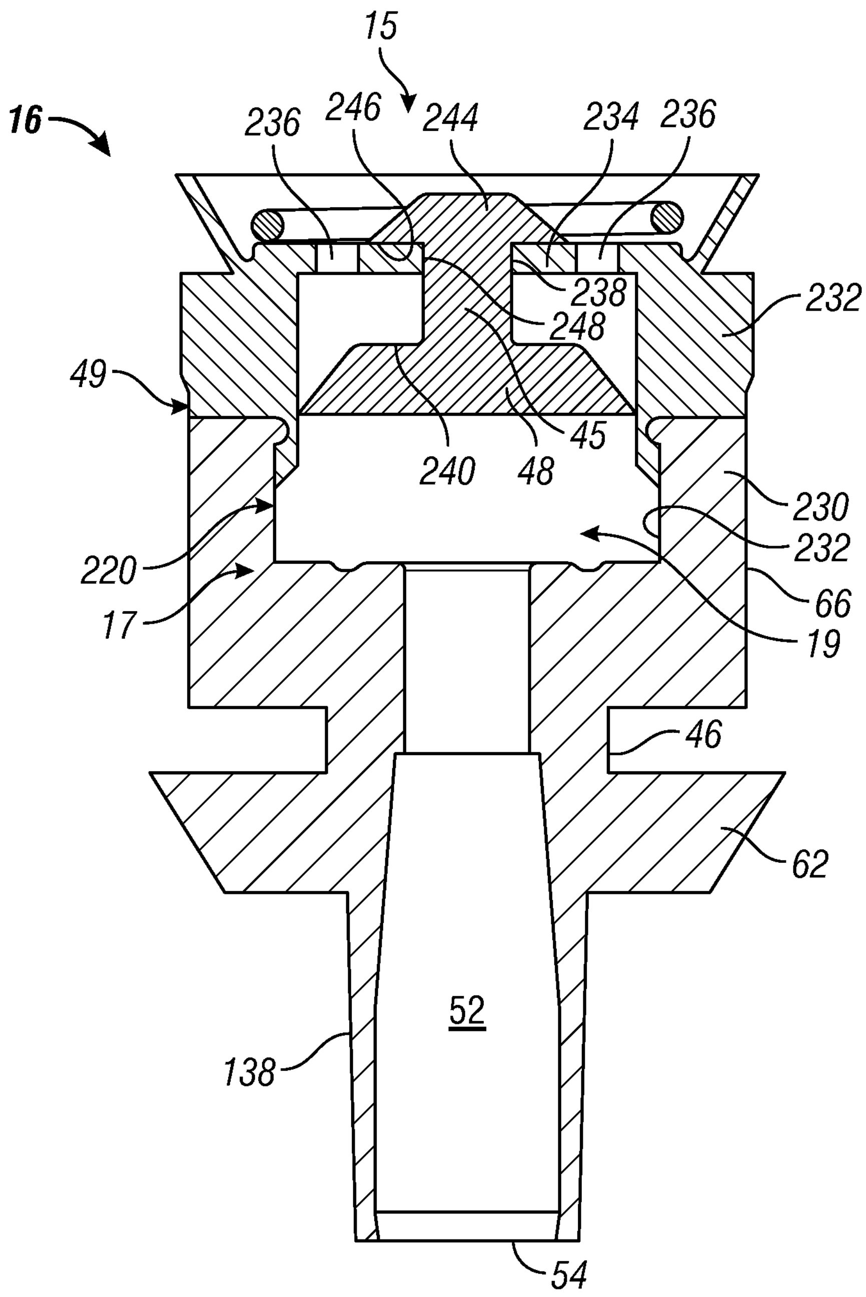
FIG. 32 is a cross-sectional side view of a thirteenth embodiment of a pump piston for use in the pump shown in FIG. 22 with a valve piston member in an uncompressed condition.

Reference is made to FIG. 32 which shows a thirteenth embodiment of a pump piston 16 in accordance with the present invention. In the embodiment of FIG. 32, the valve body 17 is illustrated as being formed from two elements, an axially outer portion 230 and an axially inner portion 232 which are secured together as in a snap-fit relation to jointly form the valve piston chamber 19 with the chamber wall 220 having a stepped configuration similar to that shown in FIG. 31. The inner portion 232 has a support plate 234 which extends across the axial inner end of the valve piston chamber 19 presenting openings 236 for fluid flow axially therethrough and also a central opening 238. The valve piston member 15 comprises a head portion 47 carrying a head disc 48 and a variable length intermediate portion 45. An axially outer end 240 of the variable length intermediate portion 45 is coupled to the head portion 47. The axially inner end 242 of the variable length intermediate portion 45 carries an enlarged catch button 244 with an axially outwardly directed catch surface 246 to engage the support plate 234 and prevent axial outward movement of the inner end 242 of the variable length intermediate portion 45. The intermediate portion 45 is resilient and adapted to elastically deform from an unbiased position as shown in FIG. 32 to extend in axial length as the pressure differential across the head disc 48 increases and to return from biased positions to the unbiased position shown in FIG. 32. As the pressure differential across the head disc 48 increases, the intermediate portion 45 is stretched and expands to increase in axial length such that with sufficient pressure differential increase, the head portion 47 carrying the head disc 48 is moved axially outwardly until fluid is permitted to flow axially outwardly therepast as by the head disc 48 coming to become axially located in the enlarged diameter outer portion 232 of the chamber wall 220 and/or by radially inward deflection of the head disc 48.

The embodiment illustrated in FIG. 32 can be configured having regard to the relative resiliency and ability of the intermediate portion 45 to expand under increased pressure differential so as to provide operation substantially the same as that illustrated in FIG. 30 and analogous to that in FIG. 23. The embodiment illustrated in FIG. 32 preferably provides the valve piston member 15 to be injection molded as a single element from suitably resilient material with the relevant radial cross-section area of the intermediate portion 45 and its axial extent selected to provide suitable resiliency and deflection under different pressures and the relative ability of the head disc 48 to have its edge portion deflect radially inwardly being also suitably selected.

Figure 33:
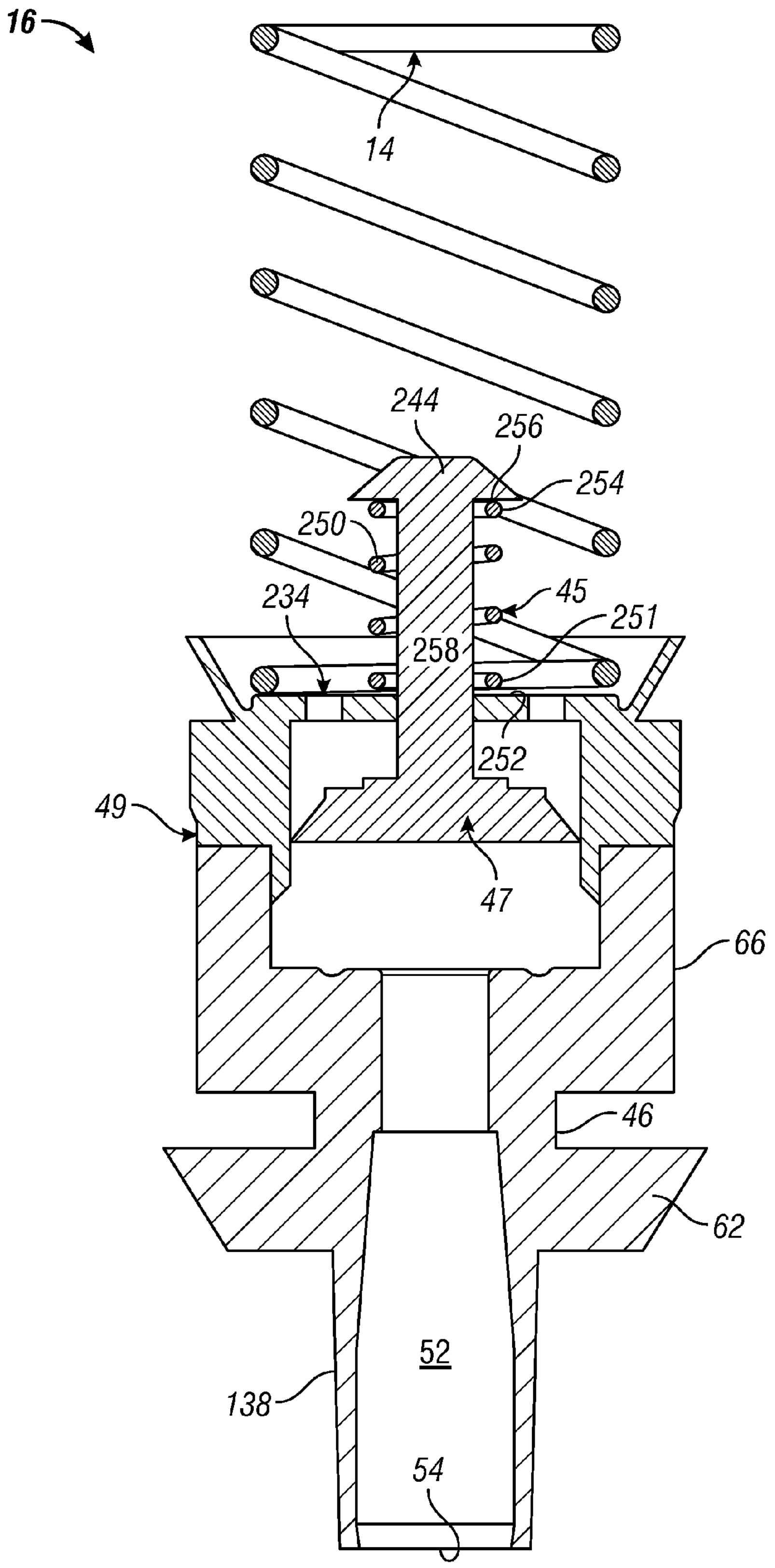
FIG. 33 is a cross-sectional side view of a fourteenth embodiment of a pump piston for use in the pump shown in FIG. 22 with a valve piston member in an uncompressed condition.

Reference is made to FIG. 33 which shows a fourteenth embodiment in accordance with the present invention which has similarities to the embodiment illustrated in FIG. 32, however, in FIG. 33, the valve piston member 15 includes a helical coil spring 250 as the variable length intermediate portion 45 which helical coil spring 250 biases the head portion 47 axially inwardly to an unbiased position. As shown in FIG. 33, the coil spring has an axially outer end 251 engage an axially inwardly directed surface 252 of the support plate 234 and an axially inner end 254 engage an axially outwardly directed surface 256 of the catch button 244. In the embodiment illustrated in FIG. 33, the element forming the head portion 47 includes an inwardly extending stem 258 ending at the catch button 244. This head portion 47 need not have any substantial resiliency to axial deflection.

Figure 34:
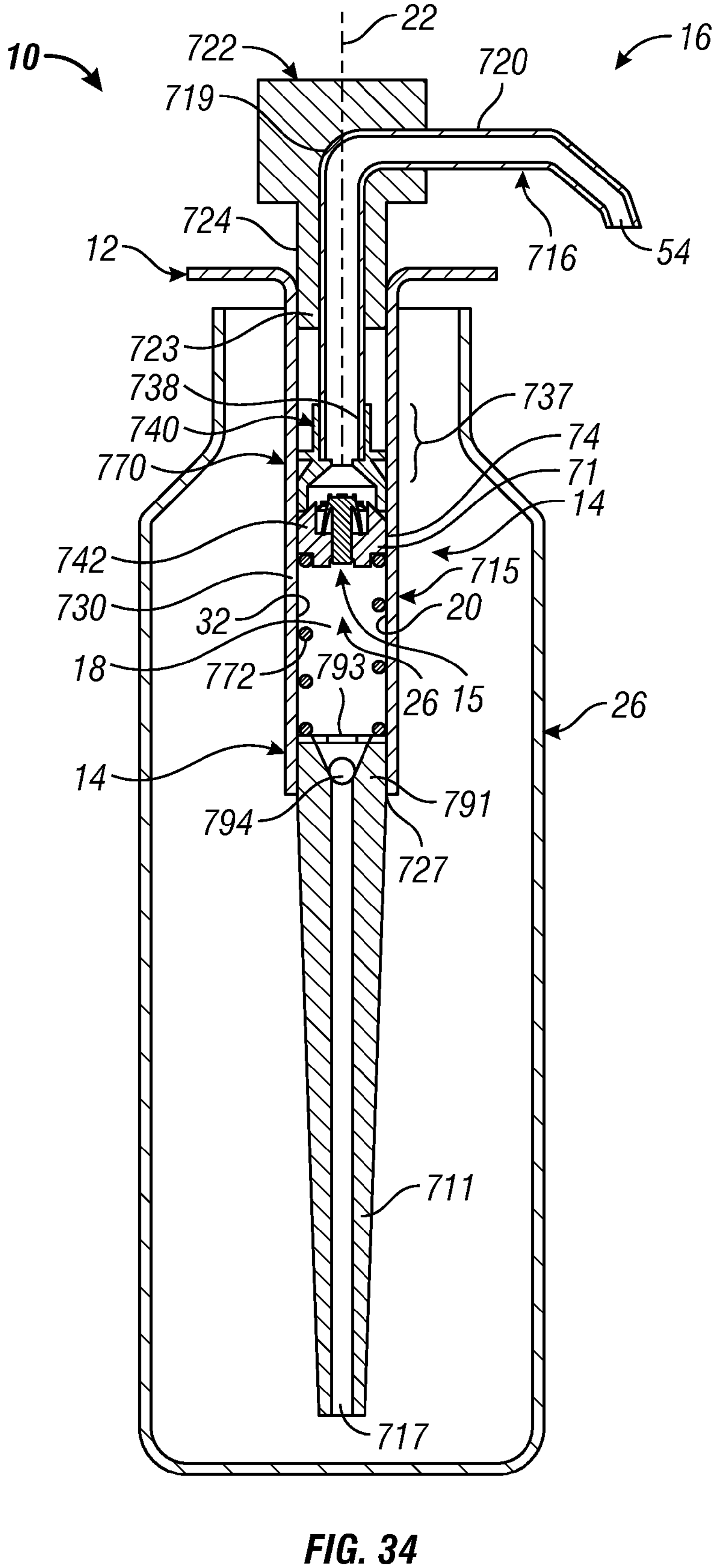
FIG. 34 is a schematic side view of a fluid dispenser in accordance with a fifteenth preferred embodiment of the present invention.
Figure 35:
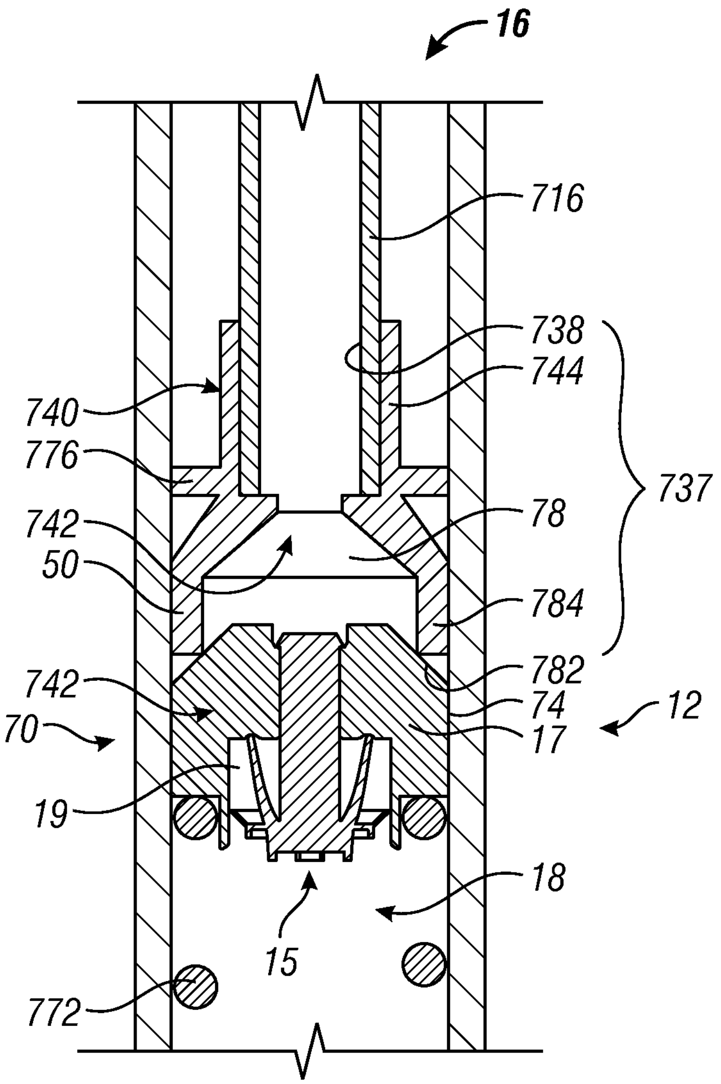
FIG. 35 is a side view showing a portion of FIG. 34 enlarged.

Reference is made to FIGS. 34 and 35 which illustrate a fifteenth embodiment in accordance with the present invention adopting a configuration for the pump piston 16 having many similarities to that shown in the embodiment of FIG. 22, however, in which the valve body 17 is, as contrasted with the unitary element shown in FIG. 22, includes two elements, namely, a sealing member 740 and a valve seat member 742. The sealing member 740 carries the annular base disc 50. The sealing member 740 is adapted to sealably engage a discharge tube 716. The valve seat member 742 carries the check valve piston chamber 19 and the valve piston member 15 which are substantially identical to that illustrated in FIG. 22. FIG. 34 illustrates a pump mechanism 10 with an upwardly open bottle 26 having a downwardly extending dip tube 711 and shows a check valve member 15 operable in a manner the same as that disclosed in FIG. 22 to provide for drawback from the discharge outlet 54 of the discharge tube 716.

FIGS. 33 and 34 show a fluid dispenser 10 in accordance with the present invention having a removable bottle 26 and a pump assembly 10 having similarities to a fluid dispenser disclosed in U.S. Patent Publication US 2008/0112830 to Ophardt et al, published May 15, 2008, the disclosure of which is incorporated herein by reference.

FIG. 34 shows the pump assembly 10 comprising a pump piston 16 and a piston chamber forming body 12 disposed relative a reservoir bottle 26 for dispensing fluid from the bottle 26. The piston body 12 includes a metal cylinder 715 forming the chamber 18 therein, the inner one-way check valve 14 secured in the inner end 727 of the chamber 18 and a hollow dip tube 711 extending downwardly from the inner end 727 of the chamber 18.

The pump piston 16 includes a metal tube 716, a casing member 722, the plastic annular sealing member 740 and the check valve member 15.

A helical coil spring 772 is disposed in the chamber 18 between the inner check valve 14 and the check valve member 15 to bias the pump piston 16 axially outwardly of the chamber 18.

The inner check valve 14 provides for one-way flow outwardly therepast but preventing flow inwardly therepast.

As with the other embodiments, the check valve member 15 is configured to function to permit fluid flow outwardly therepast, that is, in a downstream direction, under certain conditions, as when the pressure of fluid on a upstream side of the check valve member 15 is greater than the pressure of fluid on a downstream side of the check valve member 15, and to prevent fluid flow inwardly therepast, that is, in an upstream direction, other than under certain conditions in which the check valve member 15 operates to draw some fluid back past it in a upstream direction.

The pump piston 16 includes the metal tube 716 having a vertical portion 718, a curved portion 719 and a horizontal portion 720 ending at a downwardly directed discharge outlet 54. The pump piston 16 includes the casing member 722 about the upper end of the vertical portion 718 of the tube and the curved portion 719. The casing member 722 has a locating portion 723 with external cylindrical guide surfaces 724 to guide the upper end of the vertical portion 718 of the tube 716 coaxially within the piston chamber forming member 714.

The body 12 is preferably formed from metal and has a metal cylinder 715 defining therein the cylindrical chamber 18 about a central axis 22. The chamber 18 has a chamber wall with an inner surface 20. The chamber 18 is open at an upper, outer end and open at a lower, inner end. The hollow dip tube 711 extends downwardly from the inner end of the chamber 18 to an inlet end 717 in communication with the reservoir bottle 26.

The pump piston 16 includes an inner portion 737 at a lower end of the tube 716 where the plastic annular sealing member 740 is fixedly secured to the tube 716. The sealing member 740 is secured to the lower end of the tube 716 and provides a central bore 742 therethrough for fluid flow from a lower inner end of the sealing member 740 through the sealing member 740 and into the open lower end 738 of the tube 716. The sealing member 740 includes (a) an axially upwardly directed socket 744 for fixed, sealed engagement with the lower end 738 of tube 716, (b) a locating ring 746 for slidably locating the sealing member coaxially within the chamber 18, and (c) an annular base disc 50 to engage the inner surface of the chamber wall 20 forming a substantially fluid impermeable seal therewith on sliding of the pump piston 16 inwardly and outwardly. The bore 742 extends through the sealing member 740 centrally through the socket 744, the annular locating ring 746 and an annular base disc 50.

A lower end of the tube 716 is frictionally and sealably received inside the cylindrical inner side wall 754 of the socket 744 abutting on the shoulder 756.

The pump assembly 10 has axially inward of the sealing member 740 the outer check valve 15 and the inner check valve 14.

The inner check valve 14 provides for one-way flow outwardly therepast but preventing flow inwardly therepast. An inner valve seat member 791 of the inner check valve 14 is fixedly secured in the inner end of the cylinder 715. The dip tube 711 is shown as an integral extension of the inner valve seat member 791. A ball cage member 793 is engaged above, outwardly of the inner valve seat member 791, and serves to retain a ball 794 above the inner valve seat member 791 yet permits fluid flow centrally therethrough.

The helical coil spring 772 has an inner end engage the ball cage member 793 urging it inwardly into the inner valve seat member 791. An outer end of the spring 772 engages on an annular valve body 17 of the outer valve resiliently resisting inward, downward movement of the valve body 17.

The valve body 17 is slidable in the chamber 18 and biased axially upwardly and outwardly into engagement with the sealing member 740 by the coil spring 772.

As seen in FIG. 34, the valve body 17 has at its radially outermost surface at its upper outer end, an inner end as a cam shoulder 782 which is angled to extend radially outwardly and axially inwardly for engagement with an inner end 784 of the sealing member 40.

Movement of the pump piston 16 axially inwardly to a retracted position relative the body 12 urges the sealing member 740 into the check valve member 15 compressing the spring 772. On release of the pump piston 16, the spring 772 biases the pump piston 16 to return to an extended position. Reciprocal movement of the pump piston 16 draws fluid from the reservoir 26 in the inner end of the dip tube 711 through the dip tube 711, through the inner end of the chamber 18 through the tube 716 and dispenses fluid out the discharge outlet 54 of the tube 716.

Figure 36:
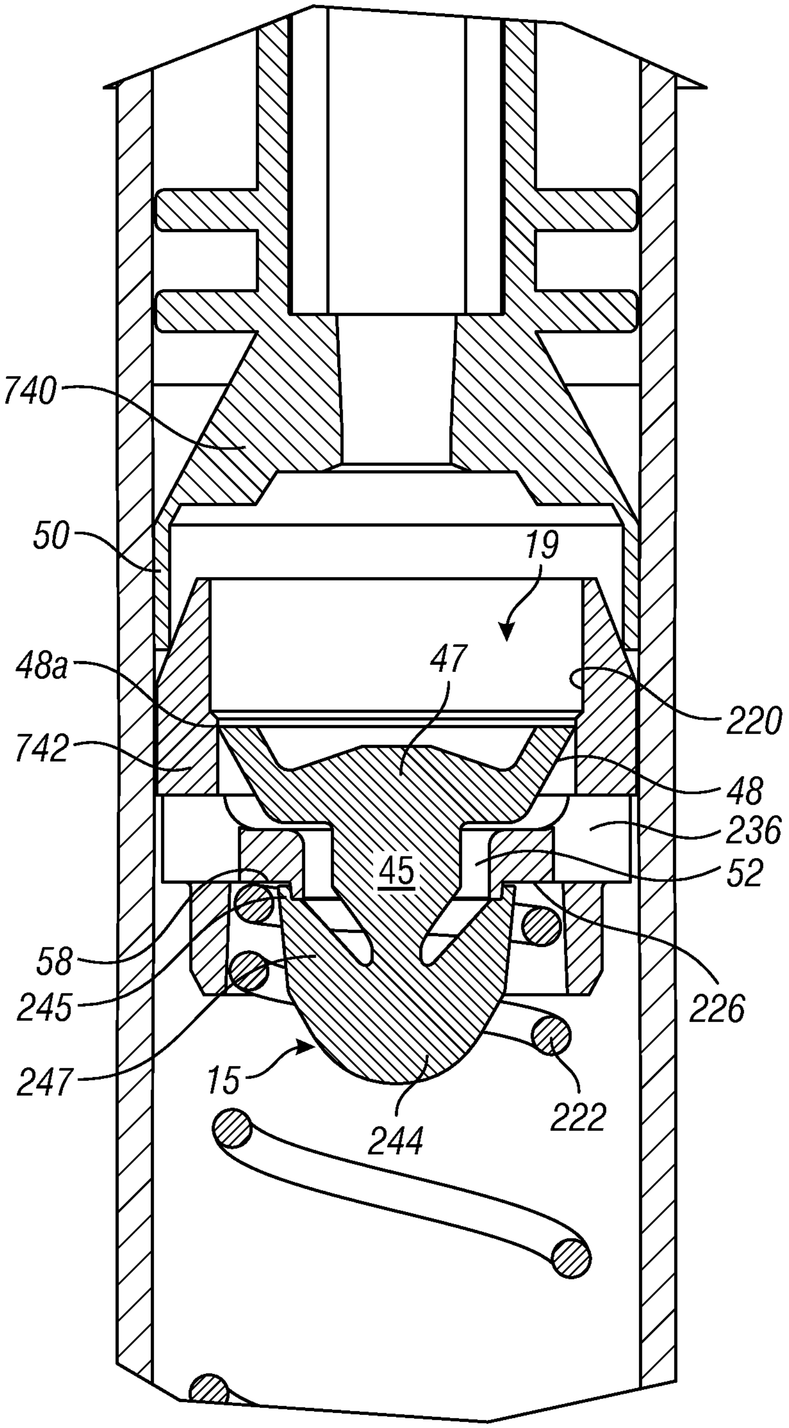
FIG. 36 is an enlarged side view similar to that shown in FIG. 35 but showing a sixteenth embodiment of a pump piston of the present invention.
Figure 37:
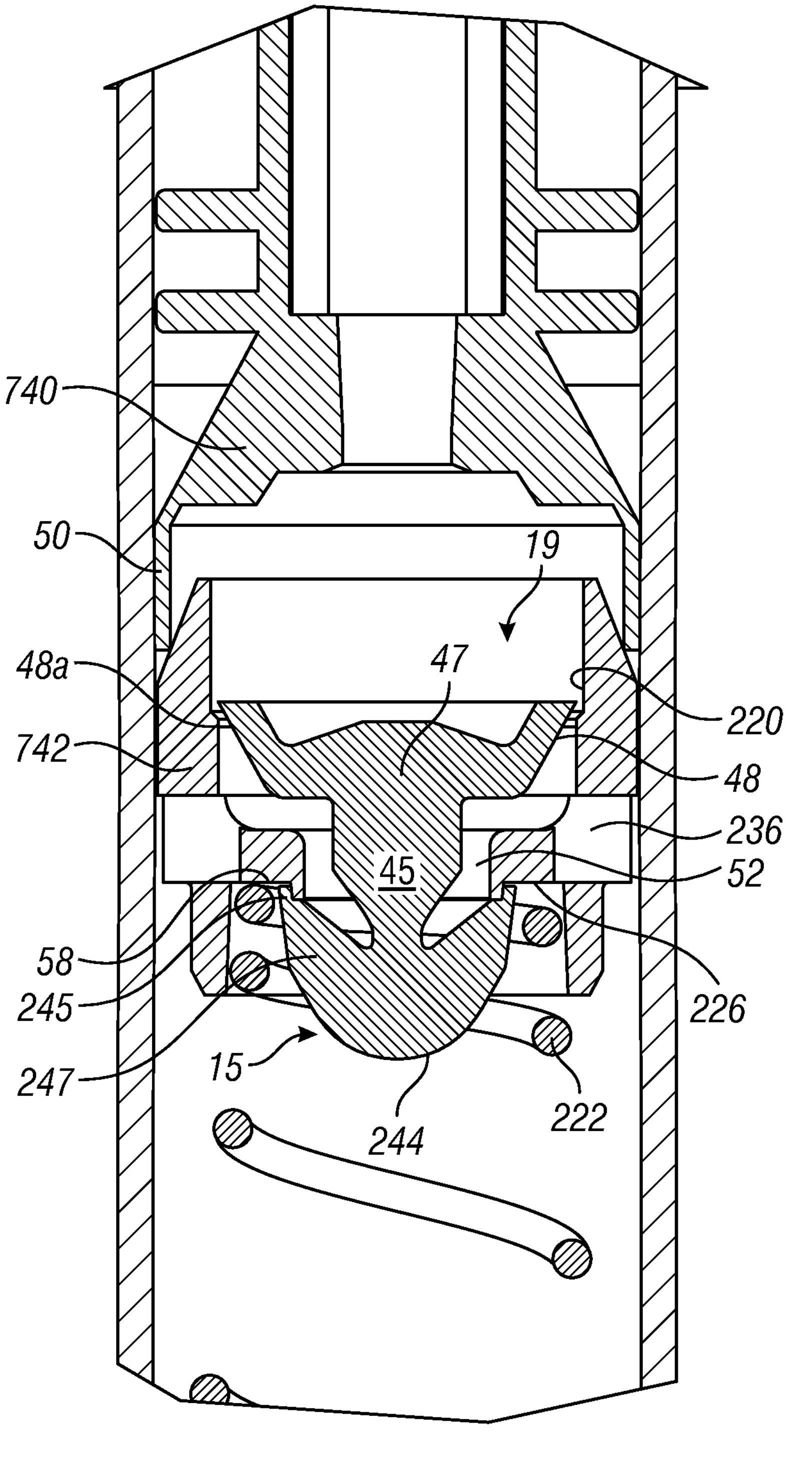
FIG. 37 is a side view the same as in an unbiased condition in FIG. 36 with the pump piston in a biased condition.

Reference is made to FIGS. 36 and 37 which illustrate a sixteenth embodiment in accordance with the present invention representing a side view through a portion of a piston pump substantially the same as shown in FIG. 35, however, with a modified form of the valve seat member 742 and valve piston member 15. As with the embodiment in FIG. 35, a coil spring 222 biases the valve seat member 742 axially outwardly into engagement with the sealing member 740 which carries the base disc 50. The valve seat member 742 provides the valve piston chamber 19 coaxially therein having a stepped chamber wall 220. The valve seat member 742 has a central passageway 52 therethrough and provides at an axially inner end 58 of the valve piston chamber 19 an axially inwardly directed annular shoulder 226 to be engaged by the axially outer end of the coil spring 222. The valve piston member 15 includes a head portion 47 carrying the head disc 48 with an annular edge portion 48*a* adapted to engage the chamber wall 220. The head portion 47 is shown to be coupled to a variable length intermediate portion 45 which includes a central stem and an enlarged head catch button 244. Radially extending openings 236 are provided through the valve seat member 742 axially outwardly of the shoulder 226 via which fluid may flow radially outwardly of the intermediate portion 45 into the valve piston chamber 19 axially inwardly of the head disc 48.

The intermediate portion 45 preferably has its central stem to be formed of resilient material such that a pressure differential across the head disc 48 causes the intermediate portion 45 to stretch axially outwardly as to permit the head disc 48 to become received within the enlarged diameter outer portion 232 of the valve piston chamber 19 such that fluid may flow outwardly therepast. In addition to providing the central stem of the intermediate portion 45 to be resilient and to act as a spring, the catch button 244 is provided to also act as a coned-disc spring or Belleville washer by comprising a disc 247 which extends from the stem with an annular profile tapering radially outwardly and axially outwardly to a radially outer edge 245. FIG. 36 illustrates an unbiased condition of the check valve member 15 and FIG. 37 illustrates a biased condition of the check valve 15 in which the pressure differential across the head disc 48 is sufficient that the intermediate portion 45 is deflected and increased in length axially outwardly, the disc 247 of the catch button 244 has become flattened to move the stem axially outwardly and the head disc 45 has become moved axially outwardly to be received within the enlarged diameter outer portion such that fluid can pass outwardly therepast.

It is to be appreciated that one or both of the resilient flexing of the coned-disc sping-forming disc 247 of the catch button 244 and the resilient stretching of the central stem may provide suitable resiliency to the intermediate length portion 47 to extend axially inwardly under pressure differentials across the head disc 48 as may be desired.

Figure 38:
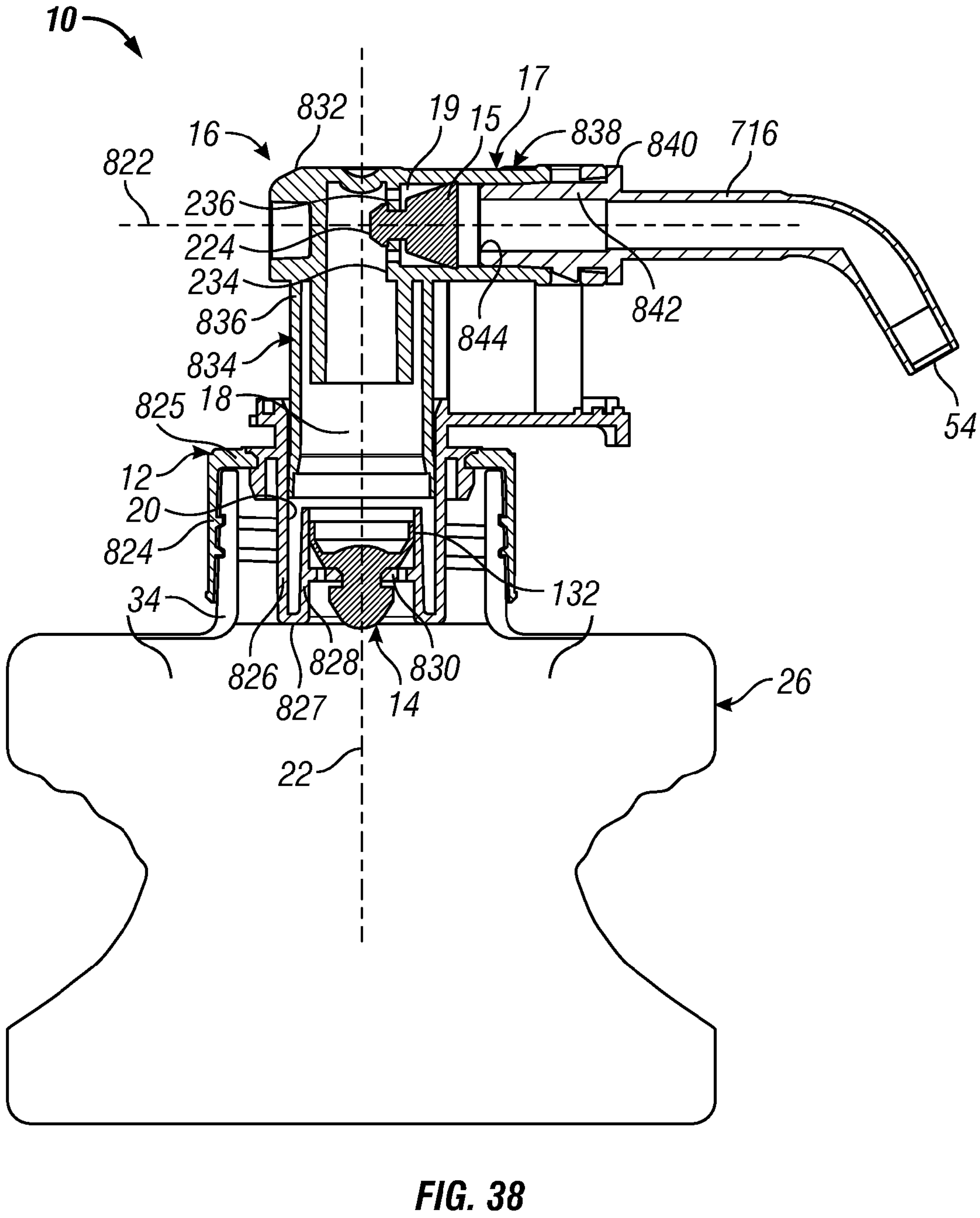
FIG. 38 is a schematic side view of a fluid dispenser in accordance with a seventeenth embodiment of the present invention.
Figure 39:
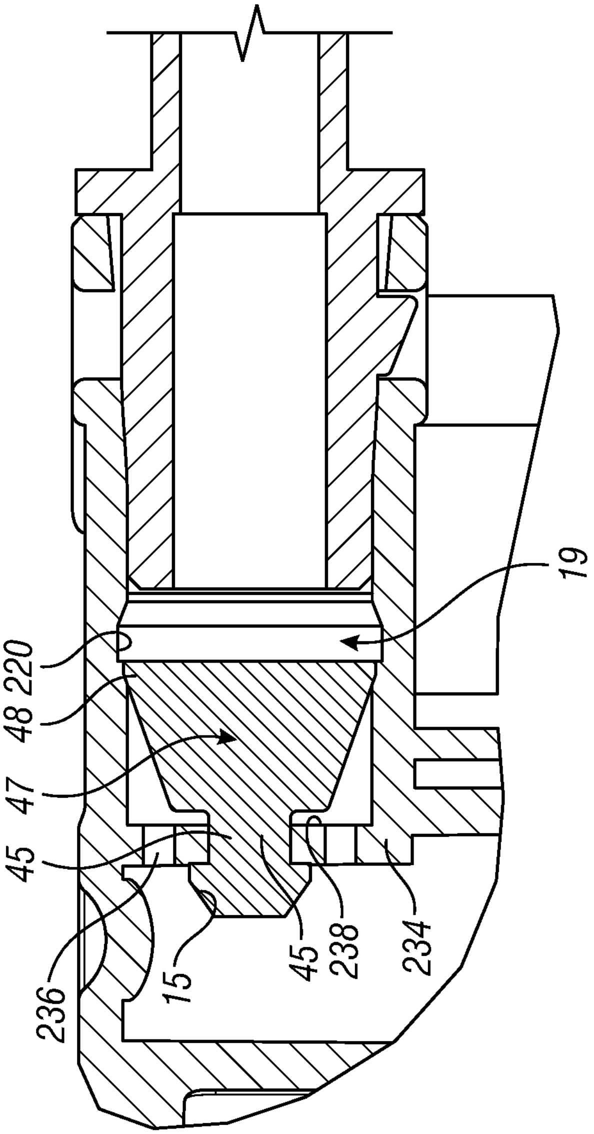
FIG. 39 is a side view showing a portion of FIG. 37 enlarged.

Reference is made to FIGS. 38 and 39 illustrating a seventeenth embodiment in accordance with the present invention. As with the other embodiments, the pump assembly 10 of FIG. 38 provides a body 12 secured to a collapsible container and with a pump piston 16 slidable relative to the body 12 so as to discharge fluid out of an outlet 54. The embodiment of FIG. 38 utilizes a valve piston member 15 within a valve body 17 providing the valve piston chamber 19 and having similarities to the valve piston member and valve body as disclosed in the embodiments of FIGS. 22 to 37. However, in the embodiments of FIGS. 23 to 37, the valve piston member 15, the valve body 17 and the valve piston chamber 19 are disposed coaxially about the axis 22 with respect to which the pump piston 16 is coaxially slidable relative to the chamber 18 and body 12. However, as illustrated in the embodiment of FIG. 38, this is not necessary that a pump configuration have the valve body 17 provide the valve piston chamber 19 that the valve piston chamber 19 be disposed coaxially about the axis 22. Rather, the valve piston chamber 19 may be disposed at a different orientation and the embodiment of FIG. 39 shows an orientation in which the valve piston chamber 19 is disposed about a valve axis 822 perpendicular to the axis 22 that the pump piston 16 is coaxially slidable relative to the body 12.

In FIG. 38, the body 12 includes an outer cylindrical tube 824, an intermediate cylindrical tube 826 and an inner cylindrical tube 828. The outer cylindrical tube 824 has its interior surface threaded such that the outer cylindrical tube 824 forms a threaded collar for threadable engagement on the neck 34 of the collapsible container 26 so as to form a seal therewith. An outer shoulder 825 connects an outer end of the outer tube 824 with the intermediate tube 826. An inner shoulder 827 connects an inner end of the intermediate tube 824 with an inner end of the inner tube 828. A bridge plate 830 is provided extending radially across the inner tube 228 to support the one-way valve 14 with a resilient annular ring 132 of the one-way valve 14 in engagement with radially inner annular surfaces of the inner tube.

The pump piston 16 comprises three elements, namely, a casing 832, the valve piston member 15 and the discharge tube 716.

The casing 832 is preferably formed as an integral member injection moulded from plastic and providing a cylindrical piston tube 834 coaxially disposed about the axis 22 and providing a radially outwardly directed piston surface 836 sized so as to be coaxially slidable within the intermediate tube 826 of the body 12 with the piston surface 836 in sealed engagement with the annular chamber wall 20 to prevent fluid flow therebetween. The casing 832 also provides an outlet tube 838 which is disposed about the axis 822 normal to the axis 22. Via the casing 832, an axially outer end of the intermediate tube 826 communicates with an inner end of the outlet tube 838. The outer end 840 of the outlet tube 838 provides a socket to receive the inner end 842 of the discharge tube 716 in a snap-fit relation. The valve piston chamber 19 is defined in the outlet tube 838 inwardly from an inner end 844 of the discharge tube 716 and outwardly of a support plate 234 formed as part of the casing 832 extending across the outlet tube 838 and providing openings 236 for fluid flow therethrough as well as a central opening 238. The valve piston member 15 has a configuration similar to that shown in FIG. 32 with an axially inner end of the variable length intermediate portion carrying an enlarged catch button 224 which engages the support plate 234 to prevent axial outward movement of an inner end of the variable length intermediate portion 45. The intermediate portion 45 has its stem pass through the central opening 238 of the support plate 234. The intermediate portion 45 is resilient and adapted to elastically deform by stretching in a downstream direction. The valve piston member 15 comprises a head portion 47 carrying a head disc 48. The head disc 48 is disposed within the valve piston chamber 19. The valve piston chamber 19 has a chamber wall 220 with a stepped configuration similar to that shown in FIG. 32. Operation of the valve piston member 15 in the valve piston chamber 19 is the same as that described with reference to FIG. 32 such that as the pressure differential across the head disc increases, the intermediate portion 45 is stretched and expands or increases in axial length such that with sufficient pressure differential, the head disc 48 is moved axially outwardly until fluid is permitted to flow axially therepast as by the head disc coming to become axially located in the larger diameter outer portion 232 of the chamber wall 220 and/or by radially inward deflection of the head disc 48. The casing and its discharge tube effectively forms the valve body 17 about the valve piston member 15.

For assembly, the valve piston member 15 may be inserted through the outlet end of the discharge tube socket and thereafter the discharge tube 720 may be inserted into the socket.

Figure 40:
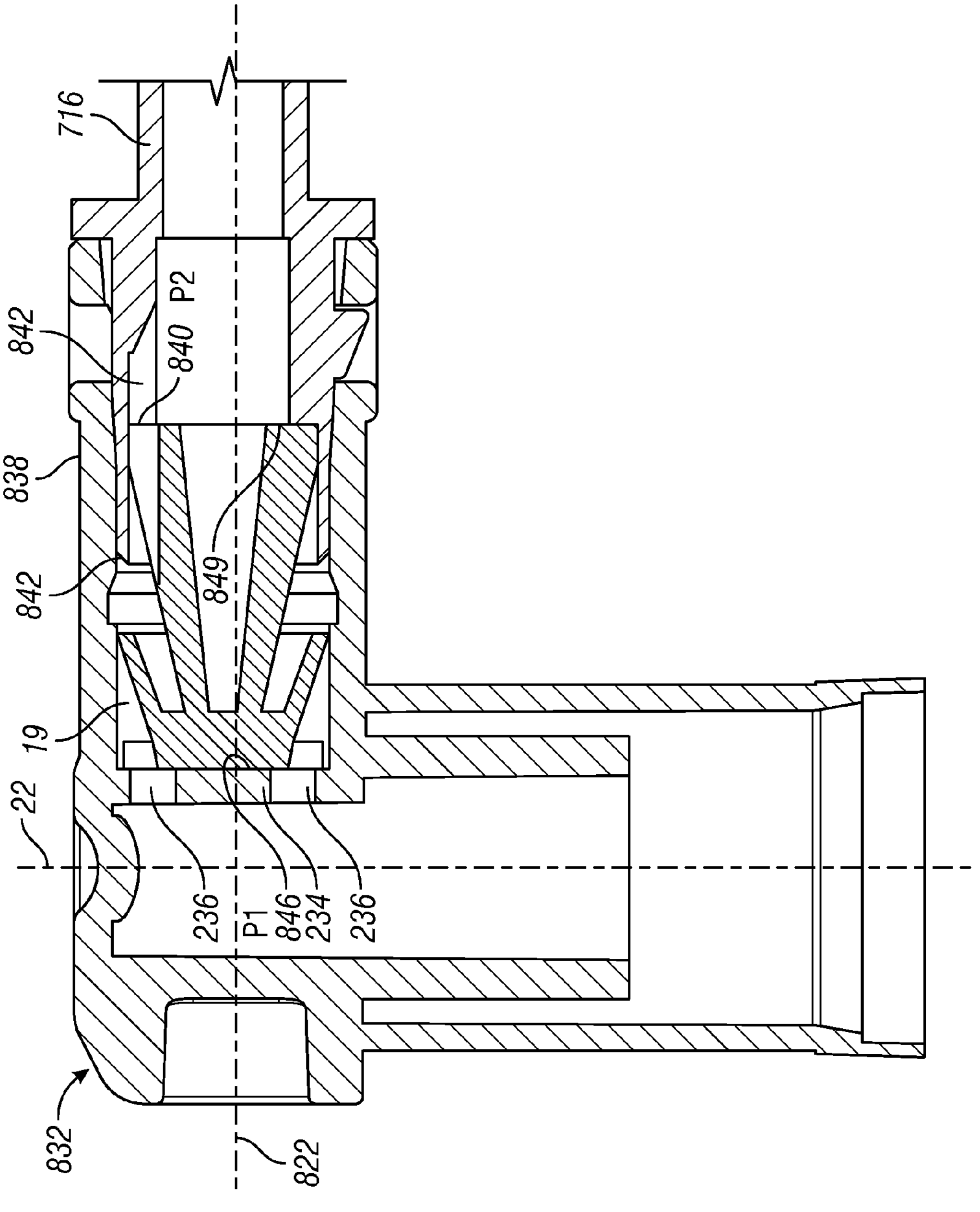
FIG. 40 is a schematic side view of a portion of a fluid dispenser in accordance with an eighteenth embodiment of the present invention having similarities to the embodiment shown in FIG. 39.
Figure 41:
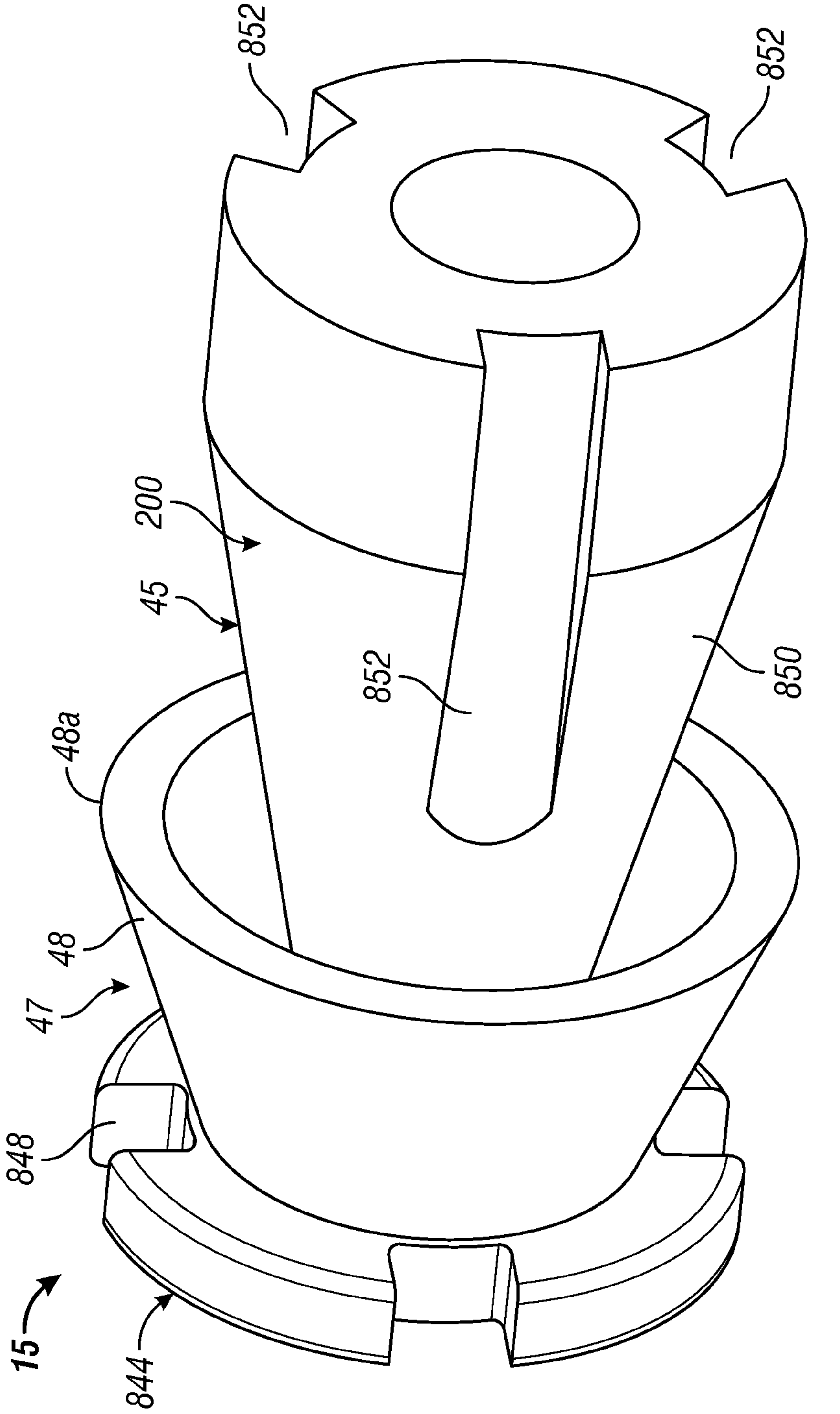
FIG. 41 is a pictorial view of the valve piston member of FIG. 40.

FIGS. 40 and 41 illustrate an eighteenth embodiment in accordance with the present invention. FIG. 40 is a view similar to FIG. 39 but showing the entirety of a casing 832.

In FIG. 40, the casing 832 is substantially identical to the casing shown in FIG. 39 with the exception that the support plate 234 has merely the openings 236 therethrough for fluid flow but not a central opening 232 as seen in FIG. 39. The discharge tube 716 in FIG. 40 is similar to that shown in FIG. 39. The discharge tube 716 has an axially inwardly directed shoulder 840. At circumferentially spaced locations, axially extending channelways 842 are provided in the interior side wall of the discharge tube 716 extending axially inwardly from the shoulder.

The piston valve member 15 is shown in cross-section in FIG. 40 and in a pictorial view in FIG. 41. The head portion 47 carries a head disc 48 and its edge portion 48*a*. The head portion 47 also carries at its axially inner end a locating disc 844 which serves the purpose of coaxially locating the valve piston member 15 within the valve piston chamber 19 proximate the axial outward side of the support plate 234 with an axially inwardly directed surface 846 of the head portion 47 in engagement with an axially outwardly directed surface of the support plate 234. The locating disc 844 has slots 848 cut therethrough at circumferentially spaced locations so as to constantly maintain communication through the support plate 234 via the openings 236 and the slots 848 into the valve piston chamber 19 upstream of the head disc 48. The inner end 842 of the discharge tube 716 is received in the outer end of the outlet tube 834 in a manner to provide a fluid seal therebetween and to prevent fluid flow therebetween.

The valve piston member 15 includes as a variable length intermediate portion 45 a tubular member 200 which is illustrated to have an annular wall 857 which reduces in thickness from an outer end 849 of the valve piston member 15 towards the head disc 48.

The tubular member 200 has a radially outwardly directed surface including a tapered surface portion 850 which tapers to reduce in diameter towards the head disc 48 and a cylindrical portion 851. In the radially outwardly directed exterior surface 850 and 851 of the tubular member 200, a plurality of circumferentially spaced axially extending radially inwardly extending channelways 852 are provided. As can be best seen in FIG. 40, at all times, at least one of the channelways 852 of the tubular member 200 circumferentially align with at least one of the channelways 842 in the interior side wall of the discharge tube 716 such that at all times communication is provided from the valve piston chamber 19 downstream of the head disc 48 to the interior of the discharge tube 716. The piston valve member 15 illustrated in FIGS. 40 and 41 is preferably resilient as, for example, formed from resilient material such as silicon. Preferred materials for this and the other embodiments is a silicon having a resiliency and hardness as measured using Shore Durometer Hardness Testing for plastics in the range of Shore A 40 to 60 and, more preferably, Shore A 50.

The piston valve member 15 can be seen to become engaged axially against movement between the support plate 234 and the shoulder 840 of the discharge tube 716. With increases of the pressure differential across the head disc 48 as by the pressure P1 upstream of the head disc 48 becoming greater than the pressure P2 downstream of the head disc 48, the pressure differential will, as in the manner of the other embodiments, act to reduce the length of the tubular portion 200 permitting the head disc 48 to slide axially in the valve piston chamber 19 into enlarged diameter portions within the valve piston chamber 19 which, together with radial inward deflection of the head disc 48, permits fluid flow outwardly past the head disc 48. In a preferred configuration, when the pressure differential reduces, then the head disc 48 preferably to provide drawback will under its resiliency deflect radially outward into sealed engagement with the annular side wall of the valve body 17 to form a seal therewith before the length of the tubular portion 200 has increased to return the head disc 48 into engagement with the support plate 234.

As can be seen in FIGS. 40 and 41, the tubular member 200 has a central blind bore 856 extending coaxially therein open axially outwardly to provide the tubular member 200 with a cylindrical wall 857. The tubular member 200 is axially deflectable as with its tubular wall 857 to bow radially outwardly as the tubular member 200 is compressed axially. As can also be seen in FIGS. 40 and 41, an annular groove 858 is provided between the tubular member 200 and the head disc 48 open axially outwardly such that the head disc in the preferred embodiment is a frustoconical tubular member adapted to be deflected radially inwardly.

Figure 45:
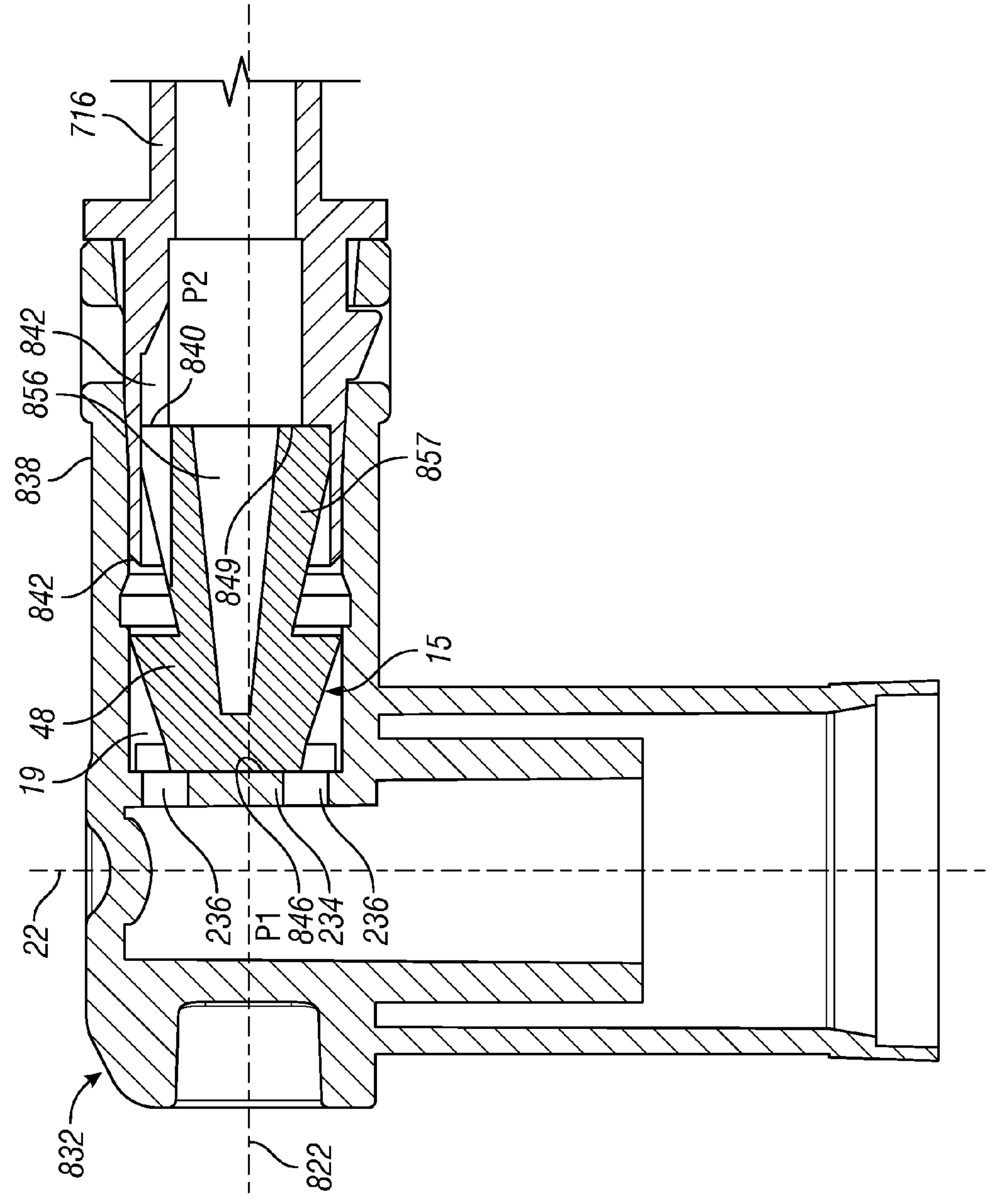
FIG. 45 is a schematic side view of a portion of a fluid dispenser in accordance with a twenty-second embodiment of the present invention having similarities to the embodiment shown in FIG. 40.
Figure 46:
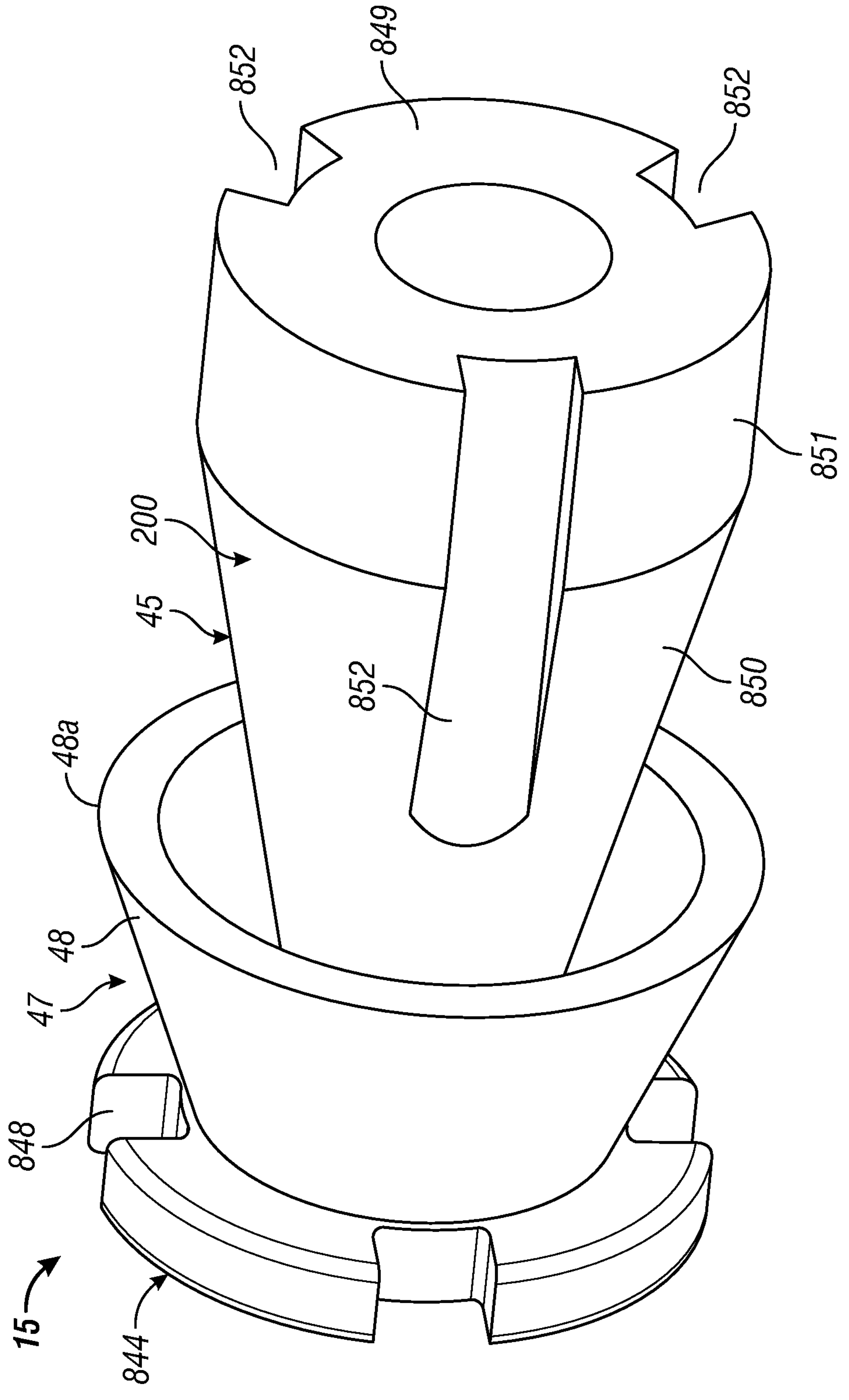
FIG. 46 is a pictorial view of the piston valve member of FIG. 45.

Reference is made to FIGS. 45 and 46 which shows an embodiment identical to that in FIGS. 40 and 41, respectively, however, in which the annular groove 858 between the head disc 48 and the tubular member 200 as seen in FIGS. 40 and 41, has been eliminated such that the head disc 48 is solid and merges radially into the tubular member 200. In the embodiment of FIGS. 45 and 46, the inherent resiliency of the material forming the head disc 48 can provide the desired deflection and inherent bias to the head disc 48. The resiliency of the head disc 48 can be adjusted either by increasing the relative size of the annular groove 858 in the embodiment of FIGS. 40 and 41 or by adjusting the resiliency of the material forming the valve piston member 15 as in the embodiment of FIGS. 45 and 46. To the extent that the head disc 48 is provided to be less resilient and, for example, substantially rigid, then this will tend to reduce the extent to which drawback is provided and, similarly, the extent to which the head disc 48 is flexible and resilient can increase the extent to which relative drawback may be provided.

Figure 47:
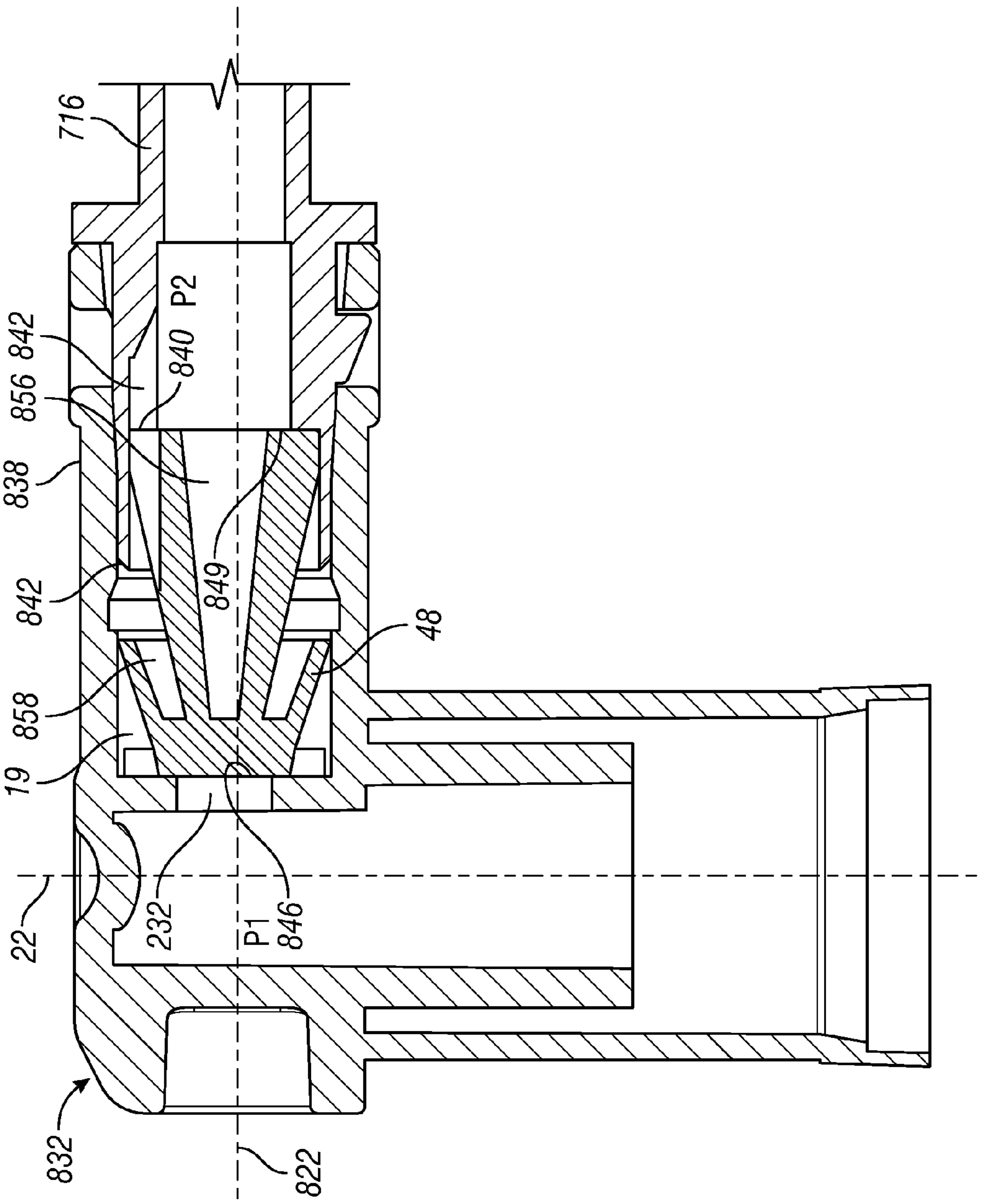
FIG. 47 is a schematic side view of a portion of a fluid dispenser in accordance with a twenty-third embodiment of the present invention having similarities to the embodiment shown in FIG. 40.

Reference is made to FIG. 47 which illustrates a further embodiment identical to the embodiment of FIG. 40, however, in which the only opening for flow through the support 234 is a central opening 232 which is closed to fluid flow therebetween by the axially inwardly directed surface 846 on the axial inner end 860 of the head portion 47 of the valve piston member 15 sealably engaging the axially outwardly directed surface of the support plate 234. In this embodiment, the pressure P1 must be sufficiently great to compress the valve piston member 15 axially by compressing the tubular member 200 before the pressure P1 comes to be applied into the valve piston chamber 19 and onto the head disc 48.

Figure 42:
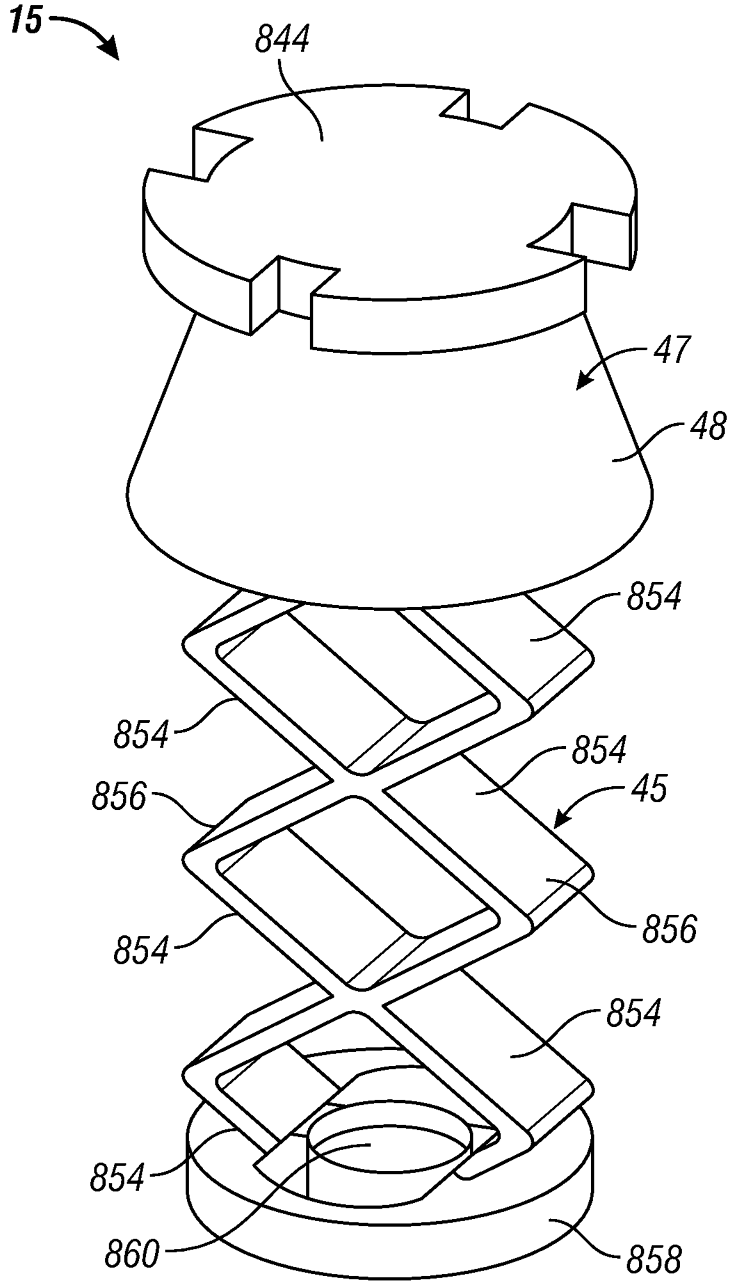
FIG. 42 is a perspective view of a valve piston member in accordance with a nineteenth embodiment of the present invention.

Reference is made to FIG. 42 which illustrates a nineteenth embodiment of a valve piston member 15 in accordance with the present invention and having a locating disc 844 and a head portion 47 with a head disc 48 substantially the same as that illustrated in FIG. 41, however, in which the resilient intermediate portion 45 comprises an integrally formed spring member formed from resilient material and having a plurality of opposed legs 854 each of which forms a U-shaped spring adapted to resiliently deflect about a living spring hinge 856 and revise to return to an unbiased position. The spring member is connected at an axially inner end to the head portion 47 at an axially outer end to a locating disc 850 with a central opening 860 therethrough for passage of fluid. The valve piston member 15 of FIG. 42 is adapted to be substituted for the valve piston member in FIG. 10 and provide for operation in an analogous manner.

Figure 43:
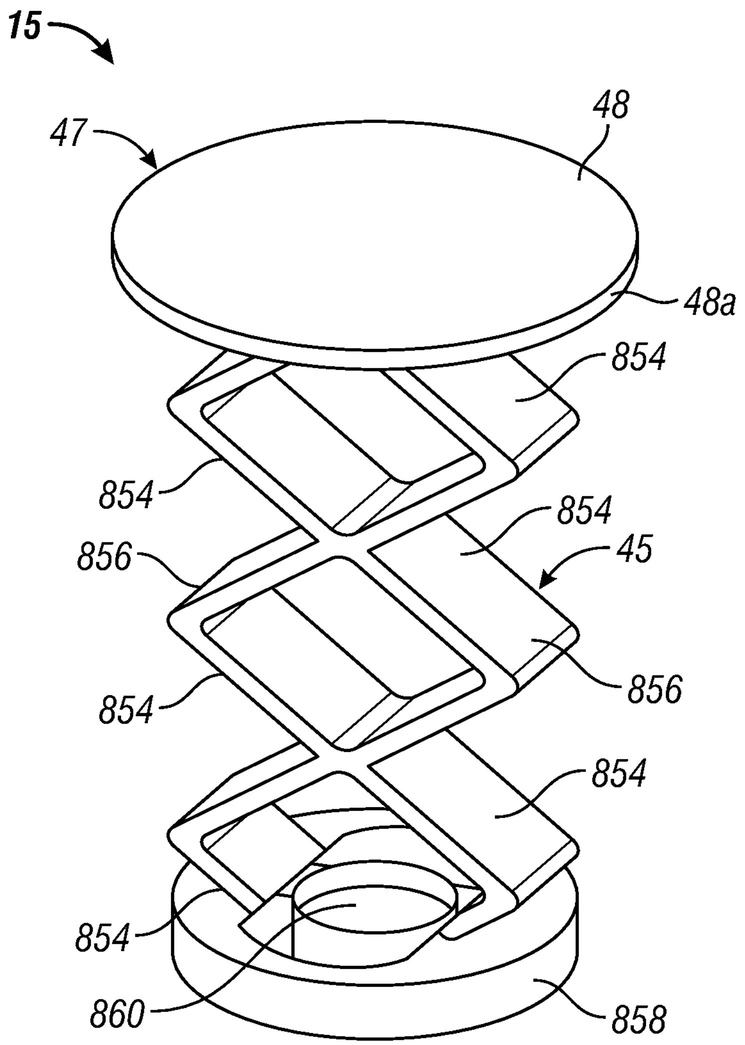
FIG. 43 is a pictorial view of a piston valve member in accordance with a twentieth embodiment of the present invention.

Reference is made to FIG. 43 which shows a thin member in accordance with a twentieth embodiment of the invention.

FIG. 43 illustrates an embodiment which is identical to the embodiment of FIG. 2 in respect of the resilient intermediate portion 45, however, in which the head portion 47 has been substituted by a thin disc of resilient material shown to be substantially circular and perpendicular to an access through the valve piston member 15 and provided with resilient edge portion 48*a*. The valve piston member 15 may be used in the embodiment of FIG. 40 in substitution of the valve piston member 15 shown therein.

Figure 44:
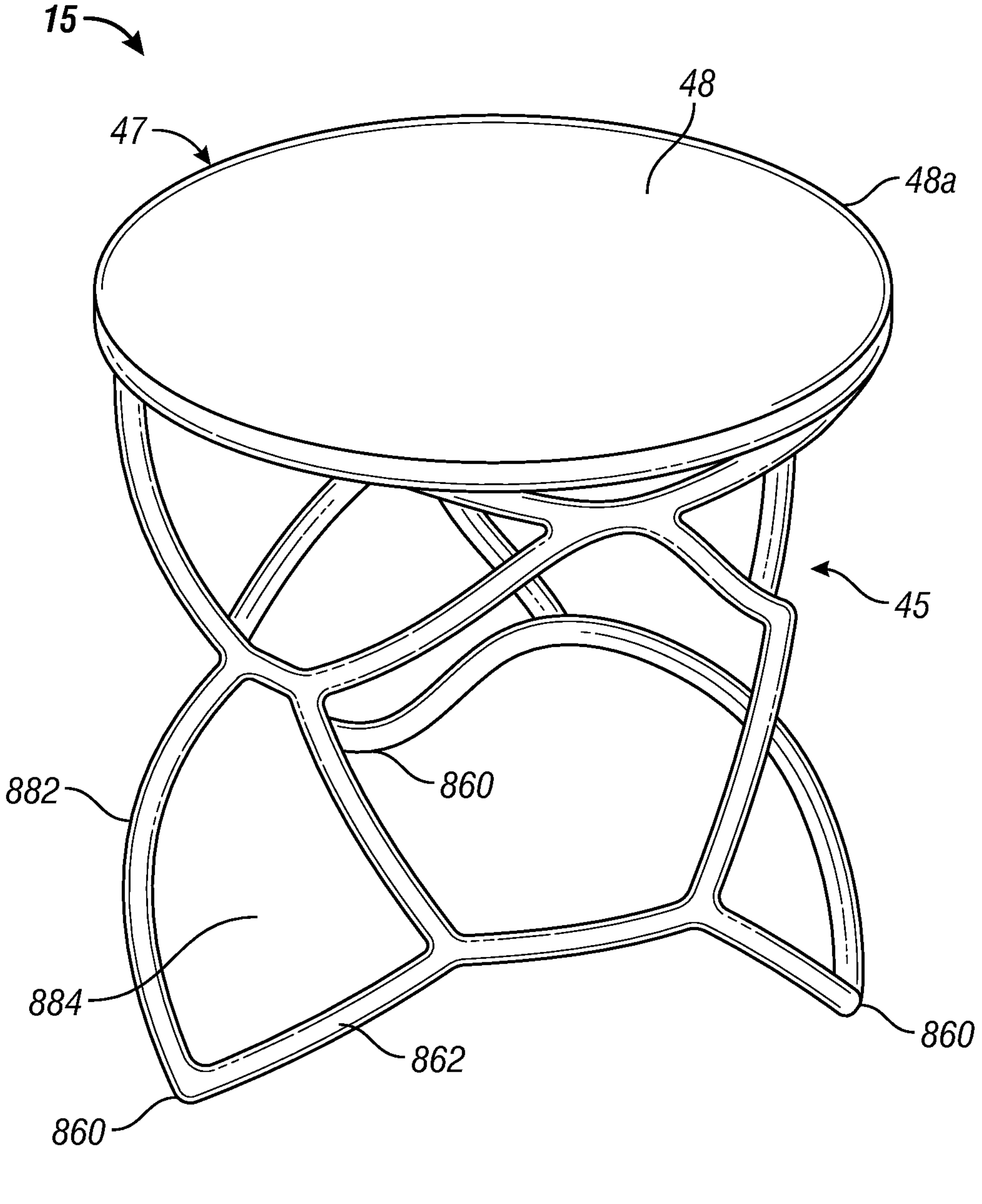
FIG. 44 is a pictorial view of a piston valve member in accordance with a twenty-first embodiment of the present invention.

Reference is made to FIG. 44 which shows a twenty-first embodiment of a valve piston member 15 in accordance with the present invention with a modified form of the valve piston member of FIG. 43 having a similar portion as a circular disc 48 and in which the resilient intermediate portion 45 is illustrated as comprising an open web of resilient arms 862 interconnected at various locations to form interstitial spaces 884 and extending downwardly to three end support apex 860. The valve piston member of FIG. 44 is also adapted for replacement of the valve piston member 15 in FIG. 40. The open matrix of arcuate resilient beams 882 resists axial compression of the valve piston member 15 and biases the valve piston member to assume an unbiased length as shown in FIG. 44.

In the embodiments of FIGS. 43 and 44 with circular discs, merely the deflection of the edge portion 48 of the disc may be sufficient to permit fluid flow therepast without the need for the circular disc to become engaged in an enlarged diameter portion of the valve piston chamber 19. Operation of the valve piston member 15 in FIGS. 43 and 44 is preferably the same as indicated with other embodiments with the resilient intermediate portion deflecting axially prior to the head disc 48 permitting fluid flow axially therepast.

While the invention has been described with reference to preferred embodiments, many modifications and variations will now occur to persons skilled in the art. For a definition of the invention, reference is made to the following claims.

We claim:

1. In combination, as tube member a valve member:

the tube member having a tube inner wall defining therein an axially extending fluid passageway for flow of a fluid in an axial downstream direction therethrough, the tube inner wall having a tube upstream portion and a tube downstream portion, the tube downstream portion located in the downstream direction from the tube upstream portion, the valve member disposed within the passageway, the valve member comprising a spring member and a piston head member, the spring member having a spring first end and a spring second end, the spring member extending axially within the passageway from the spring first end to the spring second end, the spring first end coupled t the tube inner wall at a first location against relative axial movement with the tube member, the piston head member fixedly secured to the spring second end, the spring member being resilient and having an inherent bias to assume an unbiased position in which the spring second end is axially spaced from the spring first end by a distance equal to an unbiased length, the spring member deflectable from the unbiased position to biased positions in which the spring second end is axially spaced from the spring first end by distances different than the unbiased length, in moving from the unbiased position to the biased positions the spring second end is moved in the axial downstream direction relative the spring first end, piston head member having an axial downstream side and an axial upstream side, a pressure differential across the piston head member is measured as a pressure of the fluid in the passageway on the axial upstream side of the piston head member minus a pressure of the fluid in the passageway on the axial downstream side of the piston head member, the spring member deflectable from the unbiased position to a first of the biased positions when the pressure differential is equal to a first pressure level, the piston head member having a peripheral circumferential edge portion wherein when the edge portion of the piston head member is in the tube upstream portion engagement between the edge portion and the tube inner wall of the tube upstream portion prevents fluid flow axially therebetween, and when the edge portion of the piston head member is in the tube downstream portion interaction between the edge portion of the piston head member and the tube downstream portion permits fluid flow downstream therepast, wherein when the pressure differential is less than or equal to the first pressure level the edge portion of the piston head member is in the tube upstream portion and when the pressure differential is greater than the first pressure level the edge portion of the piston head member is in the tube downstream portion:

the spring member comprising a tubular member having a wall member extending between the spring first end and the spring second end, the wall member having the shape of a solid of revolution rotated about the central axis, the wall member having a radially outwardly directed outer wall surface and a radially inwardly directed inner wall surface, at least one wall opening radially through the wall member from the outer wall surface to the inner wall surface, the tubular member being resilient having an inherent bias to assume an initial unbiased configuration of an unbiased length measured along the axial length, the tubular member resiliently deflectable to biased configurations, each having a length measured along the central axis loss than the unbiased length, the inherent bias of the resilient member biasing the tubular member to return towards the unbiased configuration from any one of the biased configurations, a reduction in the length of the tubular member as measured along the central axis corresponds to the outer wall surface increasing in convexity as seen in cross-sectional side view in flat planes including the central axis extending radially from the central axis.

2. A combination as claimed in claim 1 wherein the edge portion of the piston head member is elastically deformable between an unbiased condition and biased conditions wherein in the unbiased condition the edge portion engages the tube inner wall to prevent fluid flow therepast and in the biased conditions the edge portion elastically deflects away the tube inner wall to permit fluid flow therepast.

3. A combination as claimed in claim wherein in operation to discharge a fluid through the tube member past the valve member, a. starting with an initial the pressure differential less than the first pressure level and increasing the pressure differential to the first pressure level, the spring second end is moved axially in a downstream direction with the edge portion of the piston head member maintained in the tube upstream portion preventing fluid flow therepast, b. on further increasing the pressure differential from the first pressure level to pressure differentials which exceed the first pressure level the edge portion of the piston head member is moved axially in a downstream direction into the tube downstream portion and maintained in the tube downstream permitting fluid flow therepast, c. on decreasing the pressure differential from pressure differentials which exceed the first pressure level to the first pressure level the edge portion of the piston head member moves from the tube downstream portion into the tube upstream portion preventing fluid flow therepast, d. on further decreasing the pressure differential from the first pressure level to pressure differentials which are less than the first pressure level with the edge portion of the piston head member in the tube upstream portion preventing fluid flow therepast, the spring member deflects under its inherent bias moving the spring second end in an upstream direction towards the unbiased position, wherein in the moving the spring, second end in the upstream direction from the first of the biased positions towards the unbiased position with the edge portion of the piston head member engaging the tube inner wall to prevent fluid flow therepast fluid on the downstream side of the piston head member is drawn within the passageway in the upstream direction.

4. A combination as claimed in claim 1 wherein:

the spring first end is fixed to the inner wall of the tube member at the first location which is axially downstream from the spring second end, the spring member in moving from the unbiased position to the biased positions is compressed to axially decrease in length between the spring first end and the spring second end.

5. A combination as claimed in claim 1 wherein the valve member including the spring member and the piston head is integrally thrilled as a unitary element by injection moulding.

6. A combination as claimed in claim 1 wherein the tube member is a discharge tube member leading to a discharge outlet from which fluid is dispensed.

7. A combination as claimed in claim 6 wherein in operation after discharging the fluid through the tube member past the valve member and out the discharge outlet under a pressure differential greater than die first pressure level, on a decrease in the pressure differential from the first pressure level to pressure differentials which are less than the first pressure level the spring member deflects under its inherent bias moving the spring second end in an upstream direction from the first of the biased positions towards the unbiased position, with the edge portion of the piston head member moving with the spring second end while engaging the tube inner wall to prevent fluid flow therepast, whereby fluid in the tube member at the discharge outlet is drawn back within the passageway in the upstream direction.

8. A combination as claimed in claim 1 wherein the tube upstream portion being circular in cross section normal to the axis, the tube upstream portion having a diameter, the tube downstream portion bring circular in cross-section normal to the axis, the tube downstream portion having a diameter greater than the diameter of the tube upstream portion.

9. A combination as claimed in claim 8 wherein the edge portion of the piston head member is circular in cross-section normal to the axis, the edge portion having a diameter less than the diameter of the tube upstream portion.

10. A combination as claimed in claim 9 wherein the edge portion of the piston head member is elastically deformable between an unbiased condition and biased conditions wherein in the unbiased condition the edge portion engages the tube inner wall to prevent fluid flow therepast and in the biased conditions the edge portion elastically deflects away the tube inner wall to permit fluid flow therepast and wherein the edge portion of the piston head member is elastically deformable from the unbiased condition toward biased conditions however provided that the pressure differential is less than or equal to the first pressure level while the edge portion is in the tube upstream portion the edge portion prevents fluid flow in the passageway in either direction therepast.

11. A combination as claimed in claim 10 wherein the edge portion of the piston head member is elastically deformable from the unbiased condition toward biased positions however provided that the pressure differential is greater than the first pressure level while the edge portion is in the tube downstream portion the edge portion permits fluid flow in the passageway in the downstream direction therepast.

12. In combination, a tube member and a valve member:

the tube member having a tube inner wall defining therein an axially extending fluid passageway for flow of a fluid in an axial downstream direction therethrough, the valve member disposed within the passageway, the valve member comprising a spring member and a piston head member, the spring member having, a spring first end and a spring second end, the spring member extending axially within the passageway from the spring first end to the spring second end, the spring first end coupled to the tube inner wall at a first location against relative axial movement with the tube member, the piston head member fixedly secured to the spring second end, the spring member being resilient and having an inherent bias to assume an unbiased position in which the spring second end is axially spaced from the spring first end by a distance equal to an unbiased length, the spring member deflectable from the unbiased position to biased positions in which the spring second end is axially spaced from the spring first end by distances different than the unbiased length, in moving from the unbiased position to the biased positions the spring second end is moved in the axial downstream direction relative the spring first end, the piston head member having an axial downstream side and an axial upstream side, a pressure differential across the piston head member is measured as a pressure of the fluid in the passageway on the axial upstream side of the piston head member minus a pressure of the fluid in the passageway on the axial downstream side of the piston head member, the spring member deflectable from the unbiased position to as first of the biased positions when the pressure differential is equal to a first pressure level, the piston head member having a peripheral circumferential edge portion for engagement with the tube inner wall to prevent fluid flow axially therebetween unless the pressure differential is exceeds the first pressure level, the peripheral circumferential edge portion of the piston head member being elastically deformable between an unbiased condition and biased conditions wherein in the unbiased condition the edge portion engages the tube inner wall to prevent fluid flow therepast and in the biased conditions the edge portion elastically deflects away the tube inner wall to permit fluid flow in the downward direction therepast, the edge portion of the piston head member assuming the unbiased condition when the pressure differential is less than or equal to the first pressure level, the edge portion of the piston head member assuming the biased conditions when the pressure differential exceeds the first pressure level the spring first end is fixed to the inner all of the tube member at the first location which is axially downstream from the spring second end, the spring member in moving from the unbiased position to the biased positions is compressed to axially decrease in length between the spring first end and the spring second end.

13. A combination as claimed in claim 12 wherein the spring member assuming the unbiased position when the pressure differential is approximately zero.

14. A combination as claimed in claim 12 wherein in operation to discharge a fluid through the tube member past the valve member:

a. starting with an initial pressure differential less than the first pressure level and increasing the pressure differential to the first pressure level, the spring second end is moved axially in a downstream direction with the edge portion of the piston head member in the unbiased position prevent fluid flow therepast, b. on further increasing the pressure differential from the first pressure level to pressure differentials which exceed the first pressure level the edge portion of the piston head member assumes the biased conditions in which the edge portion elastically deflects away the tube inner wall to permit fluid flow therepast, c. on decreasing the pressure differential from pressure differentials which exceed the first pressure level to the First pressure level the edge portion of the piston head member assumes the biased condition in which the edge portion prevents fluid flow therepast and the spring second end moves to the first of the biased positions.

d. on further decreasing the pressure differential from the first pressure level to pressure differentials which are less than the first pressure level with the edge portion of the piston head member in the biased conditions in which the edge portion prevents fluid flow therepast, the spring member deflects under its inherent bias moving the spring second end in an upstream direction from the first of the biased positions towards the unbiased position, wherein in the moving the spring second end in the upstream direction from the first of the biased positions towards the unbiased position with the edge portion of the piston head member engaging the tube inner wall to prevent fluid flow therepast and fluid on the downstream side of the piston head member is drawn within the passageway in the upstream direction.

15. A combination as claimed in claim 12 wherein the spring member comprising a tubular member having a wall member extending between the spring first end and the spring second end, the wall member having the shape of a solid of revolution rotated about the central axis, the wall member having a radially outwardly directed outer wall surface and a radially inwardly directed inner wall surface, at least one wall opening radially through the wail member from the outer wall surface to the inner wall surface, the tubular member being resilient having an inherent bias to assume an initial unbiased configuration of an unbiased length measured along the axial length, the tubular member resiliently deflectable to biased configurations, each having a length measured along the central axis less than the unbiased length, the inherent bias of the resilient member biasing the tubular member to return towards the unbiased configuration from any one of the biased configurations, a reduction in the length of the tubular member as measured along the central axis corresponds to the outer wall surface increasing in convexity as seen in cross-sectional side view in flat planes including the central axis extending radially from the central axis.

16. In combination, a tube member and a valve member:

the tube member having a tube inner wall defining therein an axially extending fluid passageway for flow of a fluid in an axial downstream direction therethrough, the valve member disposed within the passageway, the valve member comprising a spring member and a piston head member, the spring member having a spring first end and a spring second end, the spring member extending axially within the passageway from the spring first end to the spring second end, the spring first end coupled to the tube inner wall at a first location against relative axial movement with the tube member, the piston bead member fixedly secured to the spring second end, the spring member being resilient and having an inherent bias to assume an unbiased position in which the sprint second end is axially spaced from the spring first end by a distance equal to an unbiased length, the spring member deflectable from the unbiased position to biased positions in which the spring second end is axially spaced from the spring first end by distances different than the unbiased length, in moving from the unbiased position to the biased positions the spring second end is moved in the axial downstream direction relative the spring first end, the piston head member having an axial downstream side and an axial upstream side, a pressure differential across the piston head member is measured as a pressure of the fluid in the passageway on the axial upstream side of the piston head member minus a pressure of the fluid in the passageway on the axial downstream side of the piston head member, the spring member deflectable from the unbiased position to a first of the biased positions when the pressure differential is equal to a first pressure level, the piston head member having a peripheral circumferential edge portion for engagement with the tube inner wall to prevent fluid flow axially therebetween unless the pressure differential is exceeds the first pressure level, the peripheral circumferential edge portion of the piston head member being elastically deformable between an unbiased condition and biased conditions wherein in the unbiased condition the edge portion engages the tube inner wall to prevent fluid flow therepast and, in the biased conditions, the edge portion elastically deflects away the tube inner wall to permit fluid flow in the downward direction therepast, the edge portion of the piston head member assuming the unbiased condition when the pressure differential is less than or equal to the first pressure level, the edge portion of the piston head member assuming the biased conditions when the pressure differential exceeds the first pressure level, wherein the spring member comprising a tubular member having a wall member extending between the spring first end and the spring second end, the wall member having the shape of a solid of revolution rotated about the central axis, the wall member having a radially outwardly directed outer wall surface and a radially inwardly directed inner wall surface, at least one wall opening radially through the wall member from the outer wall surface to the inner wall surface, the tubular member being resilient having an inherent bias to assume an initial unbiased configuration of an unbiased length measured along the axial length, the tubular member resiliently deflectable to biased configurations, each having a length measured along the central axis less than the unbiased length, the inherent bias of the resilient member biasing the tubular member to return towards the unbiased configuration from any one of the biased configurations, a reduction in the length of the tubular member as measured along the central axis corresponds to the outer wall surface increasing, in convexity as seen in cross-sectional side view in flat planes including the central axis extending radially from the central axis.

17. In combination, a tube member and a valve member:

the tube member having a tube inner wall defining therein an axially extending fluid passageway for flow of a fluid in an axial downstream direction therethrough, the tube inner wall having, a tube upstream portion and a tube downstream portion, the tube downstream portion located in the downstream direction, from the tube upstream portion, the valve member disposed within the passageway, the valve member comprising a spring member and a piston head member, the spring member having a spring first end and a spring second end, the spring member extending axially within the passageway from the spring first end to the spring second end, the spring first end coupled to the tube inner wall at a first location against relative axial movement with the tube member, the piston head member fixedly secured to the spring second end, the spring member being resilient and having an inherent bias to assume an unbiased position in which the spring second end is axially spaced from the spring first end b a distance equal to an unbiased length, the spring member deflectable from the unbiased position to biased positions in which the spring second end is axially spaced from the spring first end by distances different than the unbiased length, in moving from the unbiased position to the biased positions the spring second end is moved in the axial downstream direction relative the spring first end, piston head member having an axial downstream side and an axial upstream side, a pressure differential across the piston head member is measured as a pressure of the fluid in the passageway on the axial upstream side of the piston head member minus a pressure of the fluid in the passageway on the axial downstream side of the piston head member, the spring member deflectable from the unbiased position to a first of the biased positions when the pressure differential is equal to a first pressure level, the piston head member having a peripheral circumferential edge portion wherein when the edge portion of the piston head member is in the tube upstream portion engagement between the edge portion and the tube inner wall of the tube upstream portion prevents fluid flow axially therebetween, and when the edge portion of the piston head member is in the tube downstream portion interaction between the edge portion of the piston head member and the tube downstream portion permits fluid flow downstream therepast, wherein when the pressure differential is less than or equal to the first pressure level the edge portion of the piston head member is in the tube upstream portion and when the pressure differential is greater than the first pressure level the edge portion of the piston head member is in the tube downstream portion, the spring first end is fixed to the inner wall of the tube member at the first location which is axially downstream from the spring second end, the spring member in moving from the unbiased position to the biased positions is compressed to axially decrease in length between the spring first end and the spring second end.

18. A combination as claimed in claim 17 wherein the spring member comprising a tubular member having a wall member extending between the spring first end and the spring second end, the wall member having the shape of a solid of revolution rotated about the central axis, the wall member having a radially outwardly directed outer wall surface and a radially inwardly directed inner wall surface, at least one wall opening radially through the wall member from the outer wall surface to the inner wall surface, the tubular member being resilient having an inherent bias to assume an initial unbiased configuration of an unbiased length measured along the axial length, the tubular member resiliently deflectable to biased configurations, each having a length measured along the central axis less than the unbiased length, the inherent bias of the resilient member biasing the tubular member to return towards the unbiased configuration from any one of the biased configurations, a reduction in the length of the tubular member as measured along the central axis corresponds to the outer wall surf increasing in convexity as seen in cross-sectional side view in flat planes including the central axis extending radially from the central axis.

* * * * *